United States Patent
Kitamura et al.

(10) Patent No.: US 9,620,944 B2
(45) Date of Patent: Apr. 11, 2017

(54) WIRE HARNESS AND CONNECTOR

(71) Applicants: AUTONETWORKS TECHNOLOGIES, LTD., Yokkaichi-shi, Mie (JP); Sumitomo Wiring Systems, Ltd., Yokkaichi-shi, Mie (JP); SUMITOMO ELECTRIC INDUSTRIES, LTD., Osaka-shi, Osaka (JP)

(72) Inventors: Keishi Kitamura, Yokkaichi (JP); Yoshihiro Mizutani, Yokkaichi (JP); Yasuto Takeda, Yokkaichi (JP); Hiroki Hirai, Yokkaichi (JP); Tetsuji Tanaka, Yokkaichi (JP); Hiroyoshi Maesoba, Yokkaichi (JP); Kosuke Sone, Yokkaichi (JP); Teruo Kato, Anjo (JP); Kazuhisa Nimura, Anjo (JP)

(73) Assignees: AUTONETWORKS TECHNOLOGIES, LTD. (JP); SUMITOMO WIRING SYSTEMS, LTD. (JP); SUMITOMO ELECTRIC INDUSTRIES, LTD. (JP)

( * ) Notice: Subject to any disclaimer, the term of this patent is extended or adjusted under 35 U.S.C. 154(b) by 0 days.

(21) Appl. No.: 14/909,620

(22) PCT Filed: Jul. 22, 2014

(86) PCT No.: PCT/JP2014/069331
§ 371 (c)(1),
(2) Date: Feb. 2, 2016

(87) PCT Pub. No.: WO2015/019843
PCT Pub. Date: Feb. 12, 2015

(65) Prior Publication Data
US 2016/0197460 A1 Jul. 7, 2016

(30) Foreign Application Priority Data

Aug. 9, 2013 (JP) .................... 2013-166744

(51) Int. Cl.
*H02G 3/04* (2006.01)
*H01R 13/64* (2006.01)
(Continued)

(52) U.S. Cl.
CPC ......... *H02G 3/0406* (2013.01); *H01R 13/567* (2013.01); *H01R 13/64* (2013.01); *H01R 13/5829* (2013.01)

(58) Field of Classification Search
CPC .................................................. H02G 3/0406
(Continued)

(56) References Cited

U.S. PATENT DOCUMENTS 3,899,236 A * 8/1975 Santos ................. H01R 4/2433
  439/402
4,068,912 A * 1/1978 Hudson, Jr. .......... H01R 12/675
  29/857
(Continued)

FOREIGN PATENT DOCUMENTS

JP 2009-93860 4/2009
JP 2011-18476 1/2011

OTHER PUBLICATIONS

International Search Report.

*Primary Examiner* — Ross Gushi
(74) *Attorney, Agent, or Firm* — Gerald E. Hespos; Michael J. Porco; Matthew T. Hespos

(57) ABSTRACT

An incorrect fitting of a connector (40) is prevented, and a fitting work is enabled to be performed smoothly. A plurality of connectors (40), each having a housing (41) capable of fitting with its counterpart housing (71), is arranged in a line. Upon fitting of the housings (41, 71), a front face of each (Continued)

housing (41) is arranged so as to face a direction facing its counterpart housing (71), and an aligning direction of the connectors (40) is set to be a direction intersecting a front-rear direction. Through portions (52, 52E) are provided in the housings (41), and upon fitting of the housings (41, 71), each connector (40) is arranged at a position capable of facing its counterpart connector (70) by an aligning member (80, 100) that is passed through the respective through portions (52, 52E).

3 Claims, 47 Drawing Sheets

(51) Int. Cl.
*H01R 13/56* (2006.01)
*H01R 13/58* (2006.01)

(58) Field of Classification Search
USPC .................................. 439/502, 505
See application file for complete search history.

(56) References Cited

U.S. PATENT DOCUMENTS

| | | | | |
|---|---|---|---|---|
| 4,075,758 A * | 2/1978 | Parsons | H01R 25/00 | 29/866 |
| 4,181,395 A * | 1/1980 | Grabowski | H02B 1/056 | 174/72 R |
| 4,359,257 A * | 11/1982 | Lopinski | H01R 12/675 | 439/405 |
| 4,563,810 A * | 1/1986 | Adlon | H01R 43/01 | 29/749 |
| 4,627,759 A | 12/1986 | Kato et al. | | |
| 4,641,904 A * | 2/1987 | Kosugi | H01R 12/675 | 439/404 |
| 4,668,039 A * | 5/1987 | Marzili | H01R 12/675 | 439/404 |
| 4,674,819 A * | 6/1987 | Fujitani | H01R 12/675 | 439/404 |
| 4,693,533 A * | 9/1987 | Szczesny | H01R 12/675 | 439/350 |
| 4,778,405 A * | 10/1988 | Sterken | H01R 4/2429 | 439/395 |
| 4,897,041 A * | 1/1990 | Heiney | H01R 23/661 | 439/404 |
| 4,902,243 A * | 2/1990 | Davis | H01R 12/675 | 439/405 |
| 4,938,711 A * | 7/1990 | Davis | H01R 12/675 | 439/405 |
| 4,968,267 A * | 11/1990 | Payne | H01R 4/2429 | 439/404 |
| 4,997,388 A * | 3/1991 | Dale | H01R 25/003 | 439/110 |
| 5,041,009 A * | 8/1991 | McCleerey | H01R 12/675 | 439/405 |
| 5,064,380 A * | 11/1991 | Dale | H01R 25/003 | 439/113 |
| 5,064,382 A * | 11/1991 | Minnis | H01R 23/667 | 102/200 |
| 5,064,383 A * | 11/1991 | Locati | H01R 12/675 | 439/405 |
| 5,122,079 A * | 6/1992 | Locati | H01R 12/675 | 439/417 |
| 5,178,558 A * | 1/1993 | Knox | H01R 4/2433 | 439/404 |
| 5,209,672 A * | 5/1993 | Hatanaka | H01R 13/62994 | 29/857 |
| 5,242,313 A * | 9/1993 | Logerot | H01R 12/616 | 439/404 |
| 5,252,091 A * | 10/1993 | Fujita | H01R 25/14 | 439/499 |
| 5,528,823 A * | 6/1996 | Rudy, Jr. | H01R 13/74 | 29/825 |
| 5,554,047 A * | 9/1996 | Englert, Jr. | H01R 12/675 | 439/404 |
| 5,562,478 A * | 10/1996 | Yamamoto | H01R 4/2433 | 439/402 |
| 5,603,633 A * | 2/1997 | Satoh | H01B 7/08 | 439/404 |
| 5,620,331 A * | 4/1997 | Los | H01R 12/58 | 439/404 |
| 5,722,852 A * | 3/1998 | Miek | H01R 31/005 | 439/404 |
| 5,759,065 A * | 6/1998 | Hatagishi | H01R 4/2433 | 439/404 |
| 5,820,404 A * | 10/1998 | Chishima | H01R 4/2454 | 439/404 |
| 5,890,924 A * | 4/1999 | Endo | H01R 4/2433 | 439/404 |
| 5,893,774 A * | 4/1999 | Lin | H01R 33/22 | 439/417 |
| 5,902,147 A * | 5/1999 | Jochen | H01R 12/675 | 439/405 |
| 5,934,930 A * | 8/1999 | Camps | H01R 4/2404 | 439/403 |
| 5,961,341 A * | 10/1999 | Knowles | H01R 4/2433 | 439/403 |
| 5,964,613 A * | 10/1999 | Huang | F21S 8/081 | 439/417 |
| 5,967,832 A * | 10/1999 | Ploehn | H01R 23/662 | 439/497 |
| 5,971,793 A * | 10/1999 | Jochen | H01R 12/778 | 439/405 |
| 5,980,303 A * | 11/1999 | Lee | H01R 12/675 | 439/405 |
| 6,012,943 A * | 1/2000 | Wu | H01R 12/675 | 439/404 |
| 6,022,240 A * | 2/2000 | McCleerey | H01R 4/2408 | 439/410 |
| 6,033,238 A * | 3/2000 | Fogg | H01R 12/675 | 439/108 |
| 6,039,596 A * | 3/2000 | Whiteman, Jr. | H01R 13/5205 | 439/404 |
| 6,077,105 A * | 6/2000 | Jochen | H01R 12/675 | 439/405 |
| 6,083,035 A * | 7/2000 | Mackey | H01R 4/2408 | 439/410 |
| 6,089,906 A * | 7/2000 | Juntwait | H01R 23/662 | 439/497 |
| 6,142,815 A * | 11/2000 | Whiteman, Jr. | H01R 9/24 | 439/381 |
| 6,179,644 B1 * | 1/2001 | Adams | H01R 4/2408 | 439/387 |
| 6,193,545 B1 * | 2/2001 | Lee | H01R 12/675 | 439/497 |
| 6,220,874 B1 * | 4/2001 | Kurata | B60R 16/0207 | 439/76.2 |
| 6,232,557 B1 * | 5/2001 | Lounsbury | H01B 7/0823 | 174/117 F |
| 6,273,750 B1 * | 8/2001 | Malkowski, Jr. | H01R 25/164 | 439/499 |
| 6,280,242 B1 * | 8/2001 | Jochen | H01R 12/675 | 439/405 |
| 6,368,148 B1 * | 4/2002 | Fogg | H01R 12/675 | 439/405 |
| 6,443,755 B1 * | 9/2002 | Beukes | H01R 4/2433 | 439/402 |
| 6,447,329 B1 * | 9/2002 | Yang | H01R 12/675 | 439/492 |
| 6,487,091 B2 * | 11/2002 | Malkowski, Jr. | H02B 1/202 | 174/481 |
| 6,533,607 B2 * | 3/2003 | Jochen | H01R 12/675 | 439/405 |
| 6,638,100 B2 * | 10/2003 | Fogg | H01R 12/675 | 439/405 |
| 6,645,002 B1 * | 11/2003 | Lee | H01R 12/675 | 439/404 |

(56) References Cited

U.S. PATENT DOCUMENTS

| | | | | |
|---|---|---|---|---|
| 6,648,672 B1* | 11/2003 | Meinke | H01R 4/2433 | 439/380 |
| 6,716,055 B1* | 4/2004 | Echito | H01R 4/2404 | 439/417 |
| 6,721,184 B1* | 4/2004 | Lehmeier | H01R 12/67 | 174/363 |
| 6,743,042 B2* | 6/2004 | Kolle | H01R 4/2404 | 439/417 |
| 6,769,931 B2* | 8/2004 | Negishi | H01R 4/2433 | 439/402 |
| 6,827,600 B2* | 12/2004 | Negishi | H01R 4/2433 | 439/404 |
| 6,837,737 B2* | 1/2005 | Baier | H01R 12/616 | 439/402 |
| 6,848,933 B1* | 2/2005 | Delaney, III | H01R 4/2404 | 439/392 |
| 6,863,558 B2* | 3/2005 | Negishi | H01R 4/2433 | 439/404 |
| 7,179,101 B2* | 2/2007 | Murakami | H01R 4/2433 | 439/142 |
| 7,195,513 B1* | 3/2007 | Gherardini | F16L 3/1025 | 439/401 |
| 7,201,601 B2* | 4/2007 | Lappohn | H01R 4/2433 | 439/404 |
| 7,210,957 B2* | 5/2007 | Mrakovich | F21S 4/001 | 439/404 |
| 7,255,590 B2* | 8/2007 | Schremmer | H01R 12/675 | 439/404 |
| 7,273,389 B2* | 9/2007 | Hoppach | H01R 4/2404 | 439/275 |
| 7,351,092 B2* | 4/2008 | Tseng | F21V 21/002 | 439/418 |
| 7,445,488 B2* | 11/2008 | Feldmeier | H01R 4/2404 | 439/394 |
| 7,497,720 B2* | 3/2009 | Kathan | H01R 4/2404 | 439/404 |
| 7,611,374 B1* | 11/2009 | Chiu | H01R 4/2454 | 439/402 |
| 7,766,687 B2* | 8/2010 | Verjans | H01R 4/2433 | 439/395 |
| 8,192,223 B2* | 6/2012 | Bishop | H01R 4/2433 | 439/395 |
| 8,481,868 B2* | 7/2013 | Dennes | H01R 4/2433 | 174/549 |
| 8,602,658 B2* | 12/2013 | Hopmann | H01R 4/2404 | 166/380 |
| 8,622,765 B2* | 1/2014 | Sulzer | H01R 4/2454 | 439/402 |
| 8,684,762 B2* | 4/2014 | Levi | H01R 4/2408 | 174/50 |
| 8,827,738 B2* | 9/2014 | Lownds | H01R 4/2433 | 439/402 |
| 2004/0156198 A1* | 8/2004 | Chen | H01R 33/09 | 362/655 |
| 2005/0227529 A1* | 10/2005 | Mrakovich | H01R 4/2433 | 439/402 |
| 2009/0258532 A1* | 10/2009 | Beier | H01R 12/67 | 439/391 |
| 2010/0093206 A1* | 4/2010 | Chuen | H01R 4/2408 | 439/391 |
| 2016/0181775 A1* | 6/2016 | Kitamura | H01R 13/64 | 174/72 A |
| 2016/0190755 A1* | 6/2016 | Kitamura | H01R 13/506 | 439/11 |
| 2016/0197435 A1* | 7/2016 | Kitamura | H01R 13/5829 | 439/374 |
| 2016/0197438 A1* | 7/2016 | Kitamura | H01R 13/631 | 439/376 |
| 2016/0197460 A1* | 7/2016 | Kitamura | H01R 13/64 | 174/72 A |
| 2016/0197461 A1* | 7/2016 | Kitamura | H01R 24/20 | 174/72 A |

* cited by examiner

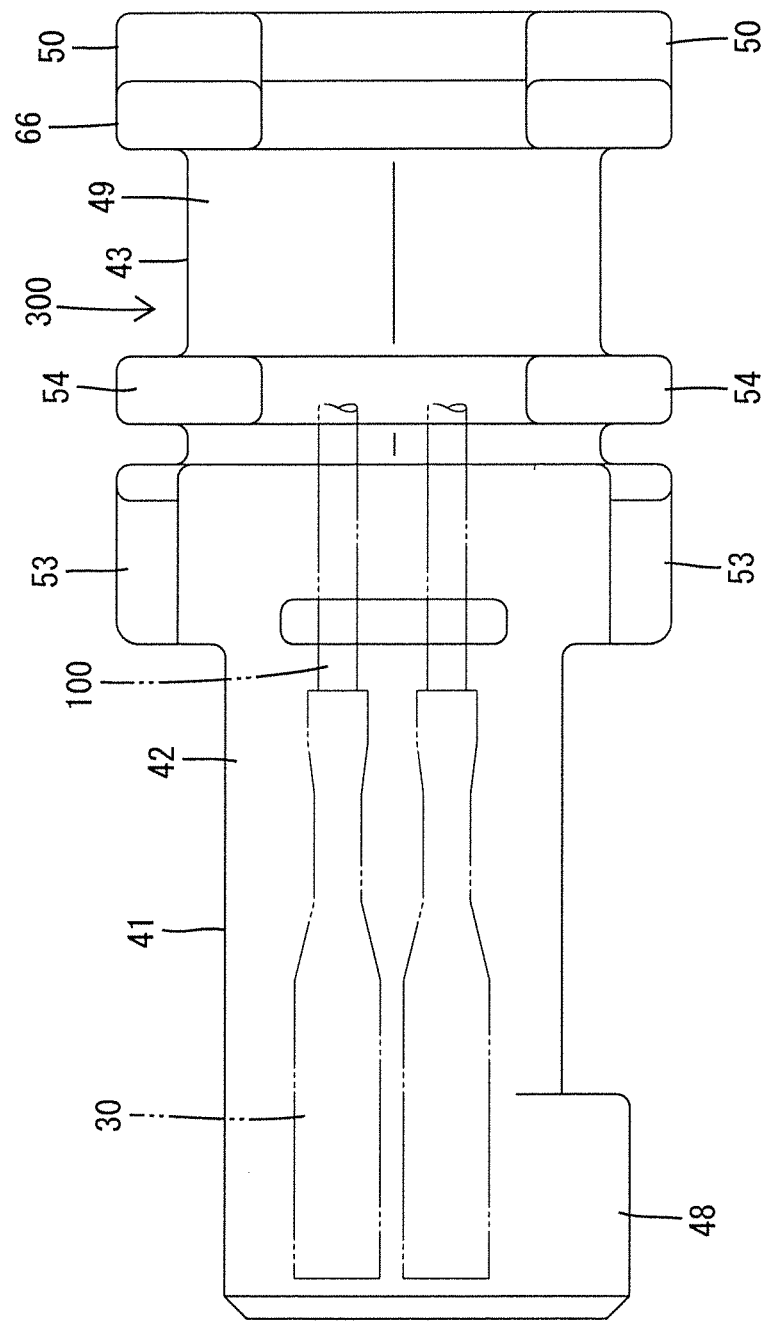

WIRE HARNESS AND CONNECTOR

BACKGROUND

1. Field of the Invention

The present invention relates to a wire harness and a connector.

2. Description of the Related Art

JP 2009-93860 A discloses an electrical wire cover which is mounted at the rear end of a connector. The electrical wire cover has an electrical wire housing portion. The electrical wire housing portion has a square box shape, and houses electrical wires extended out from the rear face of the connector. In addition, the electrical wire housing portion has electrical wire draw-out apertures opened in the upper, lower, right, and left faces of the electrical wire housing portion. Further, the electrical wire housing portion has opening/closing lids. The opening/closing lids are connected to the front edges of the electrical wire draw-out apertures, and can open and close the electrical wire draw-out apertures via hinges. In this case, while the opening/closing lids of three electrical wire draw-out apertures out of four electrical wire draw-out apertures are closed, the opening/closing lid of one electrical wire draw-out aperture is opened. Through the opened one electrical wire draw-out aperture, the electrical wires extended out from the connector are drawn out. Thus, the electrical wires are drawn out from the one electrical wire draw-out aperture of the electrical wire cover only in one direction.

By the way, assuming that the connector is aligned with other connectors in the direction intersecting the front-rear direction (the fitting direction), there are a plurality of counterpart connectors which are equal in number to that of the connectors. It is necessary to select out the corresponding counterpart connector into which each connector is fitted out of the plurality of the counterpart connectors, and it is difficult to find it. In addition, in the worst case, each connector can be erroneously fitted into the counterpart connector not corresponding thereto.

The present invention has been completed based on the above circumstance, and aims to smoothly perform the fitting work while preventing incorrect fitting of the connectors.

SUMMARY

The present invention is a wire harness including a plurality of connectors arranged in a line, each connector including a housing capable of fitting with a counterpart housing, wherein upon fitting of the housings, a front face of each housing is arranged so as to face a direction facing its counterpart housing, an aligning direction of the connectors is set to be a direction intersecting a front-rear direction, a through portion is provided in each housing, upon fitting of the housings, each connector is arranged at a position capable of facing its counterpart connector by an aligning member that is passed through the respective through portions, and a fitting work with the counterpart connectors is performed in a state where the connectors are supported by the aligning member.

Further, the present invention is a connector including a housing capable of fitting with a counterpart housing, wherein upon fitting of the housings, a front face of the housing is arranged so as to face a direction facing the counterpart housing, another connector is arranged with the connector in a line along a direction intersecting a front-rear direction, a through portion is provided in the housing, upon fitting of the housings, the connector is arranged, together with the other connector, at a position capable of facing its counterpart connector by an aligning member that is passed through the through portion, and a fitting work with the counterpart connector is performed, together with the other connector, in a state where the connector is supported by the aligning member.

ADVANTAGEOUS EFFECTS OF INVENTION

Since the connectors arranged in a line along the direction intersecting the front-rear direction are arranged at the positions capable of facing their counterpart connectors by the aligning member passed through the respective through portions, a correct fitting of the connectors with the counterpart connectors that are to be their fitting counterparts is ensured, and the situation in which the incorrect fitting occurs can be prevented. Further, since the connectors are fitted with their counterpart connectors precisely, smoothness and promptness of the fitting work can be ensured.

BRIEF DESCRIPTION OF DRAWINGS

FIG. 47 is a bottom view of a housing portion.

DETAILED DESCRIPTION

Figure 1:
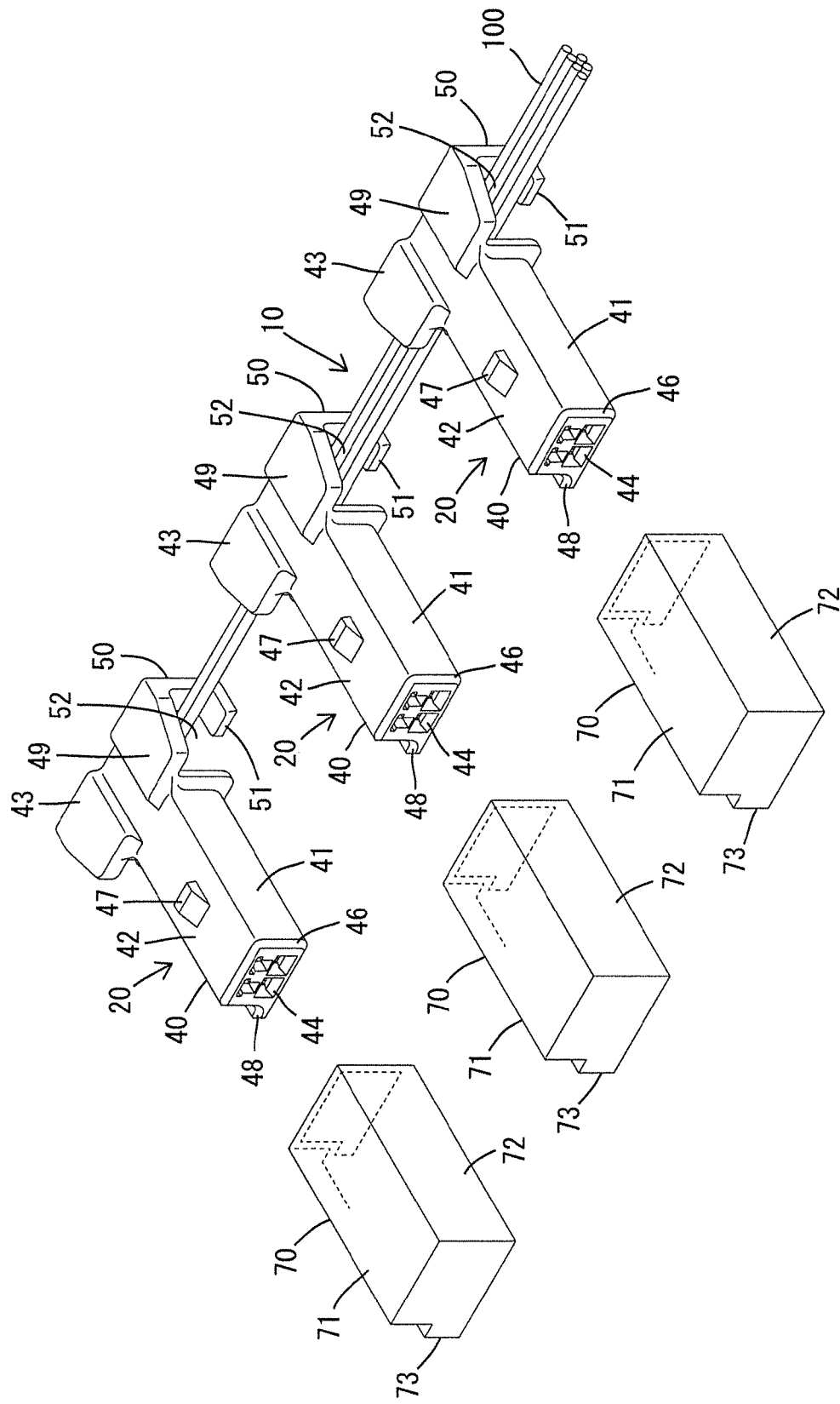
FIG. 1 is a perspective view illustrating a wire harness in Example 1 in a state where a plurality of connectors are aligned so as to face respective corresponding counterpart connectors.

Preferred embodiments of the present invention will be described hereinbelow.

The through portion may coaxially penetrate the housing in the direction intersecting the front-rear direction. Accordingly, the aligning member simply needs to be straight, a structure of the aligning member can be simplified, and cost can be suppressed low.

The aligning member may be configured of an electrical wire extending out from each connector. By the electrical wire serving also as the aligning member, a dedicated aligning member becomes unnecessary; thus the configuration can be simplified, and cost can be suppressed lower.

The through portion may be provided at a rear part of the housing by being partitioned into plural through portions, and the electrical wire as the aligning member may be passed at least through a through portion with a smallest opening area among the plural through portions. With small opening area for the through portion, the electrical wires can be arranged in the through portion in a state that their free movement is restricted even when the number of the electrical wires is small. Accordingly, the electrical wires can efficiently exhibit its shaft function as the aligning member. Further, since the electrical wires can be allocated to the respective through portions, arrangement spaces for the electrical wires can efficiently be secured.

The above wire harness may include: a main line in which a plurality of electrical wires is arranged in the direction intersecting the front-rear direction; and branching portions in each of which a part of the electrical wires of the main line is arranged by branching off in a direction intersecting an extending direction of the main line, wherein the connectors may be provided in the branching portions, and the electrical wires of the main line may be arranged in both directions intersecting the front-rear direction by being passed through both end openings of the through portions. Since the through portions are used as the passages for the main line, the arrangement efficiency of the electrical wires of the main line can be increased.

In the above connector, an operating opening for passing the electrical wire in the through portion may be provided in the housing, and the operating opening may be closed by a cover after the electrical wire is passed in the through portion. According to this, the work to pass the electrical wire in the through portion via the operating opening can be performed smoothly. Further, by the operating opening being closed by the cover, the electrical wire can surely be prevented from falling out from the through portion.

EXAMPLES

Wire harnesses in Examples illustrated in FIGS. 1, 5, 15, 19, 27, and 29 each have a main line 10, and a plurality of branching portions 20. In the main line 10, routed are a plurality of electrical wires 100 extended out in the axial direction (which is the routing direction of the electrical wires 100, and is the same as the direction intersecting the front-rear direction). The branching portions 20 are spaced from each other in the extending-out direction of the main line 10. In the branching portions 20, some of the electrical wires 100 in the main line 10 are routed to be branched in the direction intersecting the main line 10. The number of the electrical wires 100 in the main line 10 is reduced at each branching portion 20 from the base end side (the right side in FIG. 1) toward the distal end side (the left side in FIG. 1).

A terminal metal fitting 30 is connected to the end of each electrical wire 100 (see FIGS. 4 and 12), and is housed and held in a connector 40 corresponding thereto. A large connector, not illustrated, is provided at the base end of the main line 10. A small connector is provided at each of the distal end of the main line 10 and the branching portions 20. In the following description, unless otherwise specified, the connector 40 means the small connector.

As illustrated in FIG. 1, a plurality of connectors 40 and a plurality of counterpart connectors 70 are provided. The connectors 40 can be fitted into the respective corresponding counterpart connectors 70. The counterpart connectors 70 face the respective corresponding connectors 40. In Examples, each counterpart connector 70 is provided on the outer circumferential face of a cylindrical solenoid 200 (see FIG. 31). A plurality of solenoids 200 are mounted on a component configuring an automatic transmission, not illustrated, so as to be aligned in the direction intersecting the front-rear direction along the side edge of the component. The counterpart connectors 70 are aligned in the direction intersecting the front-rear direction so as to correspond to the solenoids 200.

Specifically, the counterpart connectors 70 each have a counterpart housing 71 made of a synthetic resin. As illustrated in FIG. 1, the counterpart housing 71 has a tubular hood 72. A counterpart terminal metal fitting, not illustrated, is projected into the hood 72. An expanding portion 73 is provided at the lower end of one side face of the hood 72 so as to be bulged sidewise. Each counterpart connector 70 has a common configuration in Examples 1 to 5 and 7 described below. Each connector 40 is configured in any one of Examples 1 to 7 described below. In Examples 1 to 7, portions which have common configurations or functions are indicated by the same names and reference numerals.

Example 1

FIGS. 1 to 4 illustrate Example 1. A connector 40 in Example 1 has a housing 41 made of a synthetic resin. The housing 41 has a housing body 42, and a guide 43. The housing body 42 has a square block shape elongated in the front-rear direction. The guide 43 has a bent plate shape, and is disposed rearward of the housing body 42.

Figure 3:
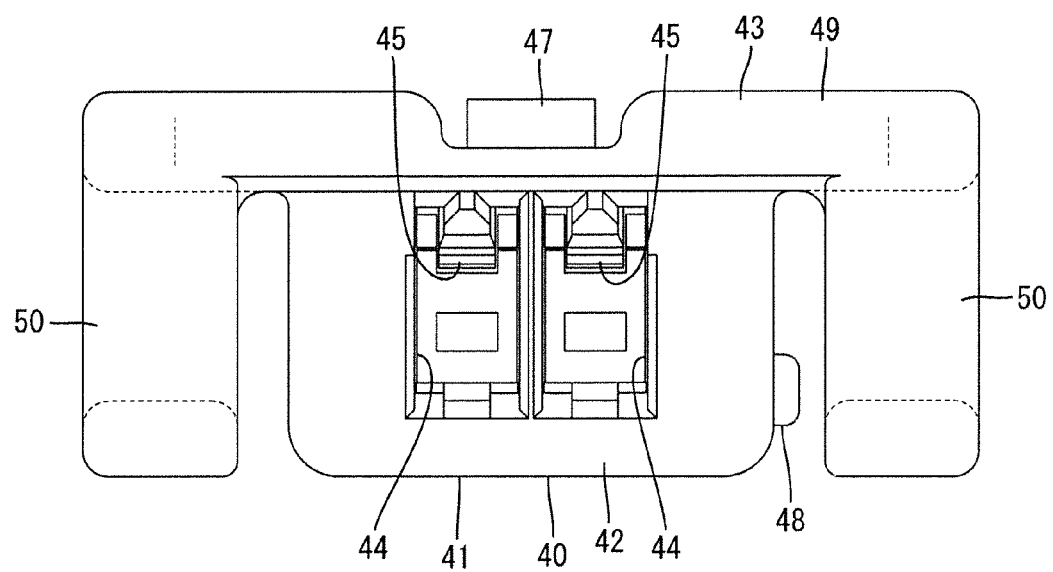
FIG. 3 is a rear view of a housing of the connector.
Figure 7:
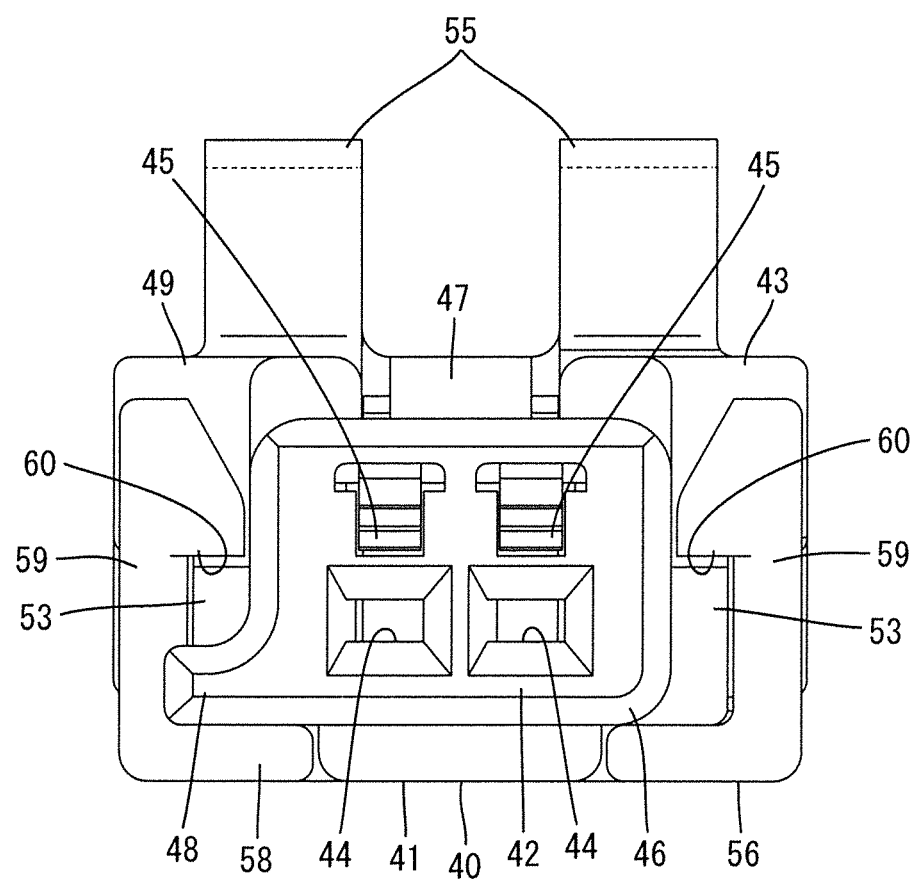
FIG. 7 is a front view of a housing of the connector.

The housing body 42 can be fitted into a hood 72 of a counterpart connector 70 from the front side. The housing body 42 is provided with a cavity 44 therein into which a terminal metal fitting 30 can be inserted from the rear side. A plurality of cavities 44 are aligned in the width direction. As illustrated in FIGS. 3 and 7, a lance 45 is projected from the upper face of the inner wall of each cavity 44. The terminal metal fitting 30 is regularly inserted into the cavity 44, and is resiliently engaged with the lance 45. Thus, the terminal metal fitting 30 is held in the cavity 44 so as not to fall off therefrom. An electrical wire 100 is connected to the terminal metal fitting 30 which is inserted into the cavity 44. The electrical wire 100 is extended out from the rear face of the housing body 42, and is inserted through a later-described through portion 52 of the guide 43.

Figure 2:
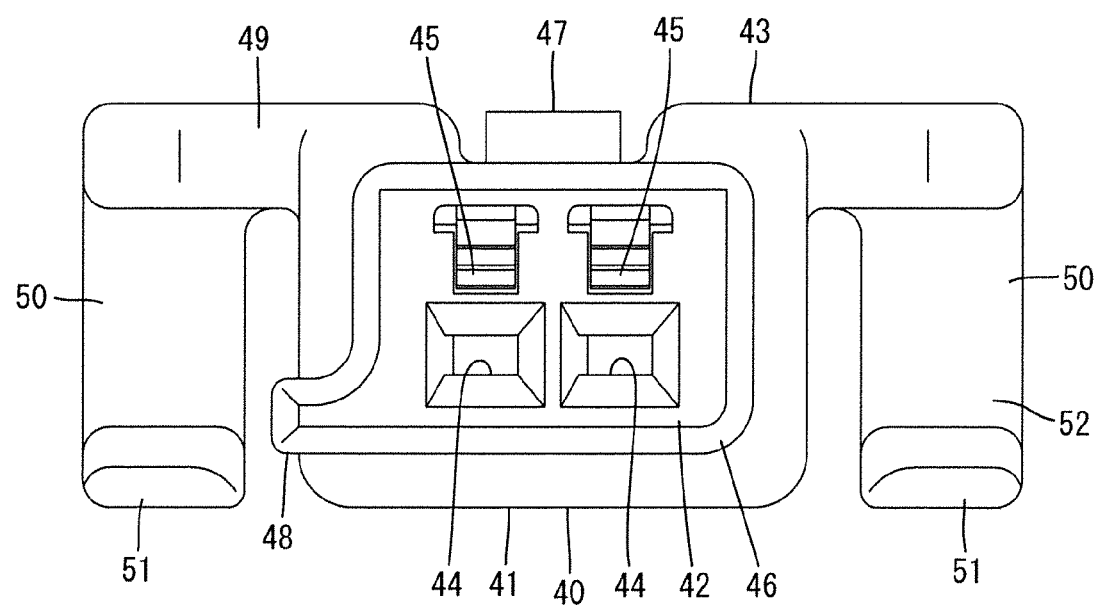
FIG. 2 is a front view of a housing of the connector.

As illustrated in FIG. 2, a tapered chamfered portion 46 is provided throughout the outer edge of the front face of the housing body 42. At fitting both the housings 41, 71, the housing body 42 is guided into the hood 72 along the chamfered portion 46.

A lock 47 is projected from the upper face of the housing body 42. The lock 47 is engaged with the counterpart housing 71, and holds both the housings 41, 71 in a fitted state at fitting both the housings 41, 71. A projection piece 48 is provided at the front end of the housing body 42 so as to be bulged sidewise from the lower end of one side face of the housing body 42. At fitting both the housings 41, 71, the projection piece 48 is inserted into an expanding portion 73 of the counterpart housing 71. At fitting both the housings 41, 71, if the housing body 42 is oriented in the direction reverse to its normal fitting direction, the projection piece 48 is abutted on the opening edge of the hood 72, and cannot be inserted into the expanding portion 73, thereby restricting the fitting operation of both the housings 41, 71. This can prevent the housing 41 oriented in the wrong fitting direction from being fitted into the counterpart housing 71.

As illustrated in FIGS. 1 and 2, the guide 43 has a base 49, a pair of arms 50, and a pair of hooking portions 51. The base 49 is connected integrally to the upper edge at the rear end of the housing body 42, and is projected rearward so as to be bulged to both sides in the width direction from the housing body 42. Both the arms 50 are projected downward from both ends in the width direction at the rear end of the base 49. Both the hooking portions 51 are projected forward from the lower ends of both the arms 50. In side view, the rear face of the housing body 42, the base 49, the arm 50, and the hooking portion 51 section a substantially rectangular opening portion. The substantially rectangular opening portion passes through the guide 43 in the width direction (the direction intersecting the front-rear direction) so as to be the through portion 52. The through portion 52 routes the electrical wire 100 extended out from the housing body 42, that is, the electrical wire 100 in a branching portion 20, and the electrical wire 100 in a main line 10. In this case, as illustrated in FIG. 1, the electrical wire 100 in the main line 10 is passed through the openings at both ends of the through portion 52 so as to be penetrated through the inside and outside of the guide 43 in the width direction, and is routed in two directions intersecting the front-rear direction.

The base 49 is thicker at both ends in the width direction than at the center in the width direction. The upper faces at both ends in the width direction of the base 49 are slightly higher than the upper face of the housing body 42. The center in the width direction of the base 49 is open for the rearward of the lock 47 so as to provide a die-cut passage for a die for molding the rear face of the lock 47. The upper face at the center in the width direction of the base 49 is flush and continuous with the upper face of the housing body 42.

Both the arms 50 have a strip plate shape, extend downward, are connected integrally and substantially perpendicularly to the base 49, and are substantially parallel with the rear face of the housing body 42. The lower ends of both the arms 50 are located at substantially the same height as the lower end of the housing body 42. As illustrated in FIG. 3, in rear view, both the arms 50 are not overlapped in the width direction with the housing body 42, and are paired on both sides in the width direction across the housing body 42.

Figure 4:
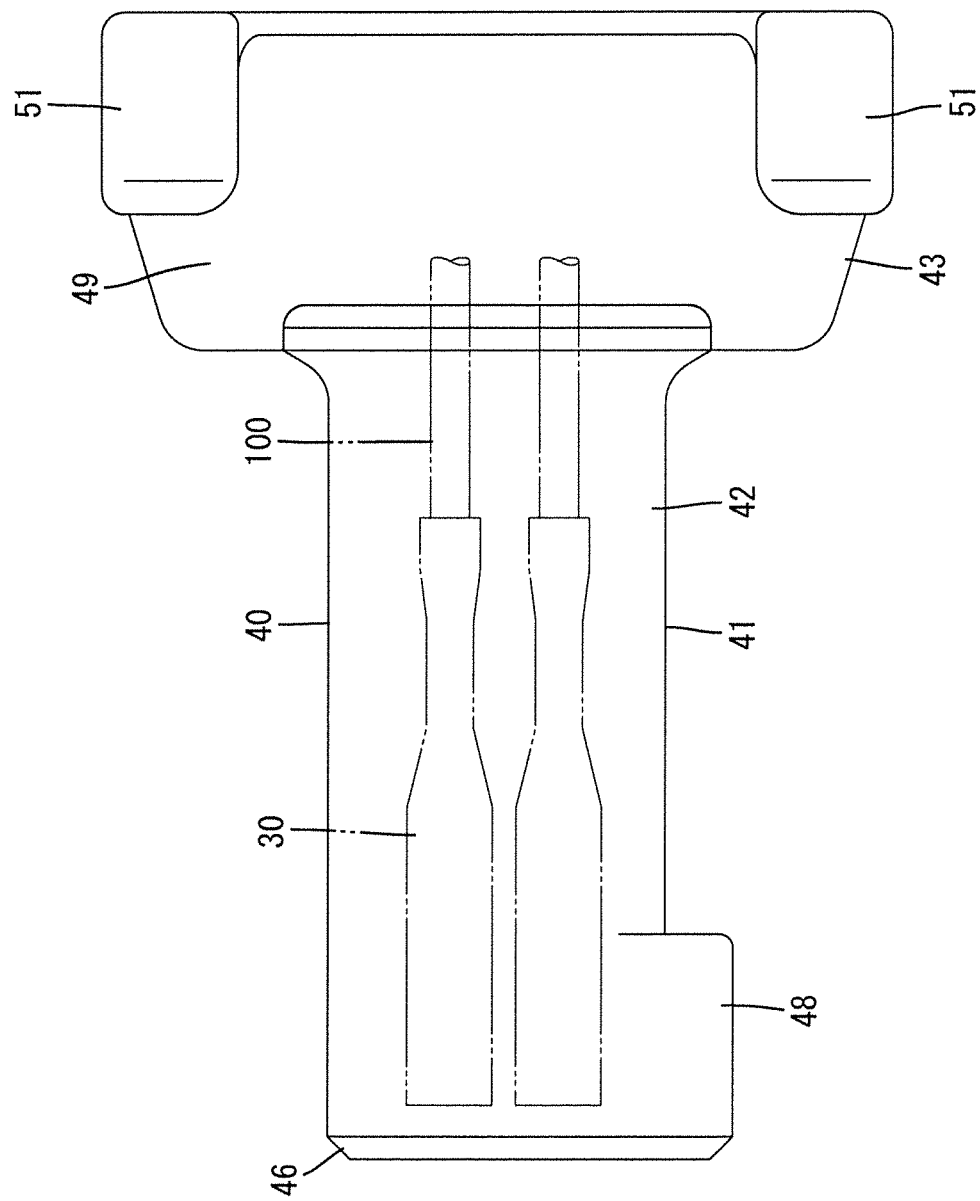
FIG. 4 is a bottom view of a housing of the connector.

Both the hooking portions 51 have substantially the same plate width and plate thickness as both the arms 50, and are projected forward (to the through portion 52 side) at a short length. Both the hooking portions 51 are connected integrally and substantially perpendicularly to both the arms 50, and are substantially parallel with the base 49. As illustrated in FIG. 4, the front ends of both the hooking portions 51 are away rearward from the rear face of the housing body 42 relative to the front-rear direction. The electrical wire 100 is inserted through the through portion 52 of the guide 43, is hooked onto the hooking portions 51, and is held in the through portion 52 so as not to fall off from the through portion 52.

The routing configuration of each electrical wire 100 inserted through the through portion 52 of the guide 43 will be described.

The electrical wire 100 extended out from the rear face of the housing body 42 is entered into the through portion 52 of the guide 43. The electrical wire 100 is bent substantially perpendicularly and substantially without being slacked while being corrected by the arms 50 sectioning the through portion 52. In that state, the electrical wire 100 is taken as the electrical wire 100 in the main line 10. The electrical wire 100 is penetrated through the through portions 52 of the guides 43 of other connectors 40 aligned in the direction intersecting the front-rear direction, and is routed in two directions intersecting the front-rear direction.

Seen from the main line 10 side, the electrical wire 100 in the main line 10 is penetrated through the through portions 52 of the guides 43 of the connectors 40 aligned in the direction intersecting the front-rear direction, and is substantially coaxial with the direction intersecting the front-rear direction. The electrical wire 100 is bent forward at its end substantially perpendicularly and substantially without being slacked when the electrical wire 100 is entered into the through portion 52 of the guide 43 of the connector 40 corresponding to the electrical wire 100, and is drawn into the housing body 42 of the connector 40 via the terminal metal fitting 30. In this case, since both the arms 50 are disposed outward of both sides in the width direction of the housing body 42, the rear side of the housing body 42 is open. Thus, the terminal metal fitting 30 can be inserted into the housing body 42 without any trouble.

The electrical wires 100 in the main line 10 are successively drawn into the respective corresponding connectors 40 as above. Thus, as illustrated in FIG. 1, a plurality of branching portions 20 are formed to be spaced from each other in the direction intersecting the front-rear direction.

In the routing configuration of the electrical wires 100, the electrical wires 100 in the main line 10 extended out from other connectors 40 are penetrated through the through portions 52 of the guides 43 of the connectors 40 in the respective corresponding branching portions 20, and are routed in two directions intersecting the front-rear direction. In this case, the electrical wires 100 in the main line 10 have rigidity and shape holdability to some extent, and thus exhibit a shaft function which can maintain the straightness of the main line 10. That is, the electrical wires 100 have rigidity which can maintain the electrical wires 100 so that the electrical wires 100 are extended out straightly along the width direction intersecting the front-rear direction. Thus, the connectors 40 are substantially shaft-supported by the electrical wires 100 in the main line 10, and can be prevented from being displaced from the respective corresponding counterpart connectors 70 in the direction intersecting the front-rear direction.

By the shaft function of the electrical wires 100 in the main line 10, the connectors 40 in the branching portions 20 are substantially aligned at predetermined intervals in the direction intersecting the front-rear direction. The front faces (the fitting faces) of the housing bodies 42 of the connectors 40 face the respective corresponding counterpart connectors 70 in the same aligned manner. From this state, the connectors 40 can be fitted into the respective corresponding counterpart connectors 70 smoothly and immediately.

Example 2

FIGS. 5 to 14 illustrate Example 2. Like Example 1, a connector 40 in Example 2 has a housing 41 made of a synthetic resin. The housing 41 has a housing body 42, and a guide 43. The housing body 42 has a square block shape, and can house a terminal metal fitting 30. The guide 43 has a bent plate shape, and can insert an electrical wire 100.

Figure 6:
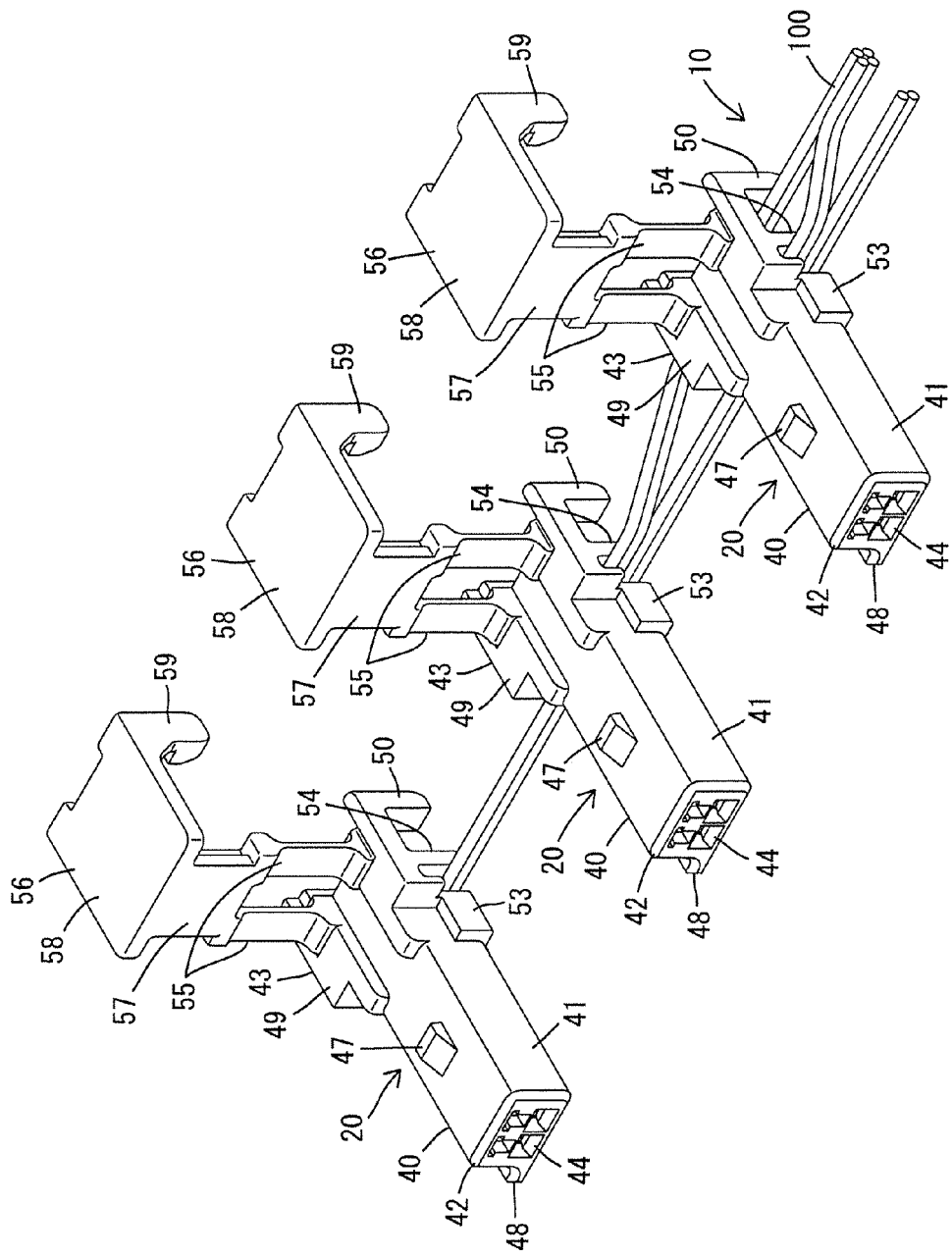
FIG. 6 is a perspective view illustrating a state where covers of the connectors are opened and electrical wires are routed.

As illustrated in FIGS. 6 and 7, a pair of cover lock receiving portions 53 are projected from the lower portions at the rear ends of both side faces of the housing body 42. Both the cover lock receiving portions 53 are flat, are projected rectangularly in side view, and can be engaged with later-described cover locks 59 of a cover 56 provided in the guide 43. Other configuration of the housing body 42 is the same as Example 1, and will not be described.

Figure 5:
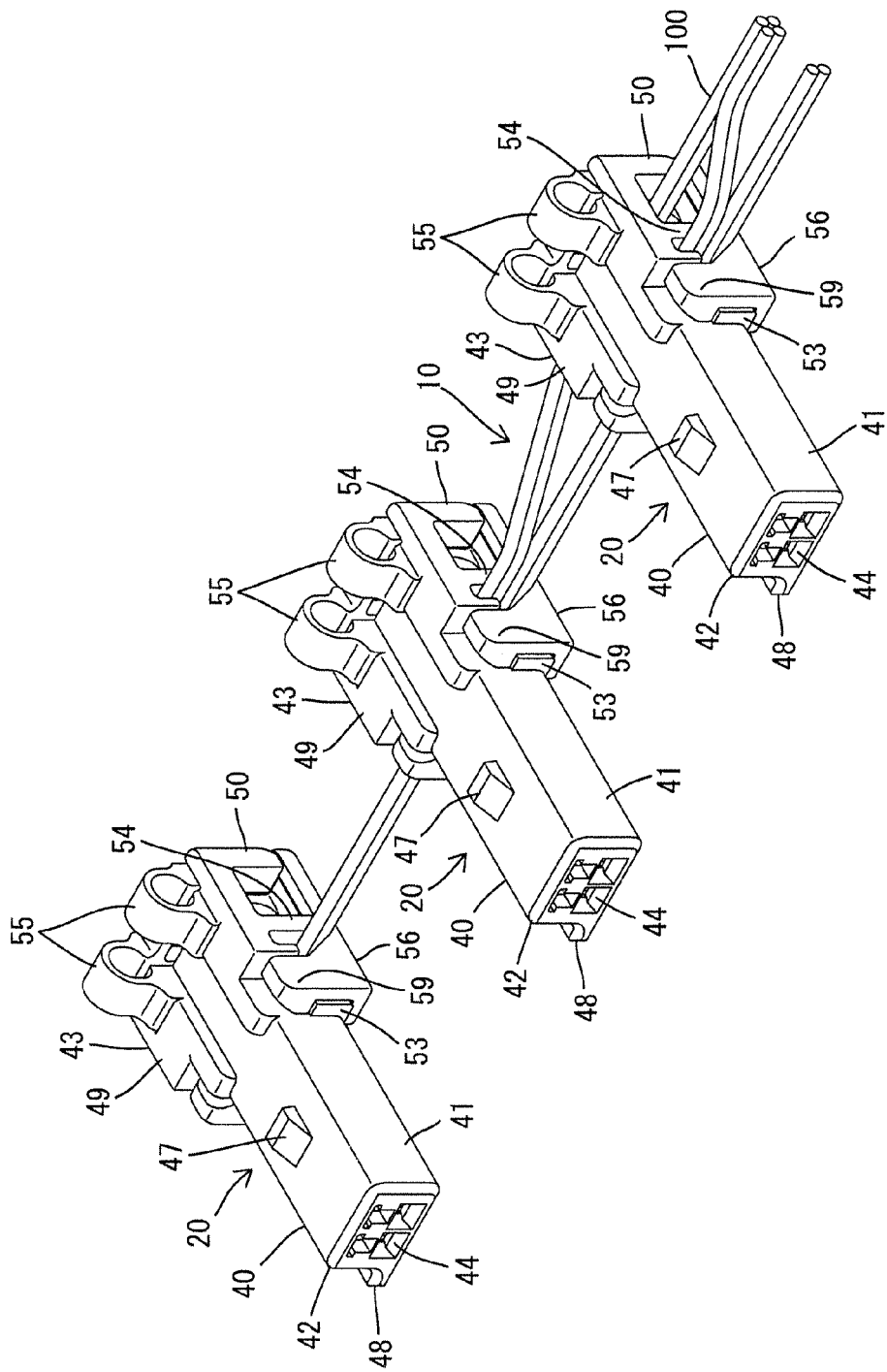
FIG. 5 is a perspective view illustrating a wire harness in Example 2 in a state where a plurality of connectors are aligned.
Figure 10:
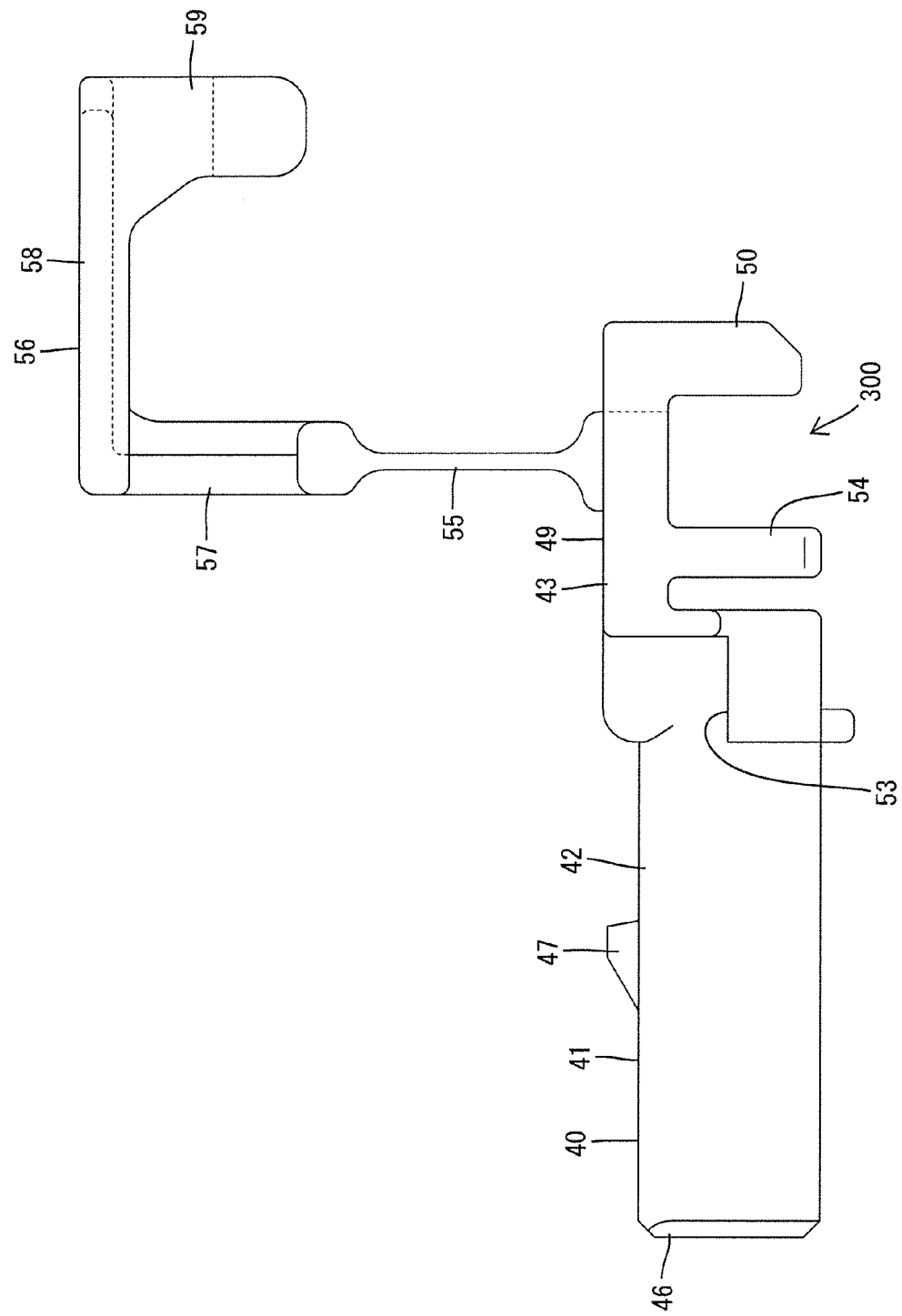
FIG. 10 is a side view of the housing when the cover is opened.

As illustrated in FIGS. 5 and 10, the guide 43 has a base 49, a pair of partitioning portions 54, a pair of arms 50, a pair of hinges 55, and the cover 56. The base 49 is connected integrally to the upper edge at the rear end of the housing body 42, and is projected rearward so as to be bulged to both sides in the width direction from the housing body 42. Both the partitioning portions 54 are projected downward from both ends in the width direction on the front end side of the base 49. Both the arms 50 are projected downward from both side portions in the width direction at the rear end of the base 49. Both the hinges 55 have a belt shape, are flexible, and are connected integrally to both sides in the width direction of the upper face of the base 49. The cover 56 is connected integrally to the ends of both the hinges 55, and can be turned to be opened and closed about the hinges 55. The guide 43 has a lower face opening located between the housing body 42 and the guide 43 and facing the base 49. The lower face opening is an operating opening 300 for inserting the electrical wire 100 through a later-described through portion 52.

Figure 12:
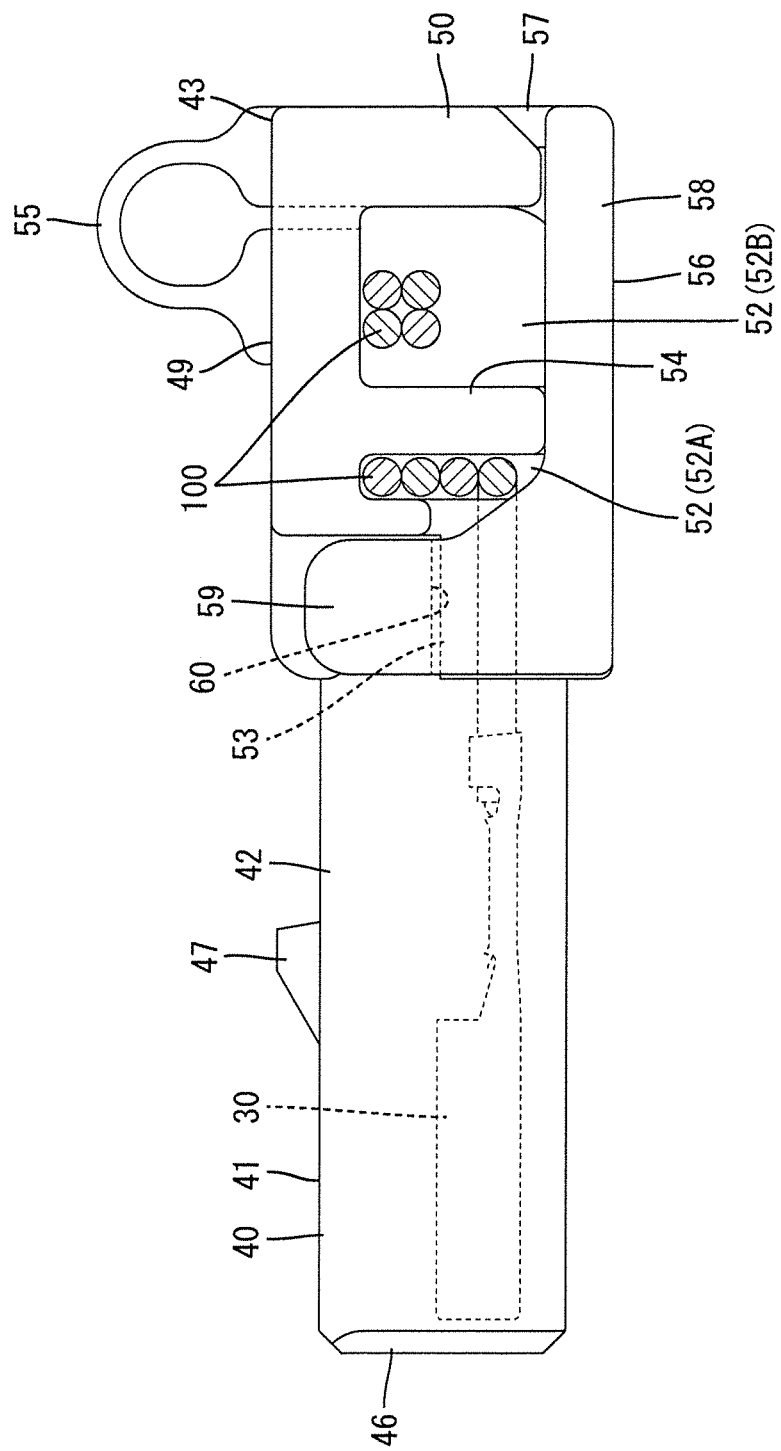
FIG. 12 is a side view illustrating the arranged state of the electrical wires passed through the through portions, in the connector configuring the wire harness in Example 2-1.

Like Example 1, the base 49 is thicker at both ends in the width direction than at the center in the width direction. Both the hinges 55 are connected integrally to both ends in the width direction at the rear end of the upper face of the thicker base 49. As illustrated in FIG. 10, when the cover 56 is opened, both the hinges 55 are erected straightly from the upper face of the base 49. As illustrated in FIG. 12, when the cover 56 is closed, both the hinges 55 are disposed on the upper face of the base 49 so as to be bent in a substantially circular shape.

As illustrated in FIG. 10, the partitioning portion 54 and the arm 50 are connected integrally and substantially perpendicularly to the base 49, and in side view, are aligned in the front-rear direction. In rear view, both the partitioning portions 54 and both the arms 50 are overlapped in the width direction with both the cover lock receiving portions 53, but are not overlapped in the width direction with the rear face portion of the housing body 42, except for both the cover lock receiving portions 53.

Figure 8:
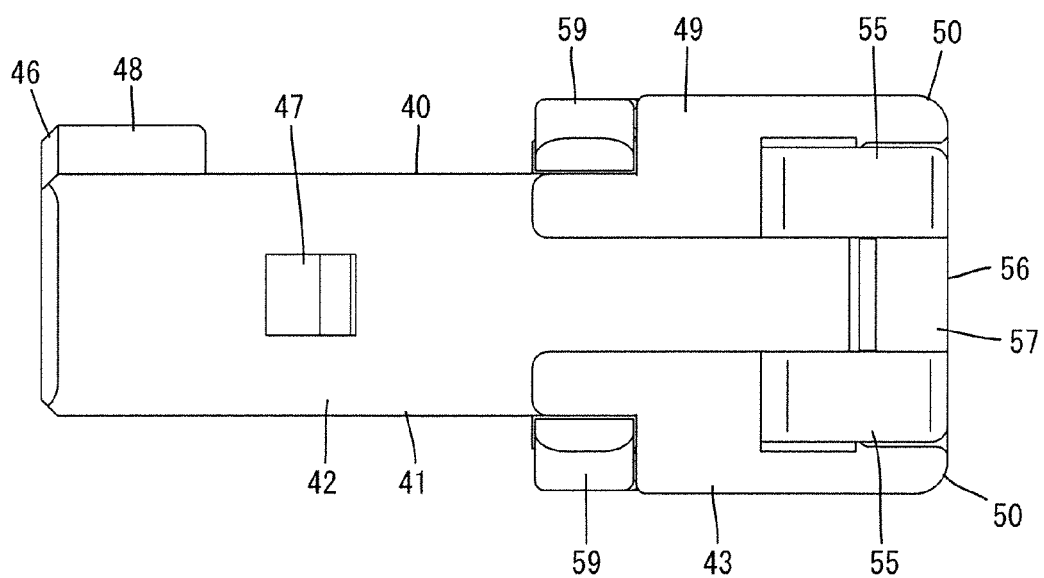
FIG. 8 is a plan view of a housing of the connector.

As illustrated in FIG. 12, the partitioning portion 54 is disposed toward the rear face of the housing body 42 relative to the front-rear direction. In side view, while the opening dimension between the partitioning portion 54 and the rear face of the housing body 42 is equal to or slightly larger than the diameter dimension of one electrical wire 100, the opening dimension between the partitioning portion 54 and the arm 50 is larger than the diameter dimensions of a plurality of electrical wires 100. As illustrated in FIG. 8, both the arms 50 are projected rearward from the rear end of the base 49 by the substantial front-rear dimension thereof. A later-described connecting portion 57 of the cover 56 can be fitted into the facing space in the width direction of both the arms 50.

Figure 9:
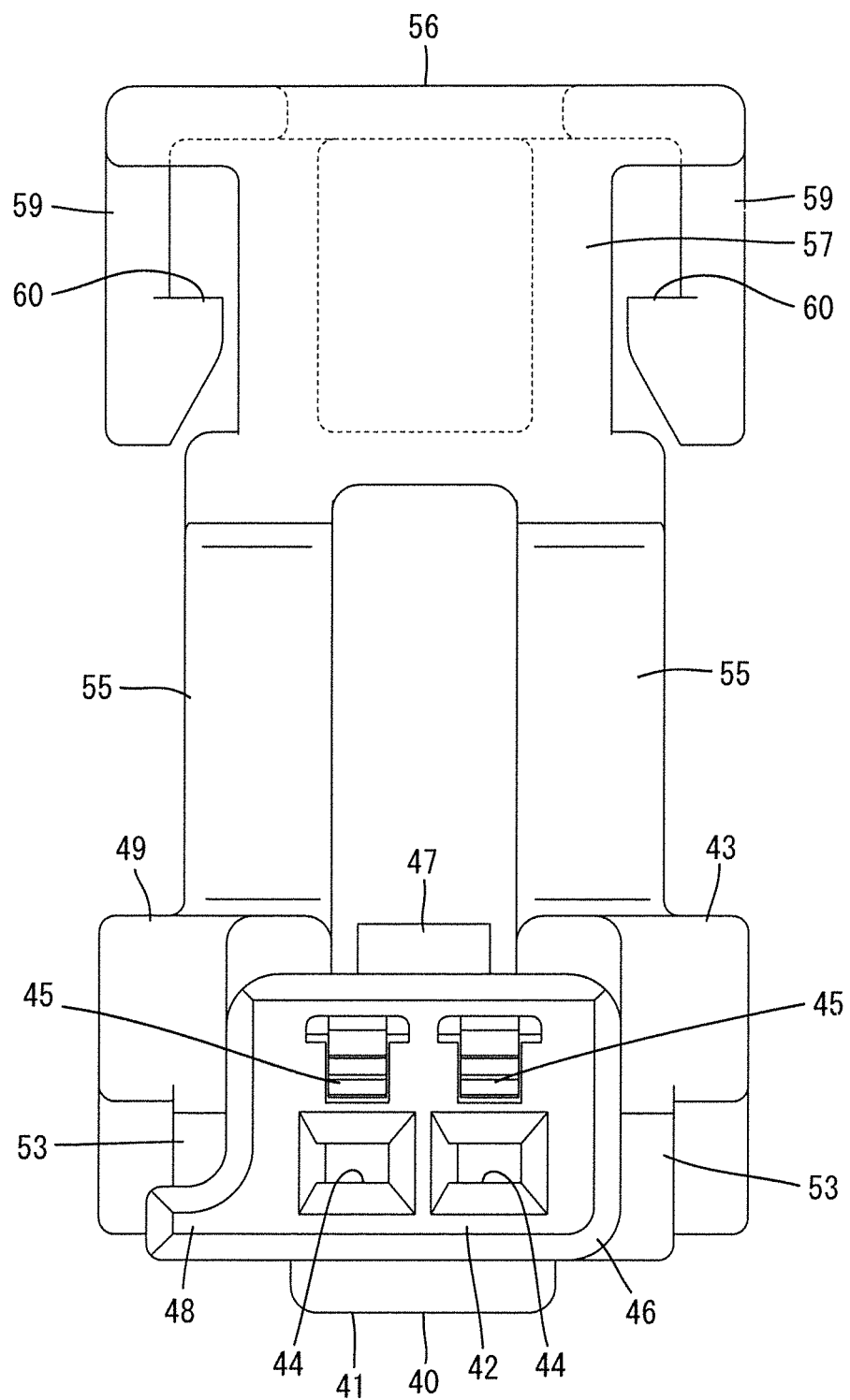
FIG. 9 is a front view of the housing when the cover is opened.

As illustrated in FIGS. 6 and 10, the cover 56 has the connecting portion 57, a facing base 58, and a pair of cover locks 59. The connecting portion 57 has a plate shape, is connected integrally to the ends of both the hinges 55, and is erected to be continuous with both the hinges 55 when the cover 56 is opened. The facing base 58 has a plate shape, is connected integrally and substantially perpendicularly to the end of the connecting portion 57, faces the base 49 when the cover 56 is closed, and has a surface area equal to or larger than the base 49. Both the cover locks 59 are connected integrally and substantially perpendicularly to both ends in the width direction at the end of the facing base 58, and are resiliently engaged with the cover lock receiving portions 53 when the cover 56 is closed. Both the cover locks 59 have a strip plate shape, and are flexible, with the connecting positions of the cover locks 59 to the facing base 58 as support points. As illustrated in FIGS. 7 and 9, pawl-shaped engaging projections 60 are provided at the ends of both the cover locks 59, and are projected inward.

As illustrated in FIG. 7, both the cover locks 59 of the closed cover 56 are resiliently engaged with both the cover lock receiving portions 53 of the housing body 42, so that the operating opening 300 is closed. As illustrated in FIG. 12, the through portion 52 is defined between the rear face of the housing body 42 and the cover 56, and passes through the housing 41 in the width direction (the direction intersecting the front-rear direction). As illustrated in FIG. 12, in side view, the defined through portion 52 is closed throughout its periphery by the housing body 42, the base 49, the arm 50, the partitioning portion 54, and the facing base 58, and is separated into two chambers via the partitioning portion 54. Specifically, in side view, the through portion 52 has a first through portion 52A, and a second through portion 52B. The first through portion 52A is defined between the rear face of the housing body 42 and the partitioning portion 54, and has a narrow opening dimension. The second through portion 52B is defined between the partitioning portion 54 and the arm 50, and has a wide opening dimension. In the first through portion 52A, a plurality of electrical wires 100 are densely arranged in the height direction in a vertical row. In the second through portion 52B, a plurality of electrical wires 100 are arranged in the height direction and in the front-rear direction in a substantially interspersed manner. In particular, in the first through portion 52A, both ends in the diameter direction of each electrical wire 100 can be abutted on the rear face of the housing body 42 and both the partitioning portions 54. Thus, the electrical wires 100 are held so that the free movement of the electrical wires 100 in the front-rear direction is restricted.

The routing configuration of each electrical wire 100 inserted through the through portion 52 of the guide 43 will be described.

When the electrical wire 100 is inserted through the through portion 52 of the guide 43, the cover 56 is opened via both the hinges 55 to open the rear side of the housing body 42. The electrical wire 100 in the main line 10 to be branched to a branching portion 20 is separated. The separated electrical wire 100 is passed from the operating opening 300 through the first through portion 52A, and is inserted into a cavity 44 of the housing body 42 via the terminal metal fitting 30 from the rear side. In this case, the extending length of the separated electrical wire 100 is shorter than that of the electrical wire 100 in the main line 10 so that its end faces the corresponding branching portion 20. As illustrated in FIG. 6, the electrical wire 100 remaining in the main line 10 out of the electrical wires 100 in the main line 10 is passed from the operating opening 300 through the second through portion 52B, and is drawn out in two directions intersecting the front-rear direction through the openings at both ends of the second through portion 52B.

Then, the cover 56 is turned via both the hinges 55 so as to be closed. The connecting portion 57 is fitted into the facing space of both the arms 50 to close the rear face of the housing 41. The facing base 58 faces the base 49 across the through portion 52 to close the bottom face of the housing 41. The engaging projections 60 of both the cover locks 59 are resiliently engaged with both the cover lock receiving portions 53, so that the cover 56 is held closed relative to the housing body 42. Since the cover 56 is held closed, each electrical wire 100 is maintained to be passed through the through portion 52.

In the above case, a plurality of electrical wires 100 are densely arranged in the first through portion 52A so that the free movement of the electrical wires 100 is restricted, and thus provide a shaft. Thus, the connectors 40 can be prevented from swinging in the direction intersecting the front-rear direction. As a result, the connectors 40 can be fitted into the respective corresponding counterpart connectors 70 smoothly and immediately in a state where the connectors 40 face the respective corresponding counterpart connectors 70. In particular, since the first through portions 52A are close to the housing bodies 42, the shaft function of the electrical wires 100 passed through the first through portions 52A can reliably prevent the connectors 40 from swinging.

In Example 2, as the specific routing configuration of the electrical wires 100, any one of Examples 2-1 and 2-2 below can be selected.

Example 2-1

Figure 11:
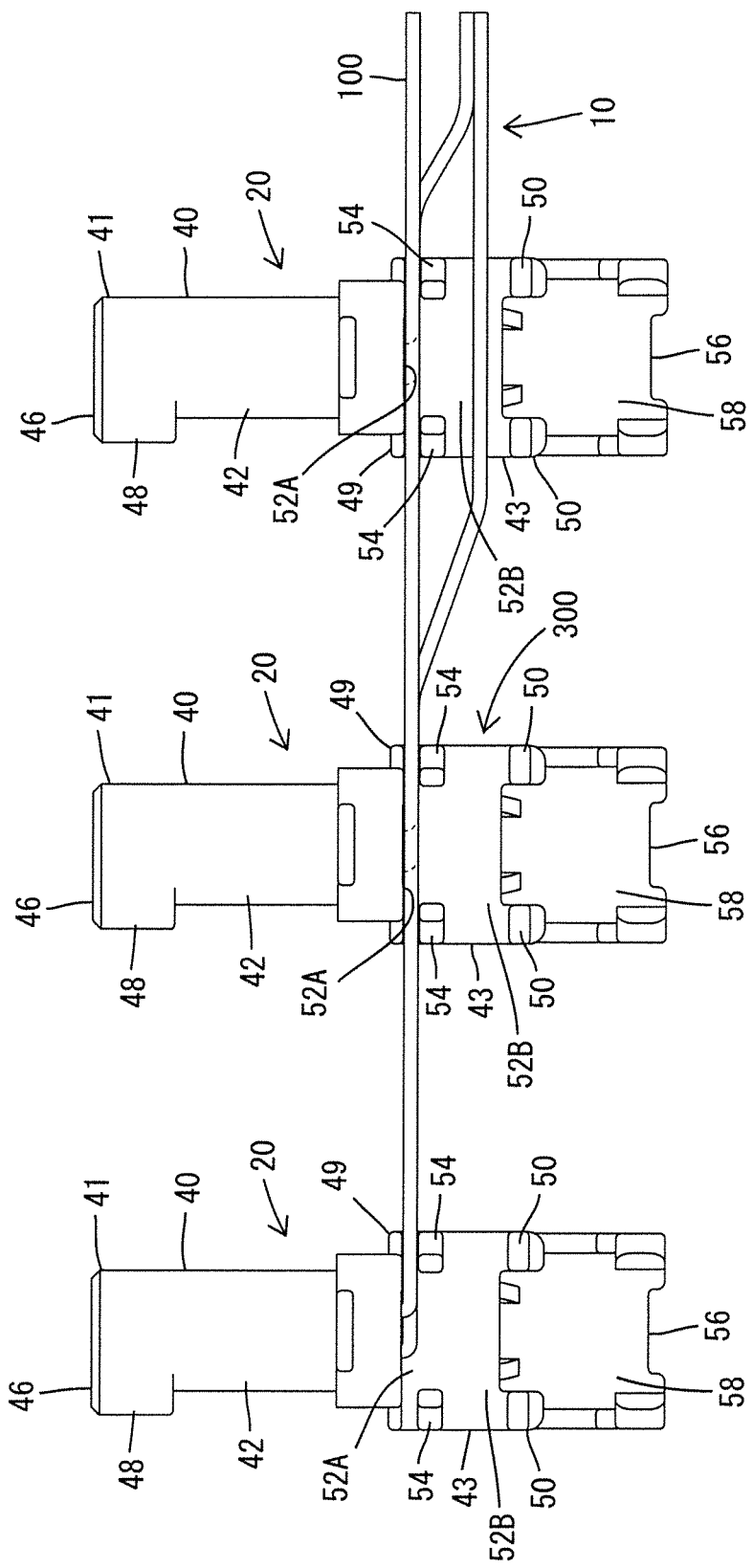
FIG. 11 is a bottom view illustrating the routing configuration of the electrical wires when the covers are opened, in a wire harness in Example 2-1.

As illustrated in FIG. 11, in the left connector 40 in the branching portion 20 branched on the distal end side of the main line 10, all the electrical wires 100 extended out from the housing body 42 are inserted through the first through portion 52A, and no electrical wires 100 are inserted through the second through portion 52B which is then empty. In the center connector 40 in the branching portion 20 adjacent to the left connector 40, all the electrical wires 100 extended out from the housing body 42 are inserted through the first through portion 52A, all the electrical wires 100 extended out from the left connector 40 are inserted through the first through portion 52A, and no electrical wires 100 are inserted through the second through portion 52B which is then empty. In the right connector 40 in the branching portion 20 on the right side of the center connector 40, all the electrical wires 100 extended out from the housing body 42 are inserted through the first through portion 52A, all the electrical wires 100 extended out from the left connector 40 are inserted through the first through portion 52A, and all the electrical wires 100 extended out from the center connector 40 are inserted through the second through portion 52B. In this way, in Example 2-1, through the first through portion 52A of the connector 40, inserted are the electrical wires 100 extended out from the left connector 40 and the electrical wires 100 extended out from the housing body 42 (the electrical wires 100 in the branching portion 20). Through the second through portion 52B of the connector 40, inserted are the electrical wires 100 extended out from the connector 40 in the adjacent branching portion 20 (the electrical wires 100 in the main line 10).

Example 2-2

Figure 13:
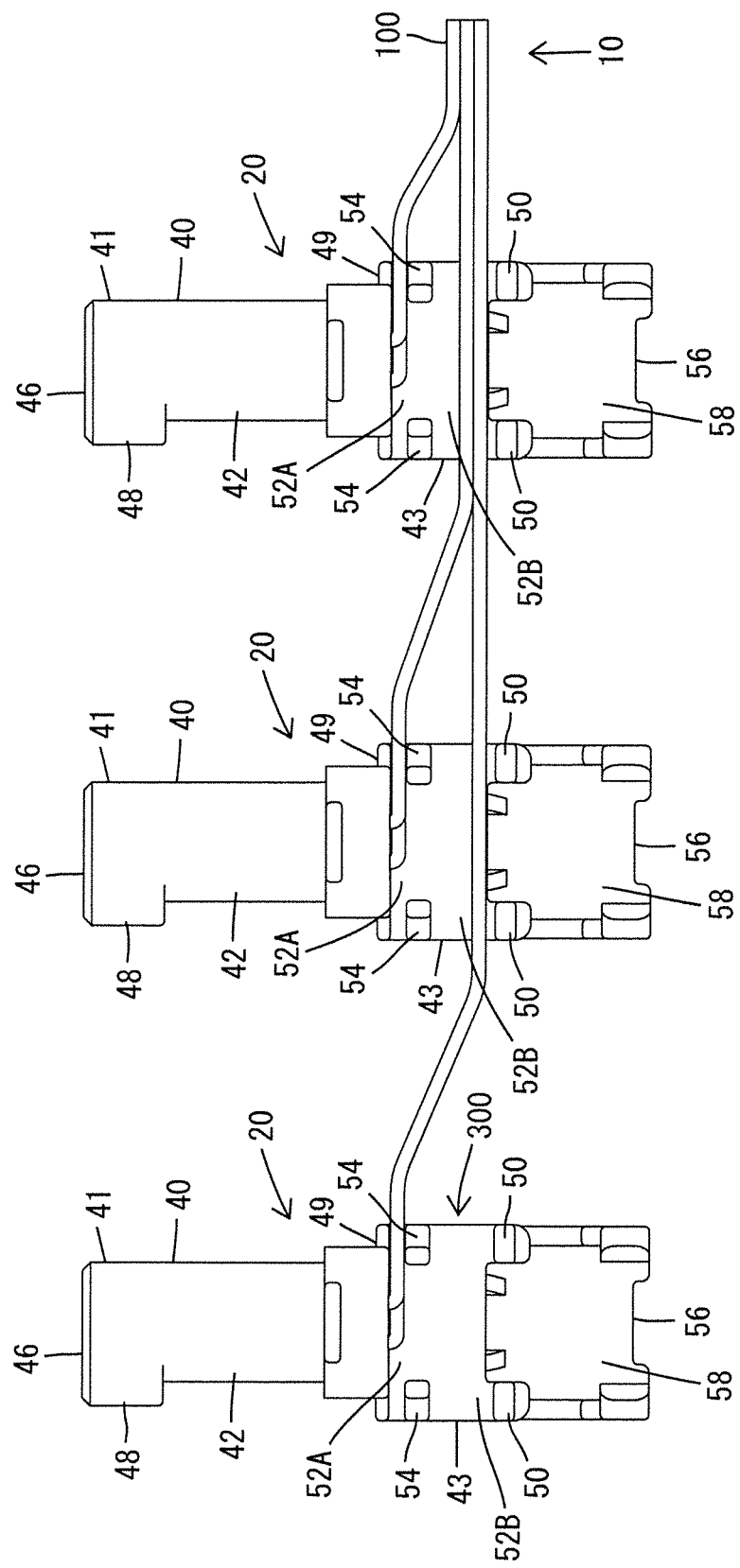
FIG. 13 is a bottom view illustrating the routing configuration of the electrical wires when the covers are opened, in a wire harness in Example 2-2.
Figure 14:
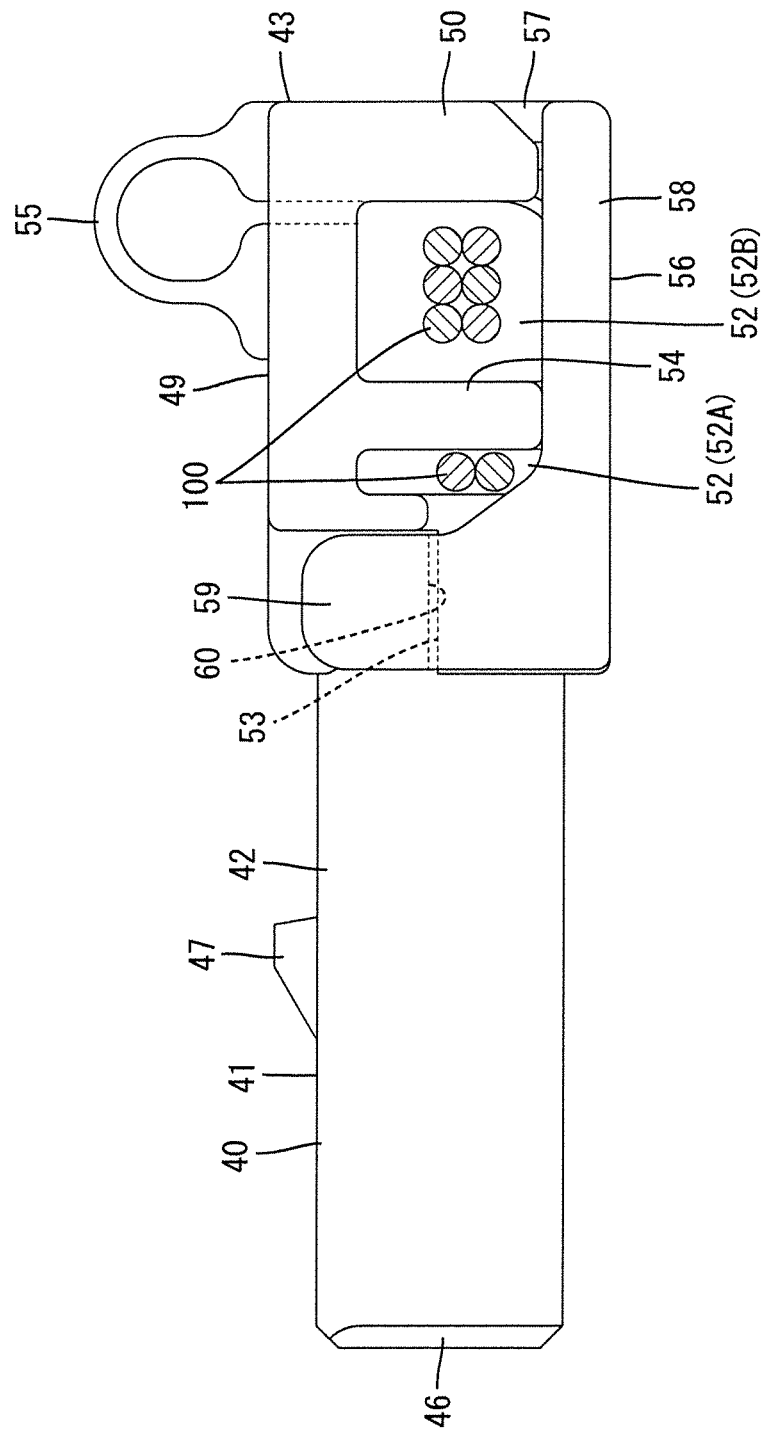
FIG. 14 is a side view illustrating the arranged state of the electrical wires passed through the through portions, in the connector configuring the wire harness in Example 2-2.
Figure 15:
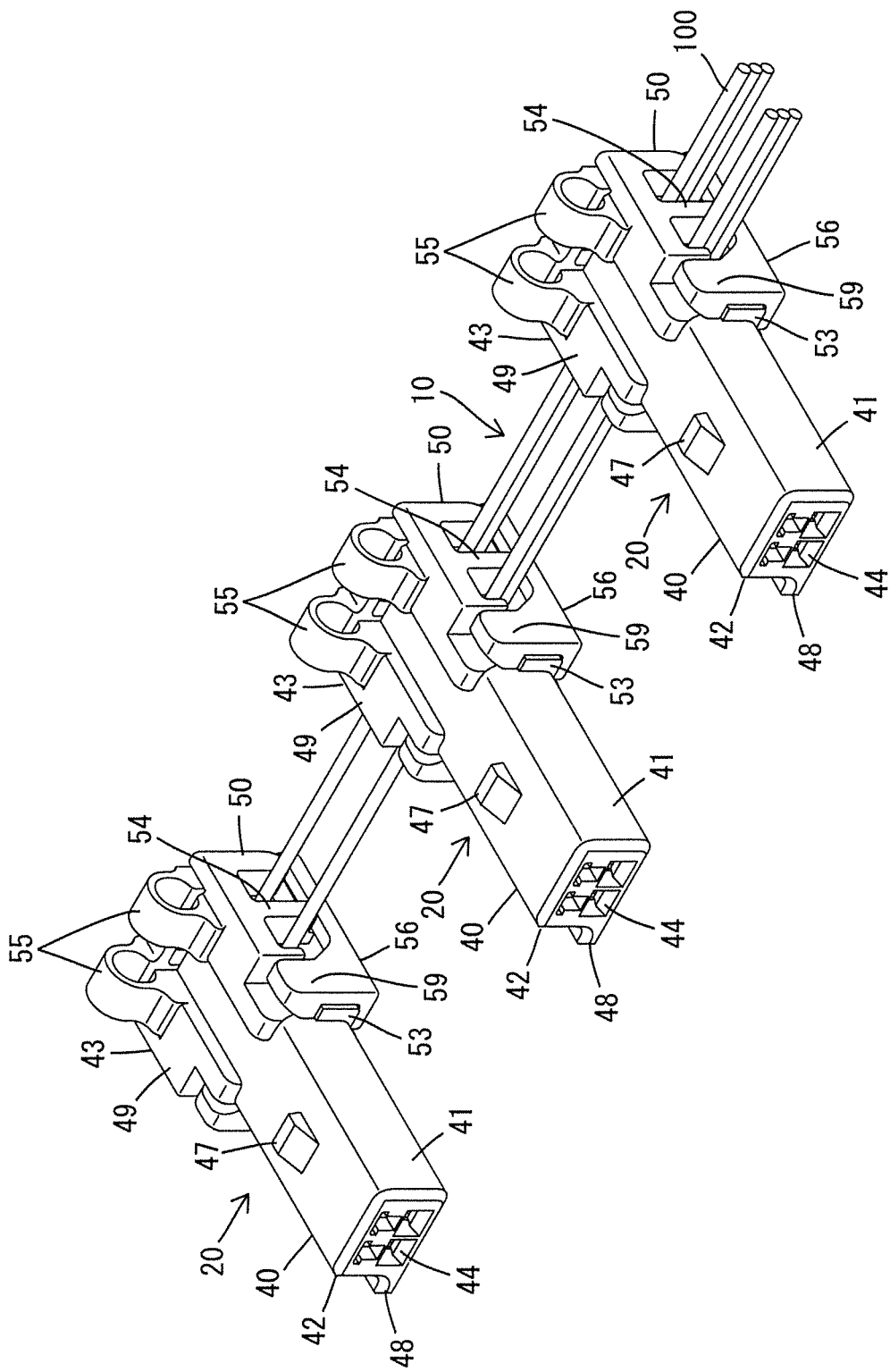
FIG. 15 is a perspective view illustrating a wire harness in Example 3 in a state where a plurality of connectors are aligned.
Figure 16:
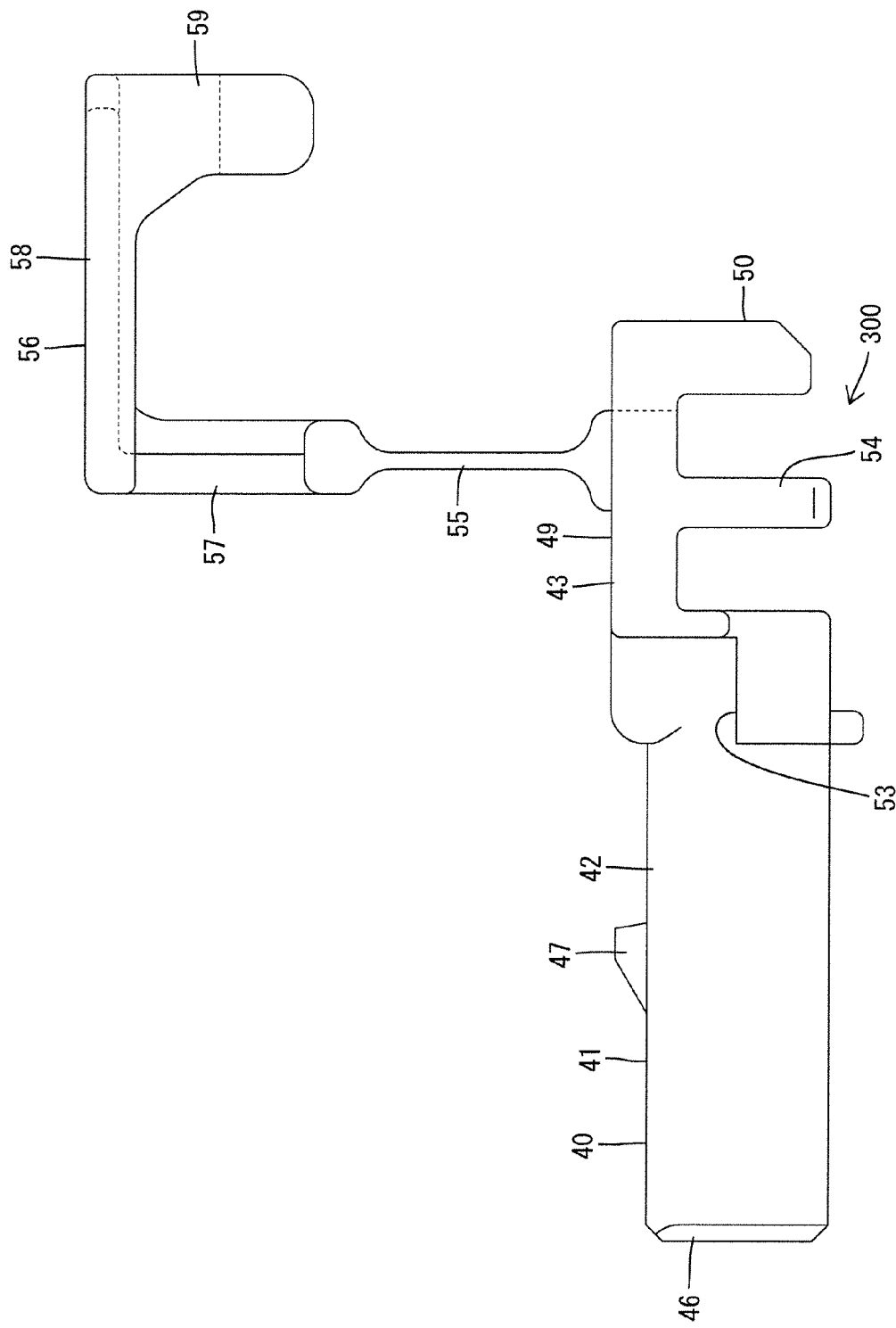
FIG. 16 is a side view of a housing when a cover is opened.

As illustrated in FIG. 13, in the left connector 40 in the branching portion 20 branched on the distal end side of the main line 10, all the electrical wires 100 extended out from its own housing body 42 are inserted through the first through portion 52A, and no electrical wires 100 are inserted through the second through portion 52B which is then empty. In the center connector 40 in the branching portion 20 adjacent to the left connector 40, all the electrical wires 100 extended out from its own the housing body 42 are inserted through the first through portion 52A, and all the electrical wires 100 extended out from the left connector 40 are inserted through the second through portion 52B. In the right connector 40 in the branching portion 20 on the right side of the center connector 40, all the electrical wires 100 extended out from its own housing body 42 are inserted through the first through portion 52A, and all the electrical wires 100 extended out from the left connector 40 and all the electrical wires 100 extended out from the center connector 40 are inserted through the second through portion 52B. In this way, in Example 2-2, through the first through portion 52A of the connector 40, inserted are the electrical wires 100 extended out from the housing body 42 (the electrical wires 100 in the branching portion 20). Through the second through portion 52B of the connector 40, inserted are the electrical wires 100 extended out from other connectors 40 (the electrical wires 100 in the main line 10).

Example 3

FIGS. 15 to 18 illustrate Example 3. Like Examples 1 and 2, a connector 40 in Example 3 has a housing 41 made of a synthetic resin. The housing 41 has a housing body 42, and a guide 43. The housing body 42 has a square block shape, and can house a terminal metal fitting 30. The guide 43 has a bent plate shape, and can insert an electrical wire 100.

The housing body 42 is the same as Example 2. A pair of cover lock receiving portions 53 are projected from the lower portions at the rear ends of both side faces of the housing body 42.

Figure 18:
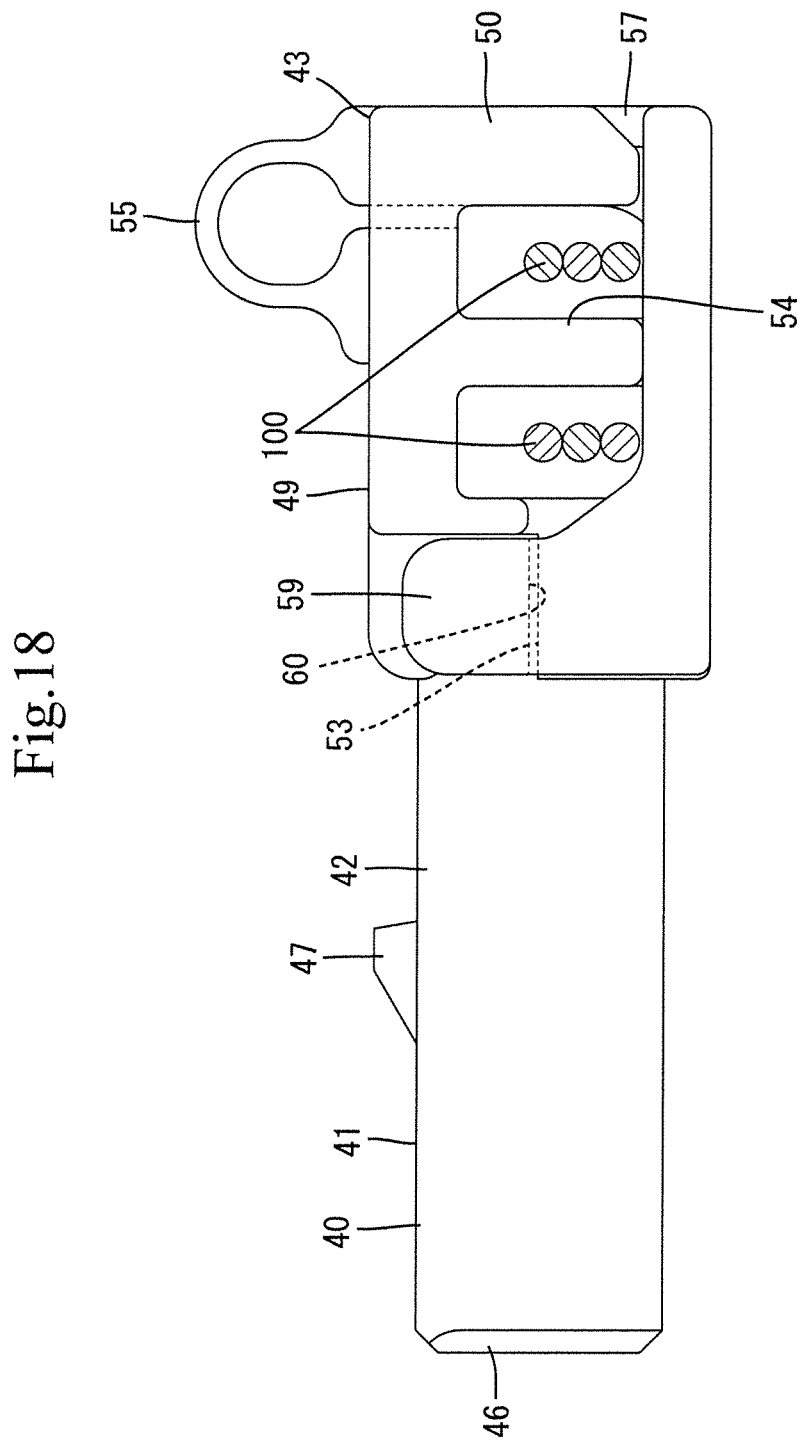
FIG. 18 is a side view illustrating the arranged state of the electrical wires passed through the through portions, in the connector configuring the wire harness in Example 3.

The guide 43 is the same as Example 2, and has a base 49, a pair of partitioning portions 54, a pair of arms 50, a pair of hinges 55, and a cover 56. However, in Example 3, as illustrated in FIG. 18, in side view, the opening dimension between the rear face of the housing body 42 and the partitioning portion 54 is substantially equal to the opening dimension between the partitioning portion 54 and the arm 50. Other configuration of the guide 43 is the same as Example 2.

Figure 17:
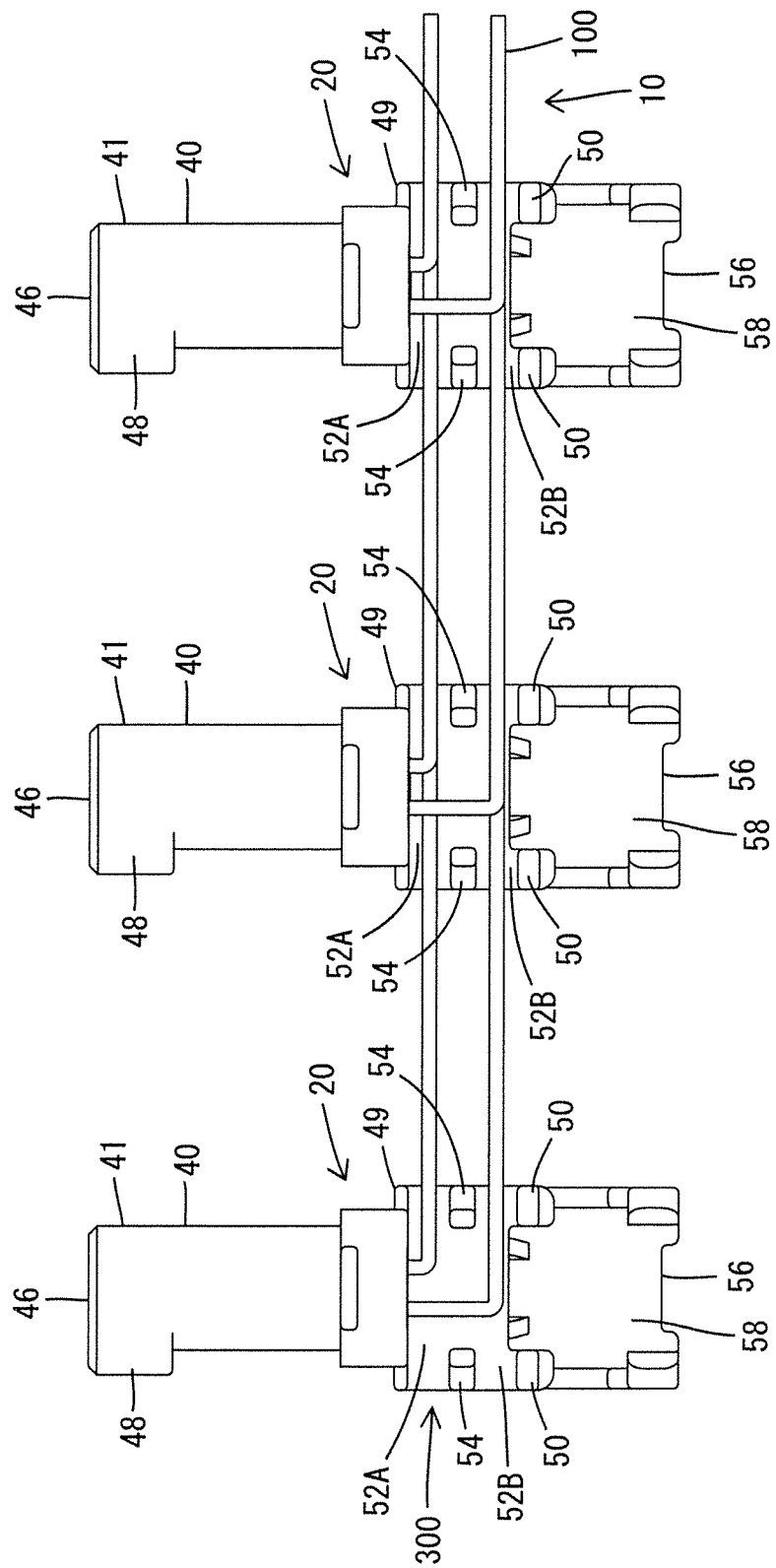
FIG. 17 is a bottom view illustrating the routing configuration of electrical wires when the covers are opened, in the wire harness in Example 3.

In Example 3, as illustrated in FIG. 17, in the left connector 40 in a branching portion 20 branched on the distal end side of a main line 10, each electrical wire 100 extended out from the housing body 42 is allocated, via an operating opening 300, as the electrical wire 100 inserted through a first through portion 52A or as the electrical wire 100 inserted through a second through portion 52B. In the center connector 40 in the branching portion 20 adjacent to the left connector 40, each electrical wire 100 extended out from the housing body 42 is allocated as the electrical wire 100 inserted through the first through portion 52A or as the electrical wire 100 inserted through the second through portion 52B, and the electrical wires 100 extended out from the left connector 40 are straightly inserted through the first through portion 52A and the second through portion 52B. In the right connector 40 in the branching portion 20 on the right side of the center connector 40, each electrical wire 100 extended out from the housing body 42 is allocated as the electrical wire 100 inserted through the first through portion 52A or as the electrical wire 100 inserted through the second through portion 52B, and the electrical wires 100 extended out from the left connector 40 and the electrical wires 100 extended out from the center connector 40 are straightly inserted through the first through portion 52A and the second through portion 52B. In this way, in Example 3, the electrical wires 100 extended out from the housing body 42 (the electrical wires 100 in the branching portion 20) and the electrical wires 100 extended out from other connectors 40 (the electrical wires 100 in the main line 10) are uniformly allocated to the first through portion 52A and the second through portion 52B. That is, the number of the electrical wires 100 allocated to the first through portion 52A is the same as the number of the electrical wires 100 allocated to the second through portion 52B. When, as described above, the first through portion 52A and the second through portion 52B have the same opening dimension (opening area), the routing configuration is preferable.

Example 4

FIGS. 19 to 26 illustrate Example 4. Like Examples 1 to 3, a connector 40 in Example 4 has a housing 41 made of a synthetic resin. The housing 41 has a housing body 42, and a guide 43. The housing body 42 has a square block shape, and can house a terminal metal fitting 30. The guide 43 has a bent plate shape, and can insert an electrical wire 100. The configuration of the housing body 42 is the same as Example 1, and will not be described.

Figure 19:
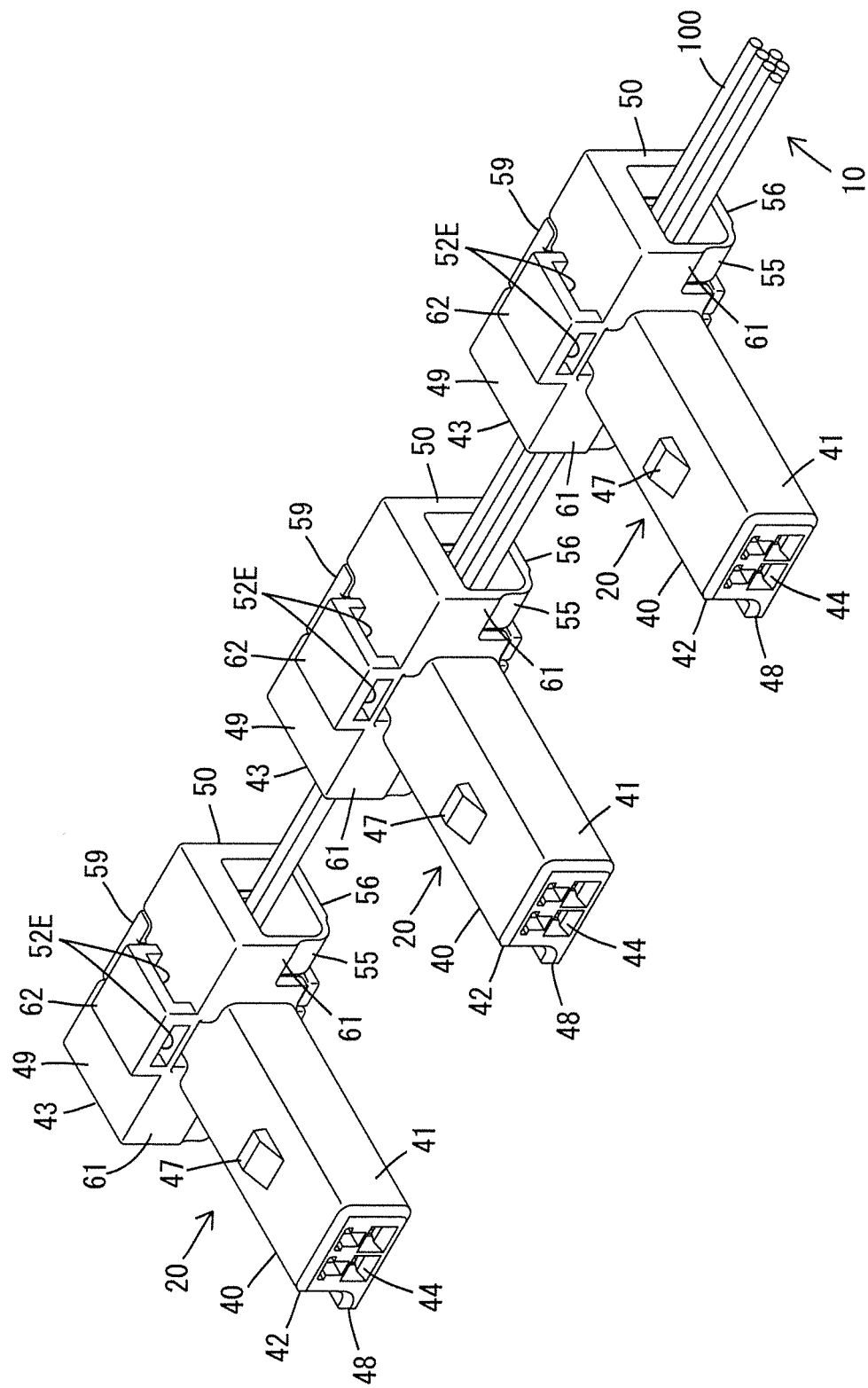
FIG. 19 is a perspective view illustrating a wire harness in Example 4 in a state where a plurality of connectors are aligned.
Figure 20:
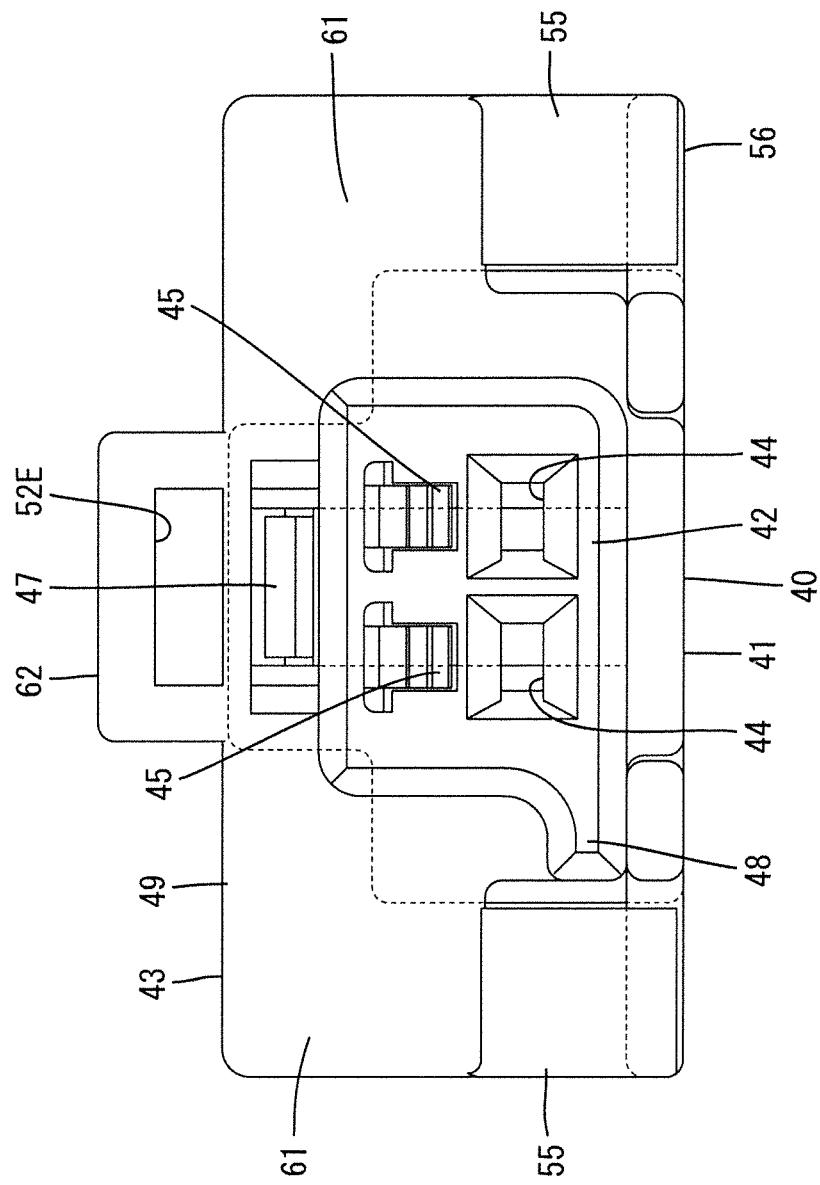
FIG. 20 is a front view of a housing of the connector.

As illustrated in FIG. 19, the guide 43 has a base 49, a pair of arms 50, a pair of front walls 61, a pair of hinges 55, and a cover 56. The base 49 has a rectangular plate shape, is connected integrally in a step shape to the upper edge at the rear end of the housing body 42, and is projected rearward so as to be greatly bulged to both sides in the width direction from the housing body 42. Both the arms 50 are projected downward from both ends in the width direction at the rear end of the base 49. Both the front walls 61 are projected downward from both ends in the width direction at the front end of the base 49, and are bulged to both sides from the rear end of the housing body 42. Both the hinges 55 have a belt shape, are flexible, and are connected integrally to the lower ends of both the front walls 61. The cover 56 is connected integrally to the ends of both the hinges 55, and can be turned to be opened and closed about the hinges 55.

Figure 21:
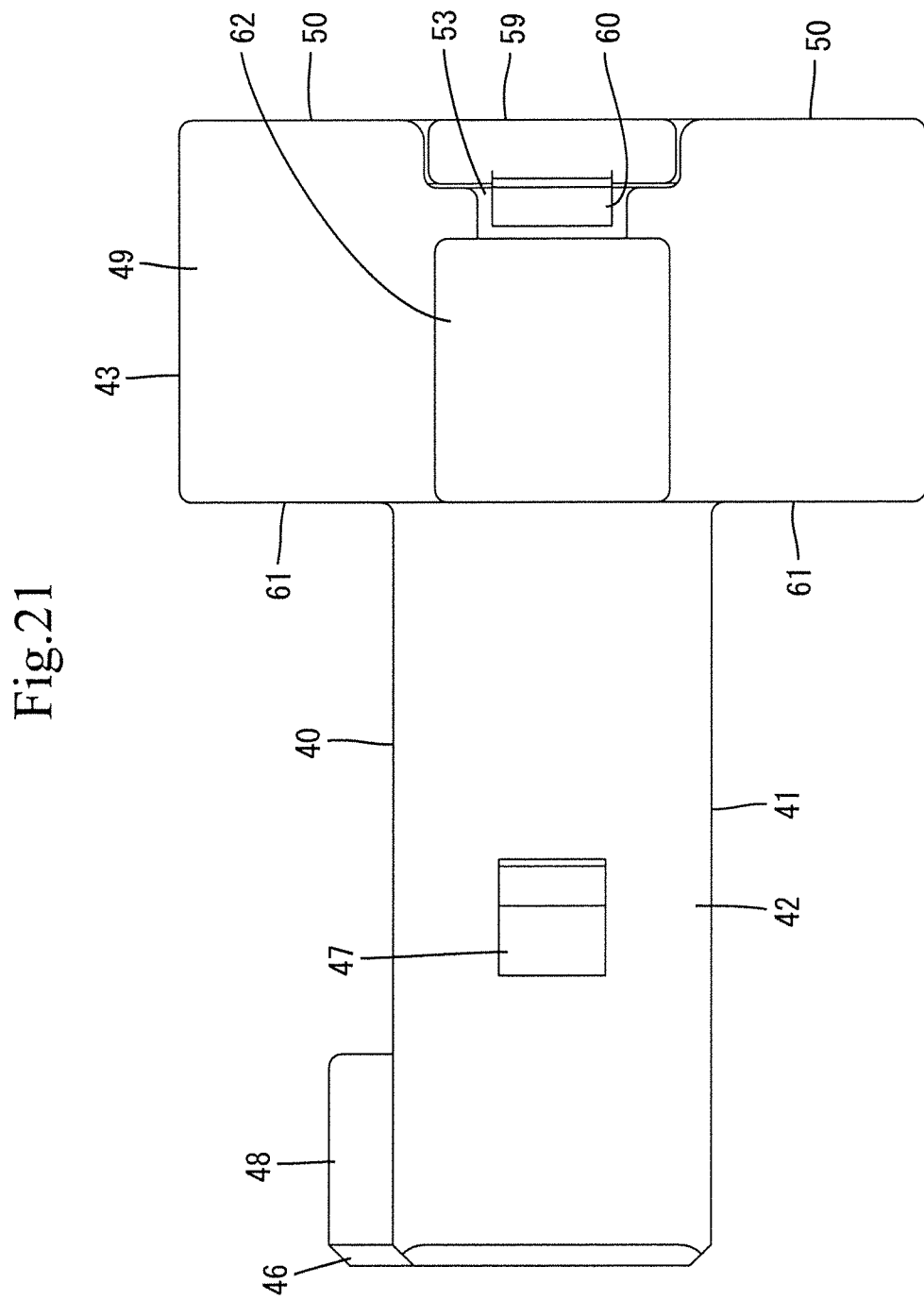
FIG. 21 is a plan view of a housing of the connector.

As illustrated in FIG. 21, a cutaway cover lock receiving portion 53 is recessed at the center in the width direction at the rear end of the base 49. A table 62 rectangular in plan view is provided on the upper face of the base 49. As illustrated in FIG. 19, the table 62 has a through portion 52E passing through in the front-rear direction and in the direction intersecting the front-rear direction. In the front and rear faces of the table 62, both ends of the through portion 52E extended out in the front-rear direction are slit. In both faces in the width direction of the table 62, both ends of the through portion 52E extended out in the direction intersecting the front-rear direction are slit.

Figure 22:
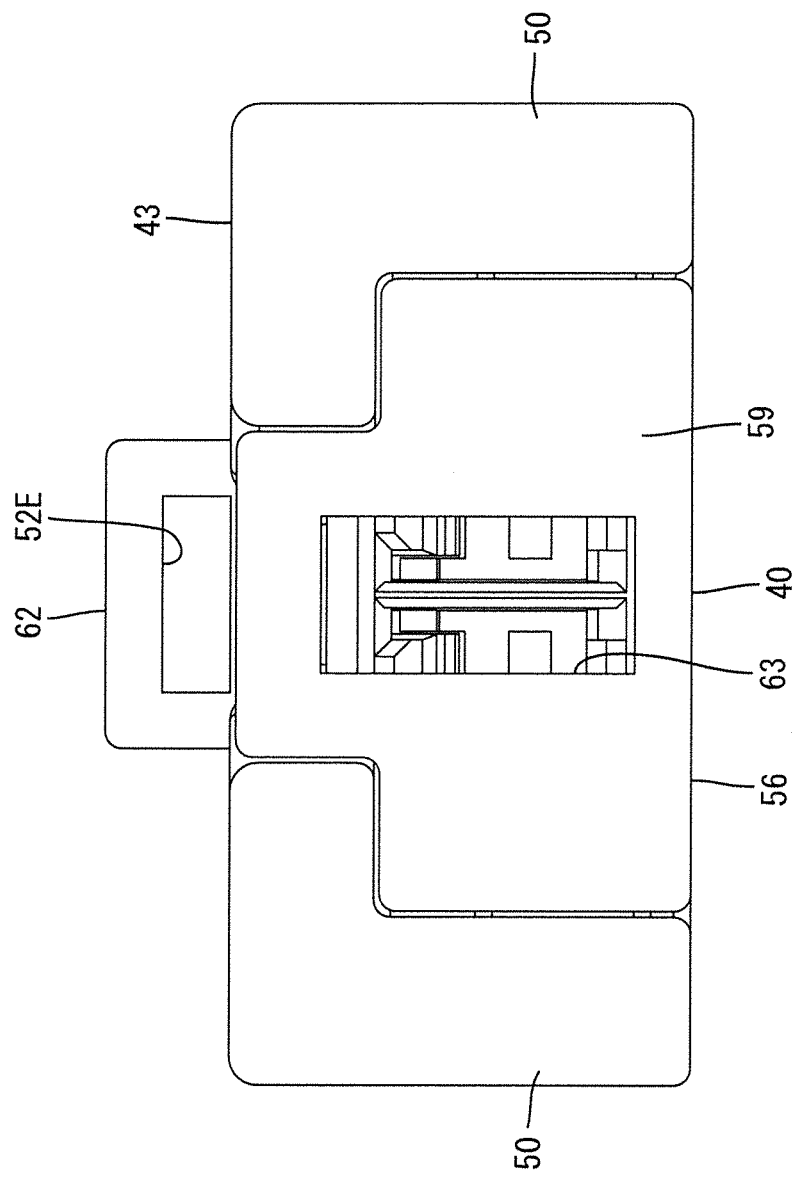
FIG. 22 is a rear view of a housing of the connector.

Both the arms 50 face both the front walls 61. In rear view, both the arms 50 are not overlapped in the width direction with the housing body 42, and are paired on both sides in the width direction across the housing body 42. As illustrated in FIG. 22, a later-described cover lock 59 of the cover 56 can be fitted into the facing space in the width direction of both the arms 50.

Figure 23:
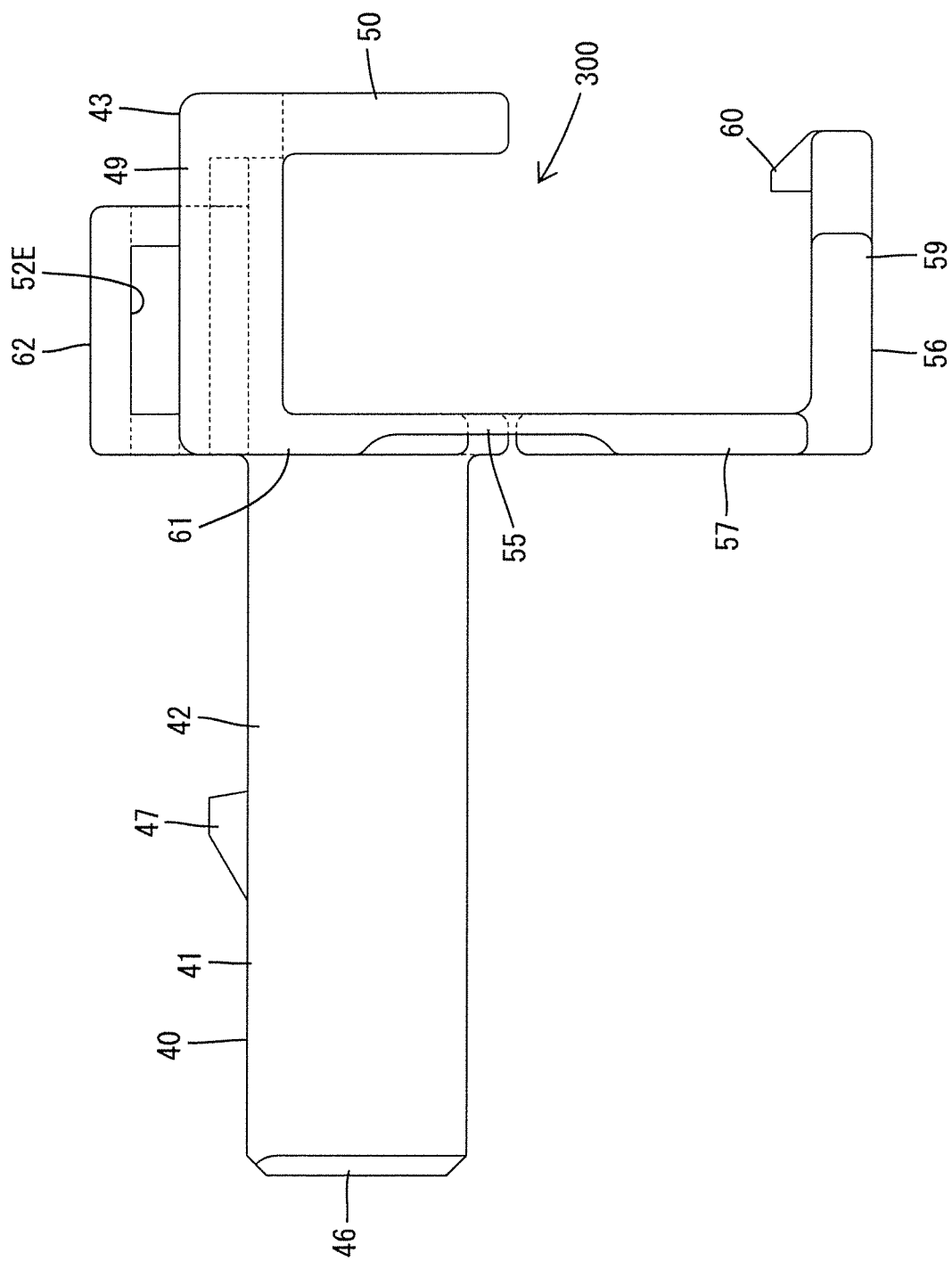
FIG. 23 is a side view of the housing when a cover is opened.

As illustrated in FIG. 23, the cover 56 has a connecting portion 57, and the cover lock 59. The connecting portion 57 has a plate shape, is connected integrally to the ends of both the hinges 55, and is erected to be continuous with both the hinges 55 when the cover 56 is opened. The cover lock 59 has a plate shape, is connected integrally and substantially perpendicularly to the end of the connecting portion 57, faces the rear face of the housing body 42 when the cover 56 is closed, and can be fitted into the facing space of both the arms 50. As illustrated in FIG. 22, a window 63 in a vertically long rectangular shape is opened at the center in the width direction of the cover lock 59.

Figure 26:
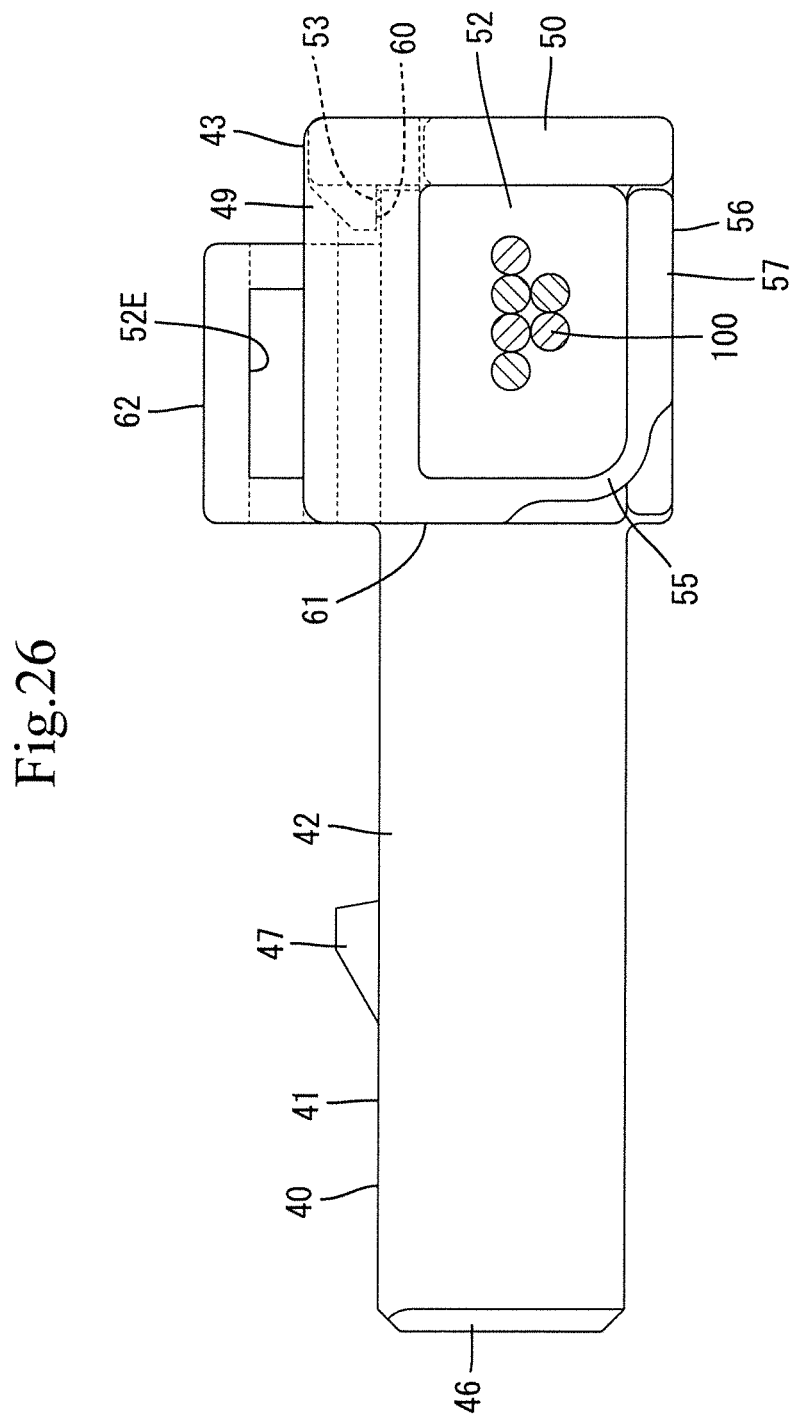
FIG. 26 is a side view illustrating the arranged state of electrical wires passed through a through portion, in the connector configuring the wire harness in Example 4.

As illustrated in FIG. 26, the cover 56 is provided with a through portion 52 passing through the housing 41 in the direction intersecting the front-rear direction. The electrical wire 100 can be routed in two directions through the openings at both ends of the through portion 52. A pawl-shaped engaging projection 60 is provided at the end of the cover lock 59, and is projected inward. The engaging projection 60 is fitted into and engaged with the cover lock receiving portion 53 when the cover 56 is closed.

The routing configuration of each electrical wire 100 in Example 4 will be described.

The cover 56 is opened via both the hinges 55 to open the rear side of the housing body 42. The electrical wire 100 to be branched to a branching portion 20 out of the electrical wires 100 in the main line 10 is passed through the through portion 52 of the guide 43 of the corresponding connector 40, and is drawn into the housing body 42 of the connector 40. The electrical wire 100 remaining in the main line 10 out of the electrical wires 100 in the main line 10 is passed from an operating opening 300 through the through portion 52 of the guide 43, and is routed in two directions intersecting the front-rear direction through the openings at both ends of the through portion 52.

Then, the cover 56 is turned via both the hinges 55 so as to be closed. The cover lock 59 is fitted into the facing space of both the arms 50 to close the rear face of the housing 41. The connecting portion 57 faces the base 49 across the through portion 52 to close the bottom face of the housing 41. The engaging projection 60 of the cover lock 59 is resiliently engaged with the cover lock receiving portion 53 so that the cover 56 is held closed relative to the housing body 42. As illustrated in FIG. 26, since the cover 56 is held closed, the electrical wire 100 is maintained to be passed through the through portion 52.

Figure 24:
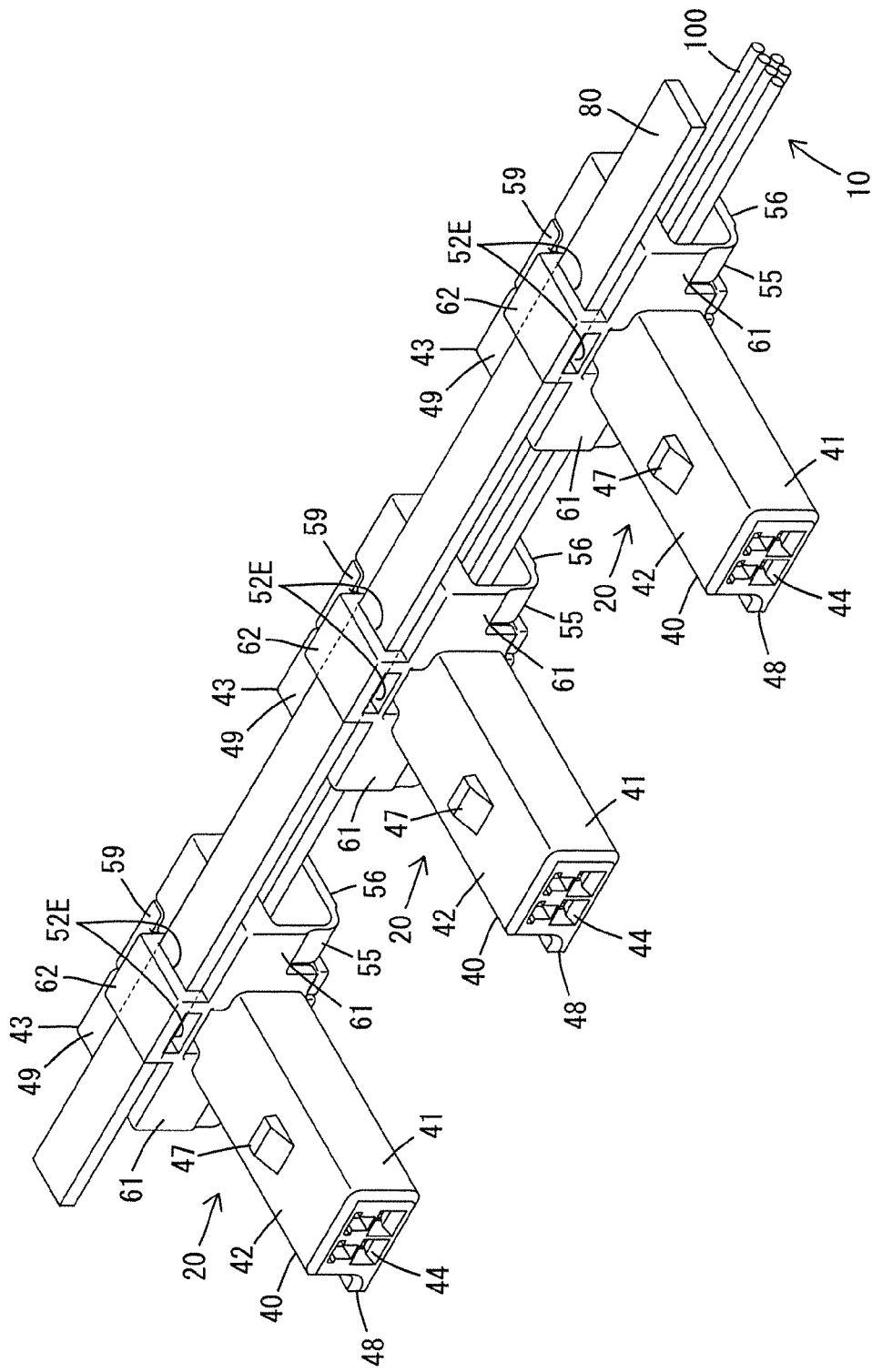
FIG. 24 is a perspective view illustrating the wire harness in Example 4 in a state where the plurality of connectors are aligned via a jig.

Further, in Example 4, as illustrated in FIG. 24, a jig 80 is inserted into the through portions 52E of the tables 62 of the connectors 40. The jig 80 is penetrated through the through portions 52E in the direction intersecting the front-rear direction. The jig 80 is a member which is straight, is of flat cross section, and can be fitted into the through portions 52E. The jig 80 has predetermined rigidity which can maintain its straightness. Thus, the connectors 40 are held in an aligned state in the branching positions of the main line 10 via the jig 80, and can be reliably prevented from swinging in the direction intersecting the front-rear direction. As a result, both the connectors 40, 70 can be fitted smoothly and immediately from a state where the front faces of the housing bodies 42 face the respective corresponding counterpart connectors 70.

Figure 25:
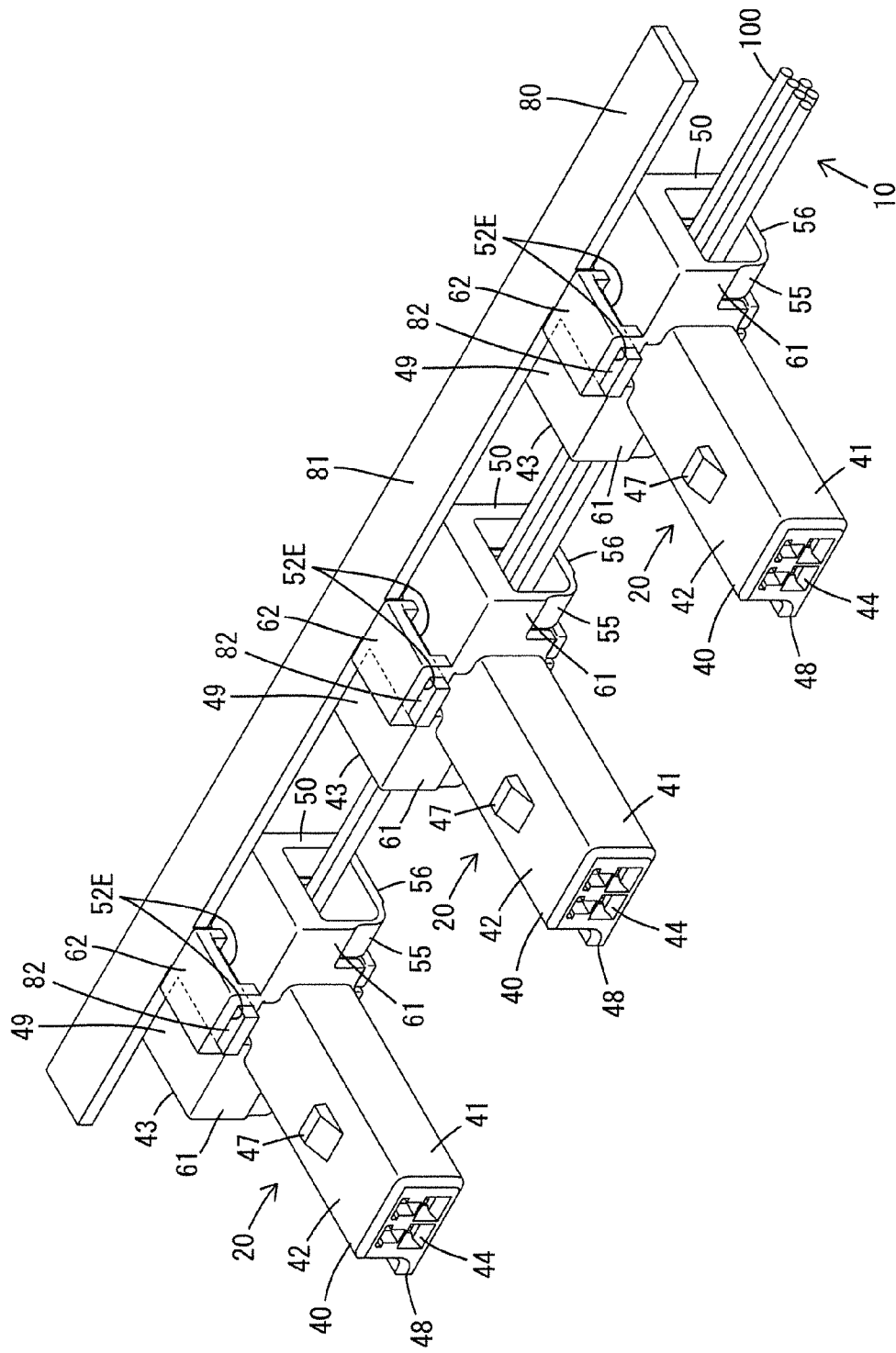
FIG. 25 is a perspective view illustrating the wire harness in Example 4 in a state where the plurality of connectors are aligned via another jig.

In example 4, as illustrated in FIG. 25, the jig 80 has a main body 81, and projection pieces 82. The main body 81 is extended in the direction intersecting the front-rear direction along the main line 10. The projection pieces 82 are projected forward from the main body 81 in the positions corresponding to the connectors 40. In this case, the projection pieces 82 of the jig 80 are inserted from the rear side through the through portions 52E of the tables 62 of the connectors 40 passing through in the front-rear direction. Thus, likewise, the connectors 40 are aligned in the direction intersecting the front-rear direction.

Example 5

Figure 27:
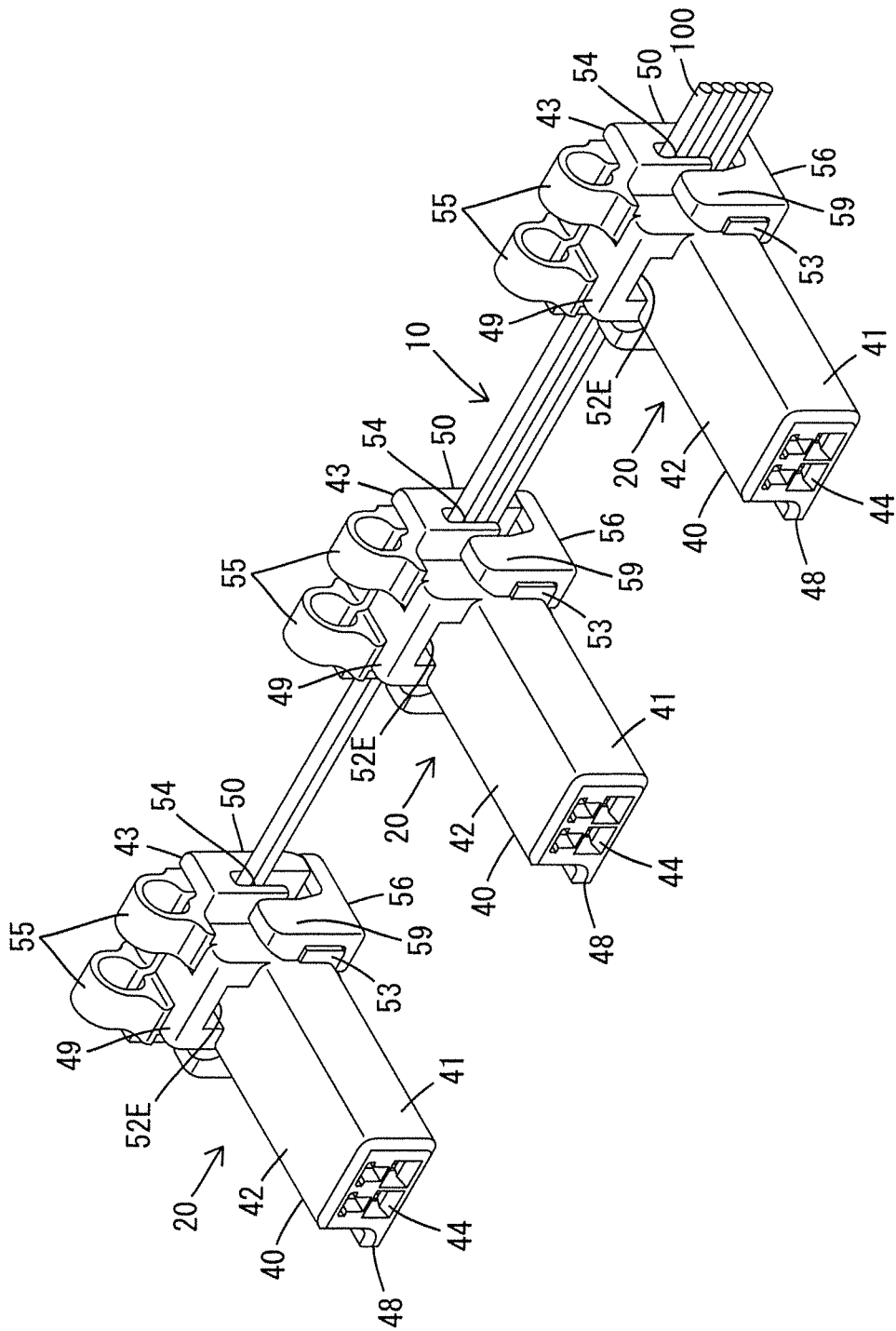
FIG. 27 is a perspective view illustrating a wire harness in Example 5 in a state where a plurality of connectors are aligned.
Figure 28:
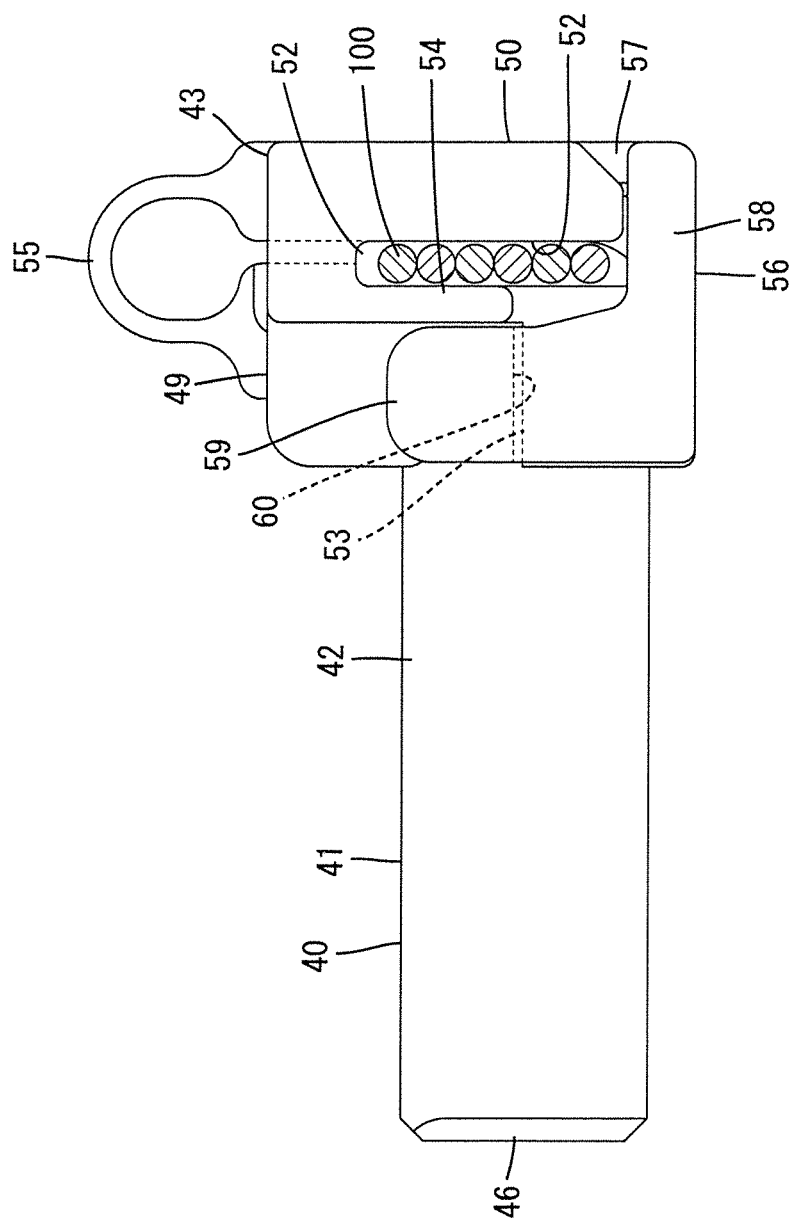
FIG. 28 is a side view illustrating the arranged state of electrical wires passed through a through portion, in the connector configuring the wire harness in Example 5.
Figure 29:
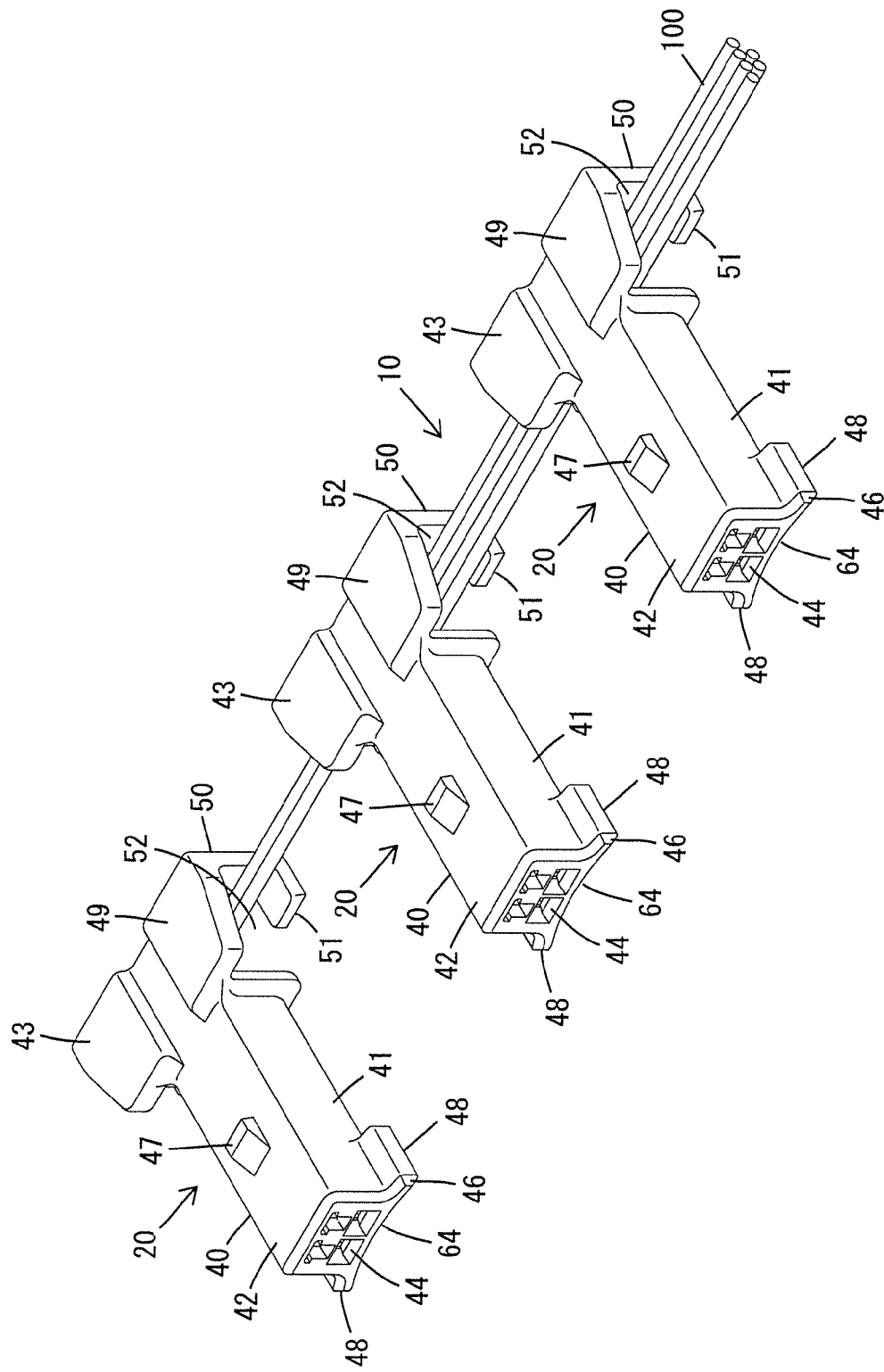
FIG. 29 is a perspective view illustrating a wire harness in Example 6 in a state where a plurality of connectors are aligned.

FIGS. 27 and 28 illustrate Example 5. Like Examples 1 to 4, a connector 40 in Example 5 has a housing 41 made of a synthetic resin. The housing 41 has a housing body 42, and a guide 43.

The housing body 42 has a square block shape, and can house a terminal metal fitting 30. The guide 43 has a bent plate shape, and can insert an electrical wire 100. The configuration of the housing body 42 is the same as Example 1, and will not be described.

The guide 43 has a base 49, a pair of arms 50, a pair of hinges 55, and a cover 56. The base 49 is connected to the upper edge at the rear end of the housing body 42, and is projected rearward at a short length. Both the arms 50 are projected downward from both ends in the width direction at the rear end of the base 49. Both the hinges 55 have a belt shape, are flexible, and are connected to both ends in the width direction of the upper face of the base 49. The cover 56 is connected integrally to the ends of both the hinges 55, and can be turned to be closed and opened about the hinges 55.

The base 49 has a portion slightly higher than the upper face of the housing body 42. In this portion, a through portion 52E passing through in the front-rear direction is provided. The jig 80 in Example 4 is inserted into the through portion 52E of the base 49, so that the connector 40 can be positioned in the branching position of a main line 10. In rear view, both the arms 50 are not overlapped in the width direction with the rear face portion of the housing body 42, except for both cover lock receiving portions 53. A later-described connecting portion 57 of the cover 56 can be fitted into the facing space in the width direction of both the arms 50. Both the arms 50 are disposed toward the rear face of the housing body 42 relative to the front-rear direction. In side view, the opening dimension between the arm 50 and the rear face of the housing body 42 is equal to or slightly larger than the diameter dimension of one electrical wire 100.

The cover 56 has the connecting portion 57, a facing base 58, and a pair of cover locks 59. The connecting portion 57 has a plate shape, is connected to the ends of both the hinges 55, and is erected to be continuous with both the hinges 55 when the cover 56 is opened. The facing base 58 has a plate shape, is connected to the end of the connecting portion 57, and faces the base 49 when the cover 56 is closed. Both the cover locks 59 are connected to both ends in the width direction at the end of the facing base 58, and are resiliently engaged with the cover lock receiving portions 53 when the cover 56 is closed. Both the cover locks 59 have a strip plate shape, and are flexible, with the connecting positions of both the cover locks 59 to the facing base 58 as support points. Pawl-shaped engaging projections 60 are provided at the ends of both the cover locks 59, and are projected inward.

Since both the cover locks 59 of the cover 56 are resiliently engaged with both the cover lock receiving portions 53 of the housing body 42 when the cover 56 is closed, a through portion 52 is defined between the rear face of the housing body 42 and the cover 56, and passes through the housing 41 in the width direction (the direction intersecting the front-rear direction). In side view, the through portion 52 is closed throughout its periphery by the housing body 42, the base 49, the arm 50, and the facing base 58. The connector 40 in Example 5 has substantially the same configuration as the connector 40 in Example 2 except that there is one through portion 52. The through portion 52 of the connector 40 in Example 5 is formed by increasing the first through portion 52A of the connector 40 in Example 2 in the height dimension.

The routing configuration of each electrical wire 100 in Example 5 will be described.

The cover 56 is opened via both the hinges 55 to open the rear side of the housing body 42. The electrical wire 100 to be branched to a branching portion 20 out of the electrical wires 100 in the main line 10 is passed through the through portion 52 of the guide 43 of the connector 40, and is drawn into the housing body 42 of the connector 40. The electrical wire 100 remaining in the main line 10 out of the electrical wires 100 in the main line 10 is passed through the through portion 52 of the guide 43, and is routed in two directions intersecting the front-rear direction through the openings at both ends of the through portion 52. At this time, a plurality of electrical wires 100 are densely arranged in a vertical row in the through portion 52 of the guide 43 so that the free movement of the electrical wires 100 is restricted.

Then, the cover 56 is turned via both the hinges 55 so as to be closed. The connecting portion 57 is fitted into the facing space of both the arms 50 to close the rear face of the housing 41. The facing base 58 faces the base 49 across the through portion 52 to close the bottom face of the housing 41. The engaging projections 60 of both the cover locks 59 are resiliently engaged with both the cover lock receiving portions 53 so that the cover 56 is held closed relative to the housing body 42. Since the cover 56 is held closed, the electrical wire 100 is maintained to be passed through the through portion 52.

Like Example 2, in Example 5, since the electrical wires 100 provide a shaft, the connectors 40 can be prevented from swinging in the direction intersecting the front-rear direction, and be maintained to be aligned in the branching positions of the respective corresponding branching portions 20.

Example 6

FIGS. 29 to 32 illustrate Example 6. Like Examples 1 to 5, a connector 40 in Example 6 has a housing 41 made of a synthetic resin. The housing 41 has a housing body 42, and a guide 43. The housing body 42 has a square block shape, and can house a terminal metal fitting 30. The guide 43 has a bent plate shape, and can insert an electrical wire 100. The configuration of the guide 43 is the same as Example 1, and will not be described.

Figure 30:
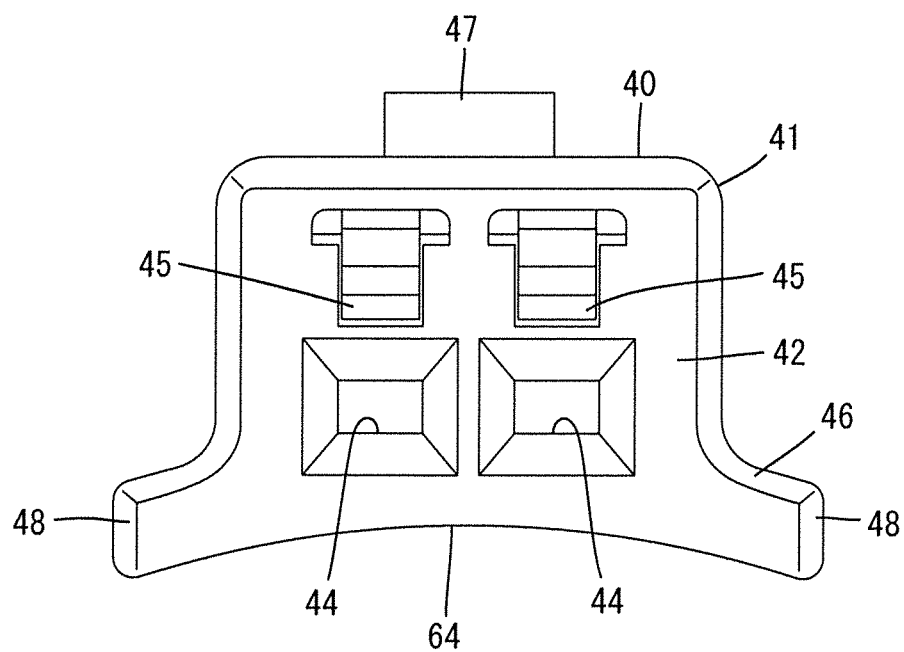
FIG. 30 is a front view of a housing body of the connector.

A pair of projection pieces 48 are provided at the front end of the housing body 42, and are bulged from the lower ends of both side faces of the housing body 42 to both sides. The lower faces of both the projection pieces 48 are flush and continuous with the lower face of the housing body 42. The lower face of the housing body 42 including the lower faces of both the projection pieces 48 is an arc portion 64 which is curved upward in its entirety in an arc shape in front view. In this case, both the projection pieces 48 are arcuate in their entirety. As illustrated in FIG. 30, a chamfered portion 46 is provided along the outer peripheries at the outer edges of both the projection pieces 48, except for the arc portion 64. Other configuration of the housing body 42 is the same as Example 1.

In Example 6, the configuration of a counterpart connector 70 is slightly changed from the above description, and the changing points will be described below.

Figure 31:
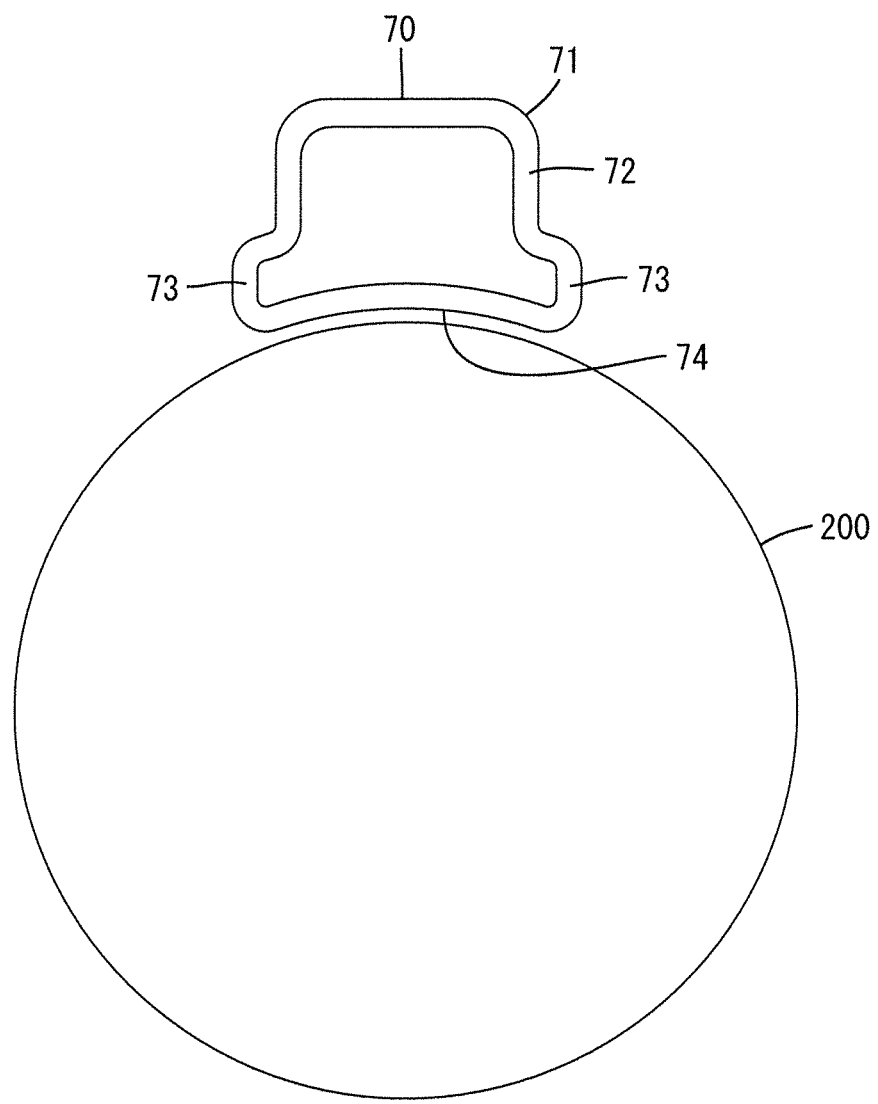
FIG. 31 is a front view of a counterpart connector provided on a solenoid.

As illustrated in FIG. 31, a pair of expanding portions 73 are provided on a hood 72 of the counterpart connector 70, and are bulged to both sides from the lower ends of both the side faces of the hood 72. The lower faces of both the expanding portions 73 are flush and continuous with the lower face of the hood 72. The lower face of the hood 72 including both the expanding portions 73 is a counterpart arc portion 74. The counterpart arc portion 74 is curved upward in its entirety in an arc shape in front view. In this case, both the expanding portions 73 are formed in an arc shape in their entirety.

The arc portion 64 and the counterpart arc portion 74 have substantially the same radius of curvature, and have a concentric arc shape for fitting both the connectors 40, 70. In this case, the center of curvature of the arc portion 64 and the counterpart arc portion 74 is matched with the axis of a solenoid 200. The counterpart arc portion 74 of the hood 72 is disposed along the outer circumferential face of the solenoid 200.

The solenoid 200 is mounted on a component configuring an automatic transmission, and can be angularly displaced about its axis parallel with the front-rear direction (the fitting direction of both the connectors 40, 70) in a predetermined angle range about the axial center of the solenoid 200. Thus, with the angular displacement of the solenoid 200, the counterpart connector 70 is angularly displaced in the predetermined angle range about the axial center of the solenoid 200.

Like Example 1, in Example 6, by the shaft function of the electrical wires 100 passed through the through portions 52 of the guides 43, the connectors 40 are substantially positioned relative to the respective corresponding counterpart connectors 70, and can thus be fitted into the respective corresponding counterpart connectors 70.

Figure 32:
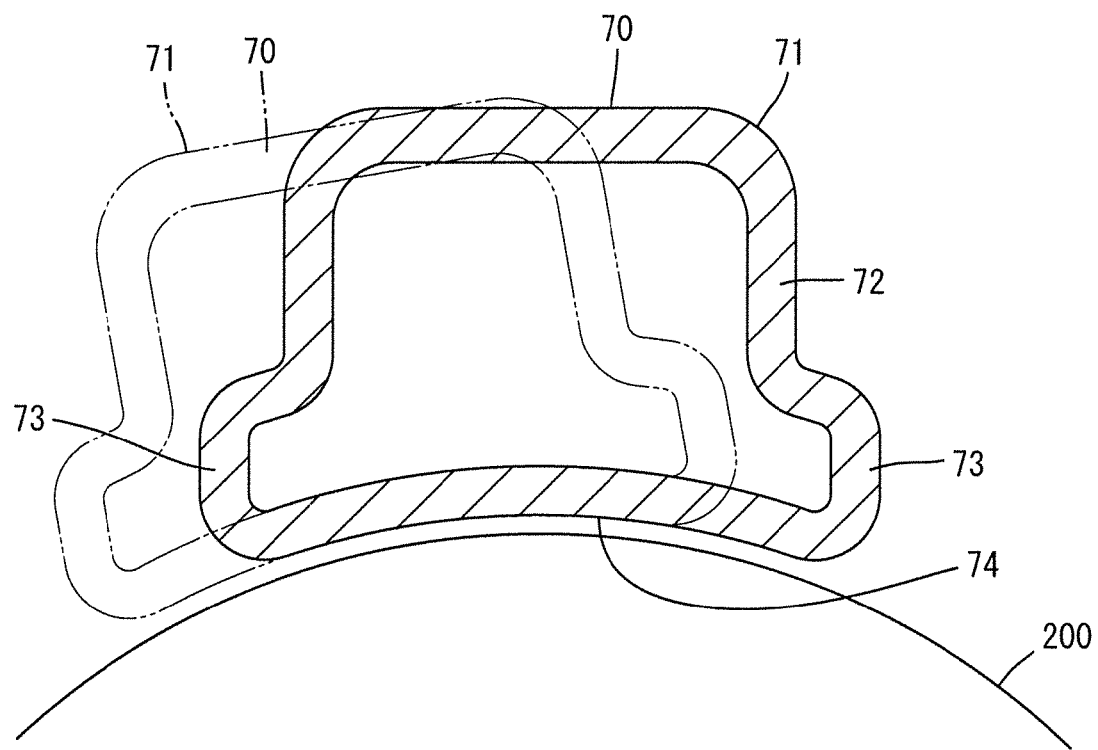
FIG. 32 is an enlarged front view of FIG. 31.

As illustrated in FIG. 32, when the counterpart connector 70 is angularly displaced in the predetermined angle range from the initial position, the counterpart arc portion 74 of the hood 72 is displaced along the concentric arc about the axis of the solenoid 200. At the start of the fitting operation of both the connectors 40, 70, the arc portion 64 of the housing body 42 is displaced along the concentric arc so as to follow the counterpart arc portion 74 of the hood 72. Then, both the projection pieces 48 are easily fitted into both the expanding portions 73, and the housing body 42 is easily fitted into the hood 72. Like Example 1, if the posture of the housing body 42 is not normal at fitting, both the projection pieces 48 cannot be fitted into both the expanding portions 73, thereby restricting the fitting operation of both the housings 41, 71.

Example 7

FIGS. 33 to 47 illustrate Example 7. Like Examples 1 to 6, a connector 40 in Example 7 has a housing 41 made of a synthetic resin. The housing 41 has a housing body 42, and a guide 43. The housing body 42 has a square block shape, and can house a terminal metal fitting 30. The guide 43 can insert an electrical wire 100.

Figure 45:
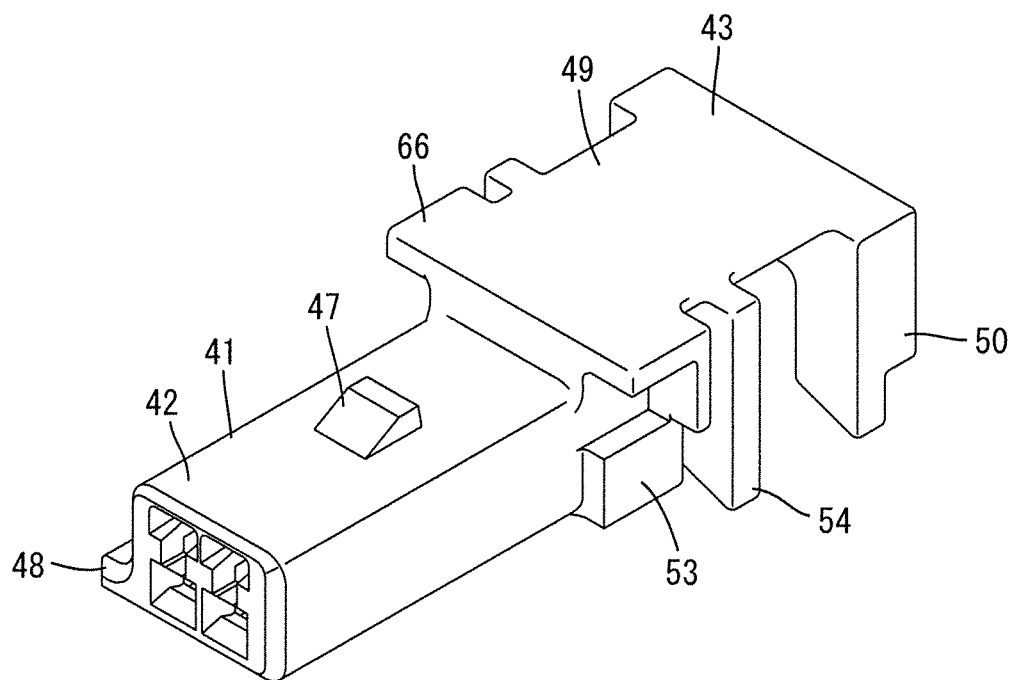
FIG. 45 is a perspective view of a housing portion.
Figure 46:
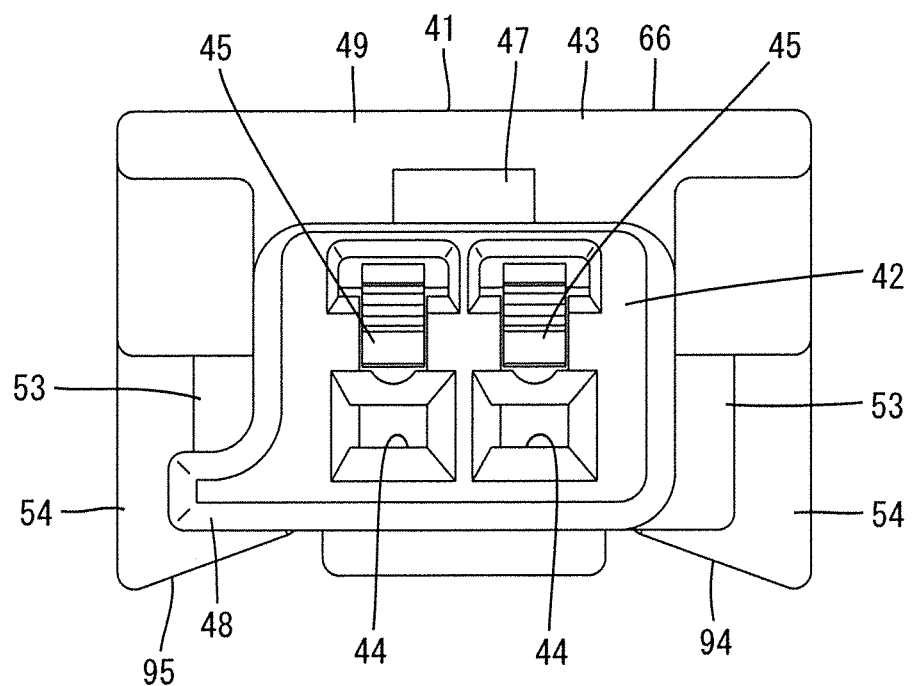
FIG. 46 is a front view of a housing portion.

As illustrated in FIGS. 45 and 46, a pair of cover lock receiving portions 53 are projected from the lower portions at the rear ends of both the side faces of the housing body 42. Both the cover lock receiving portions 53 are flat, are projected rectangularly in side view, and can be engaged with later-described cover locks 59 of a cover 56 provided in the guide 43. Other configuration of the housing body 42 is the same as Example 1, and will not be described.

As illustrated in FIG. 45, the guide 43 has a base 49, a pair of partitioning portions 54, a pair of arms 50, and the cover 56. The base 49 is connected integrally to the upper edge at the rear end of the housing body 42, and is projected rearward so as to be bulged to both sides in the width direction from the housing body 42. Both the partitioning portions 54 are projected downward from both ends in the width direction on the front end side of the base 49. Both the arms 50 are projected downward from both side portions in the width direction at the rear end of the base 49. The cover 56 is separated from the base 49, both the partitioning portions 54, and both the arms 50. In the following description, the portions of the housing 41 except for the cover 56, that is, the housing body 42, the partitioning portions 54, the base 49, and the arms 50, are referred to as a housing portion 66. As illustrated in FIG. 47, the lower face opening of the guide 43 of the housing portion 66 is an operating opening 300 for inserting the electrical wire 100 through a later-described through portion 52.

Figure 35:
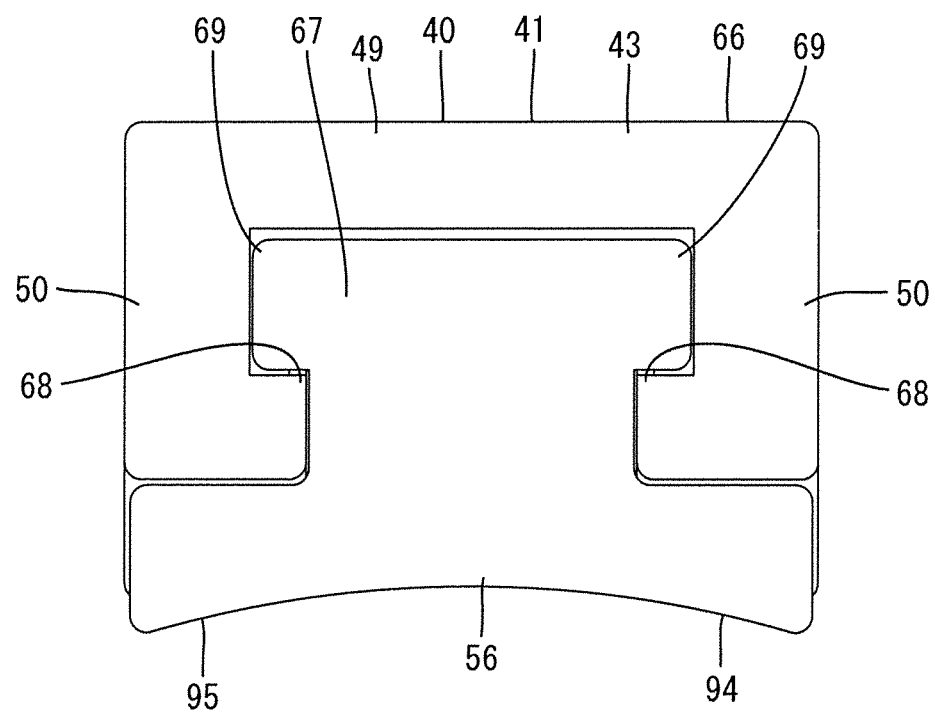
FIG. 35 is a rear view of the connector.
Figure 36:
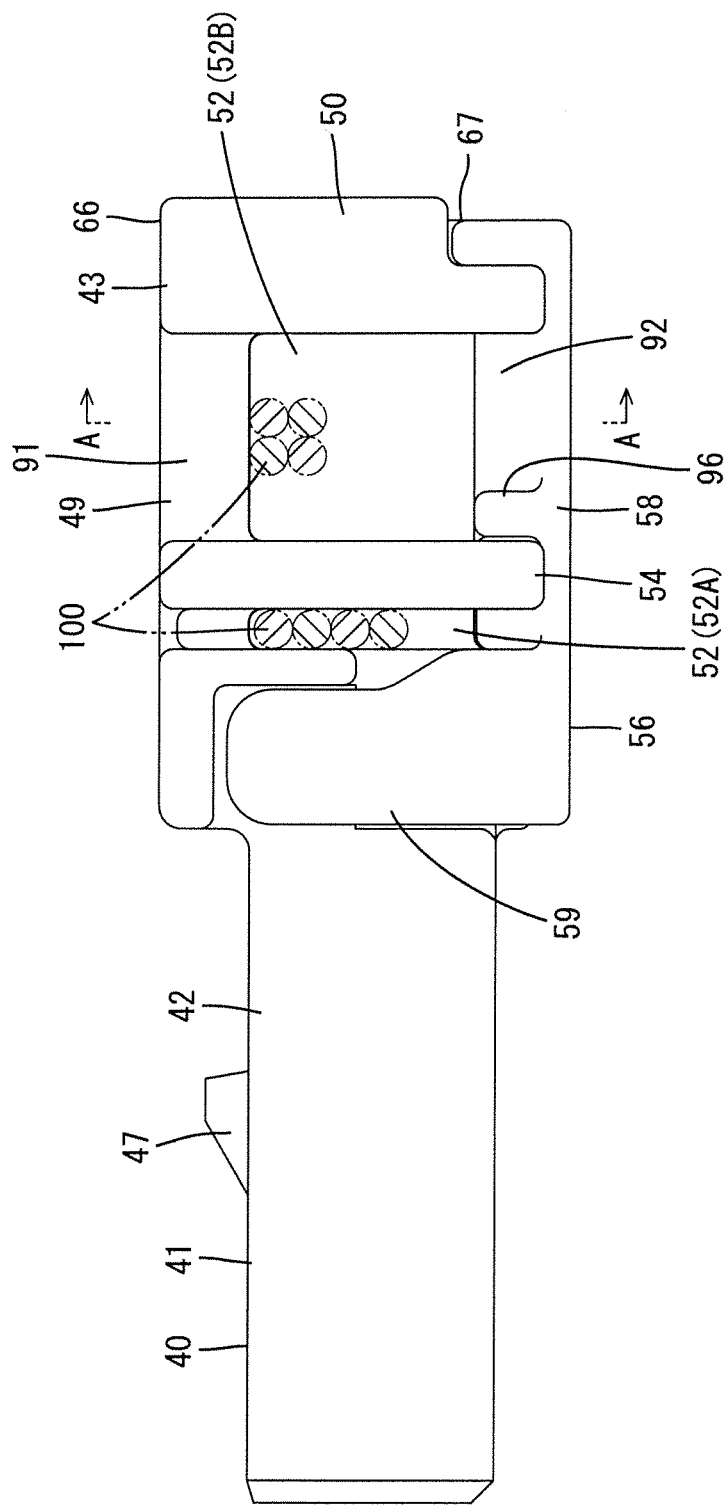
FIG. 36 is a side view of the connector.

Both the partitioning portions 54 have a plate shape, and are disposed toward the rear face of the housing body 42 relative to the front-rear direction. As illustrated in FIG. 36, in side view, the opening dimension between the partitioning portion 54 and the rear face of the housing body 42 is equal to or slightly larger than the diameter dimension of one electrical wire 100. Both the arms 50 are disposed rearward of both the partitioning portions 54 so as to be opposite to each other, and are defined in a shape which can fit a later-described rear plate 67 of the cover 56. As illustrated in FIG. 35, a pair of inward projections 68 are provided at the lower ends of both the arms 50, and are projected inward so as to be opposite to each other.

Figure 41:
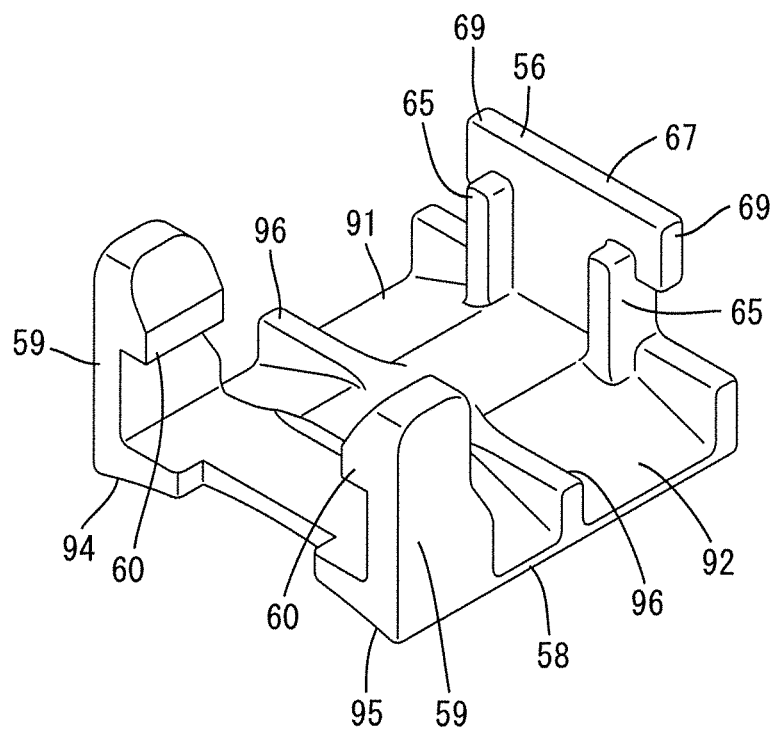
FIG. 41 is a perspective view of a cover.
Figure 42:
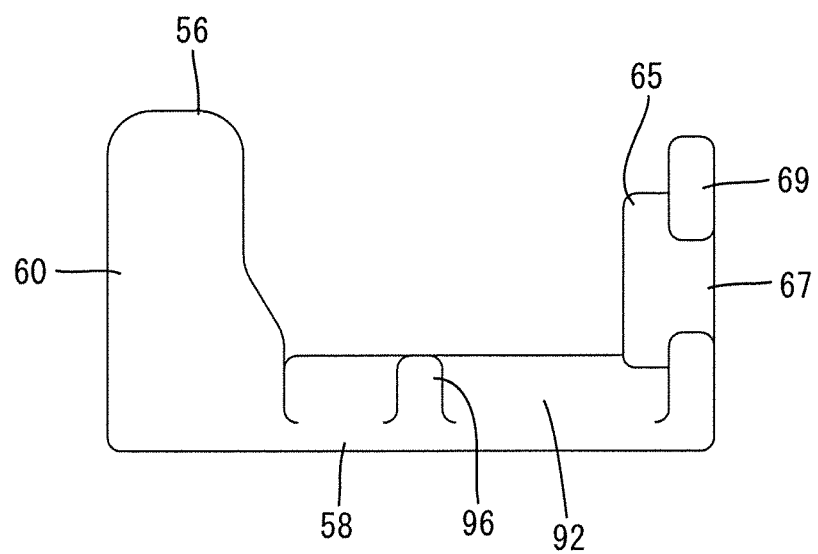
FIG. 42 is a side view of a cover.
Figure 43:
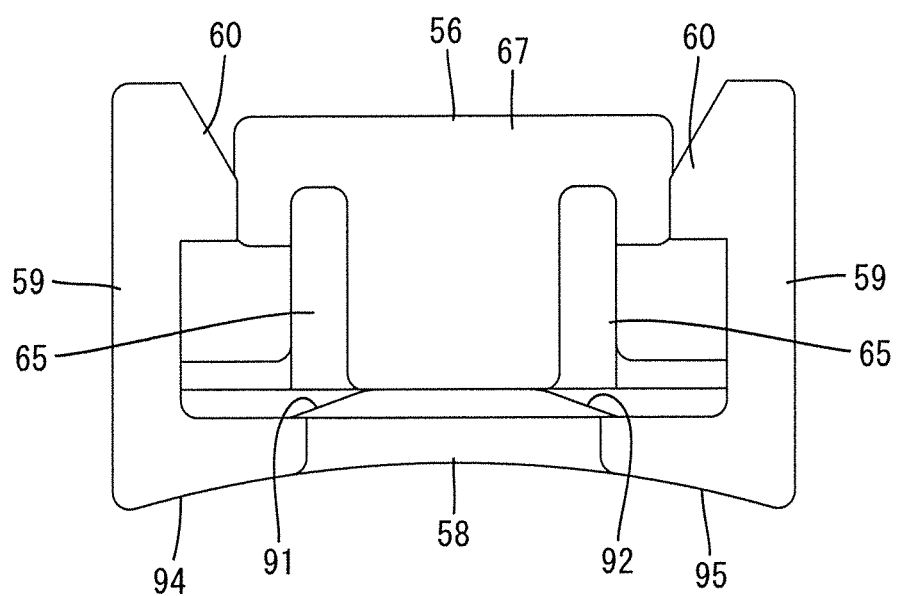
FIG. 43 is a front view of a cover.
Figure 44:
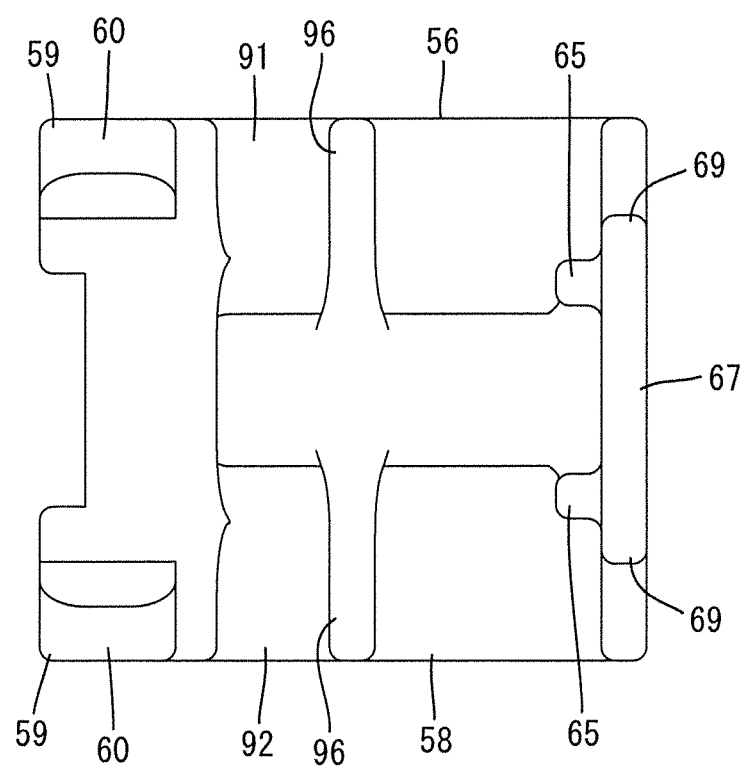
FIG. 44 is a plan view of a cover.

As illustrated in FIGS. 36 and 41, the cover 56 has a facing base 58, the rear plate 67, and a pair of cover locks 59. The facing base 58 has a curved plate shape, and faces the base 49 when the cover 56 is mounted on the housing portion 66. The rear plate 67 is projected upward from the center in the width direction at the rear end of the facing base 58. Both the cover locks 59 are projected upward from both ends in the width direction at the front end of the facing base 58. Pawl-shaped engaging projections 60 are provided at the upper ends of both the cover locks 59, and are projected inward.

Figure 34:
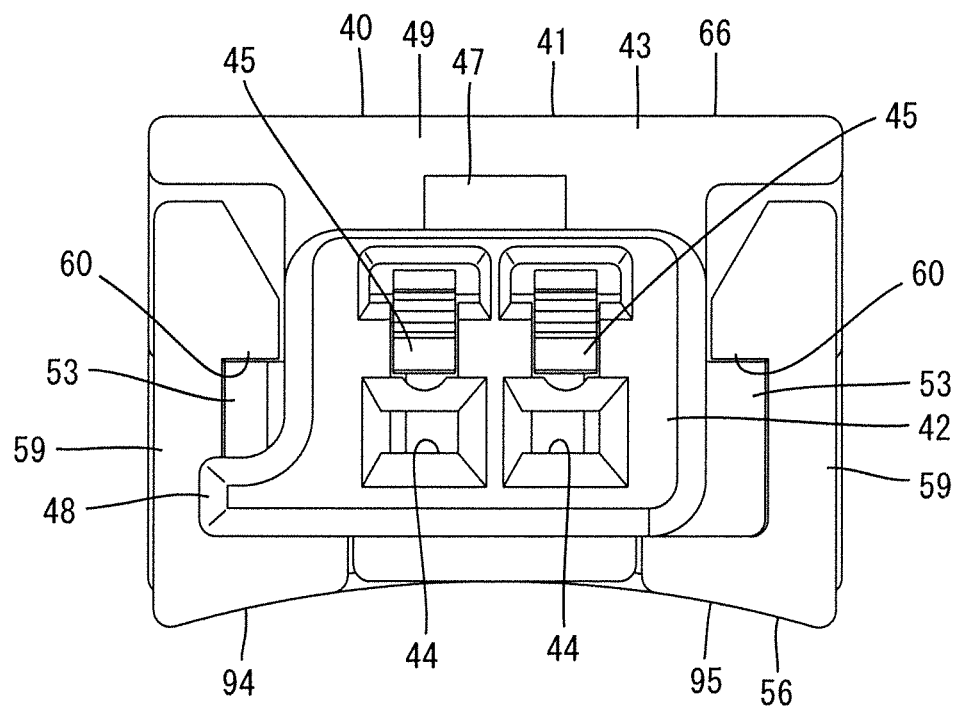
FIG. 34 is a front view of the connector.

Engaging ribs 65 along the height direction are projected at both ends in the width direction of the front face of the rear plate 67. A pair of outward projections 69 are provided at the upper end of the rear plate 67 so as to be bulged to both sides in the width direction. In a state where, as illustrated in FIG. 35, the outward projections 69 are engaged with the inward projections 68, the rear plate 67 is fitted while the engaging ribs 65 are abutted on the inner sides of both the arms 50. The engaging projections 60 of the cover locks 59 are resiliently engaged with the upper ends of the cover lock receiving portions 53, as illustrated in FIG. 34, so that the cover 56 is held by the housing portion 66. At this time, the operating opening 300 is closed by the cover 56. As illustrated in FIG. 36, the through portion 52 is defined between the cover 56 and the housing portion 66, and passes through the housing 41 in the width direction.

In side view, the through portion 52 is closed throughout its periphery by the housing body 42, the base 49, the arm 50, the rear plate 67, and the facing base 58, and is separated into two chambers via the partitioning portion 54. Specifically, in side view, the through portion 52 has a first through portion 52A, and a second through portion 52B. The first through portion 52A is defined between the rear face of the housing body 42 and the partitioning portion 54, and has a narrow opening dimension. The second through portion 52B is defined between the partitioning portion 54 and the arm 50, and has a wide opening dimension. In the first through portion 52A, a plurality of electrical wires 100 are densely arranged in the height direction in a vertical row. In the second through portion 52B, a plurality of electrical wires 100 are arranged in the height direction and in the front-rear direction in a substantially interspersed manner. In particular, in the first through portion 52A, both the front and rear ends of each electrical wire 100 can be abutted on the rear face of the housing body 42 and both the partitioning portions 54. Thus, the electrical wires 100 are held so that the free movement of the electrical wires 100 in the front-rear direction is restricted.

Figure 37:
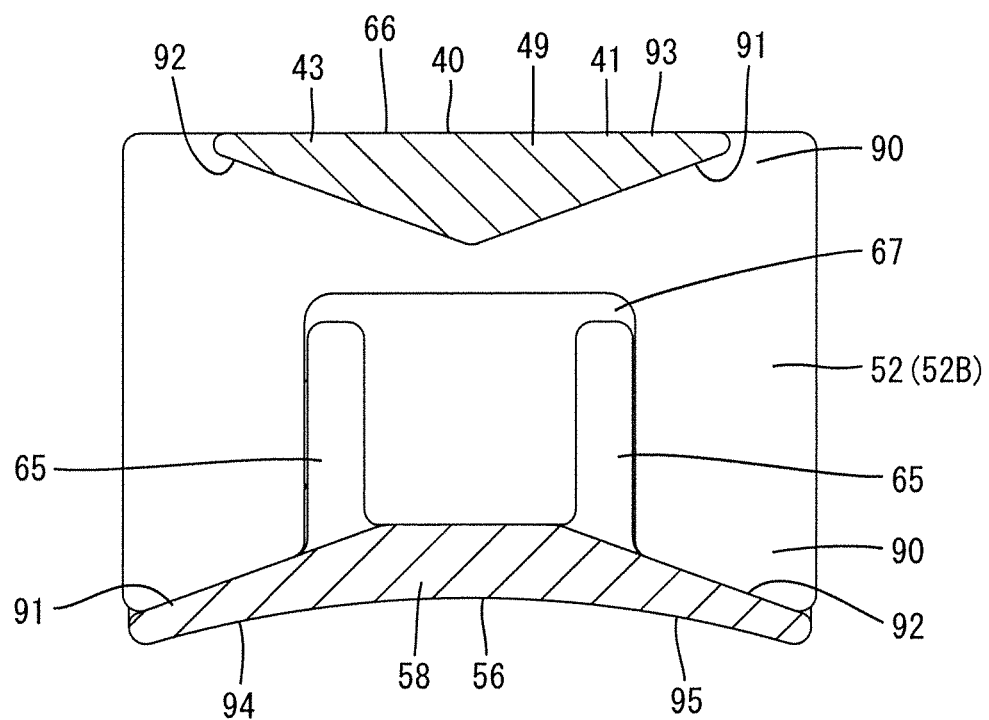
FIG. 37 is a cross-sectional view taken along line A-A in FIG. 36.
Figure 38:
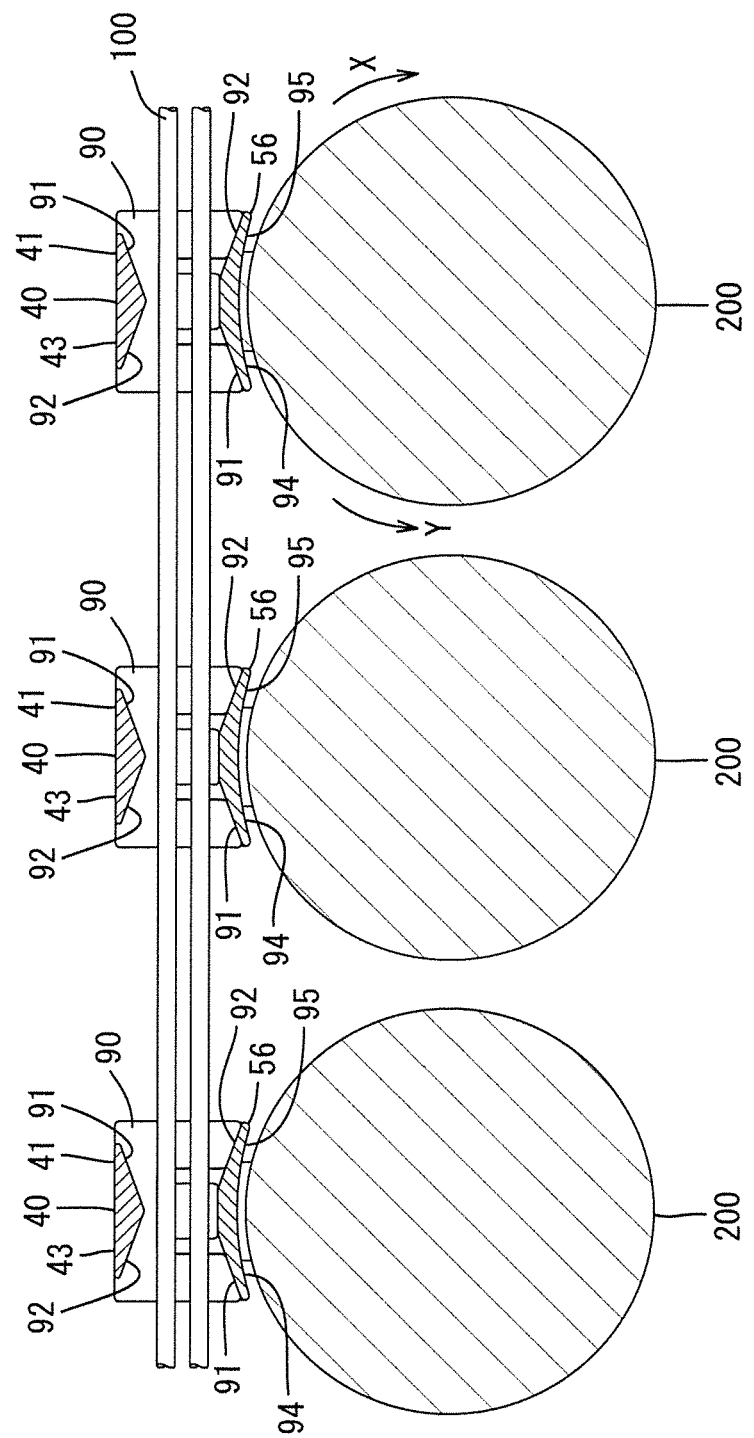
FIG. 38 is a cross-sectional view, seen in rear view, of the connectors fitted into respective corresponding counterpart connectors provided on solenoids.
Figure 39:
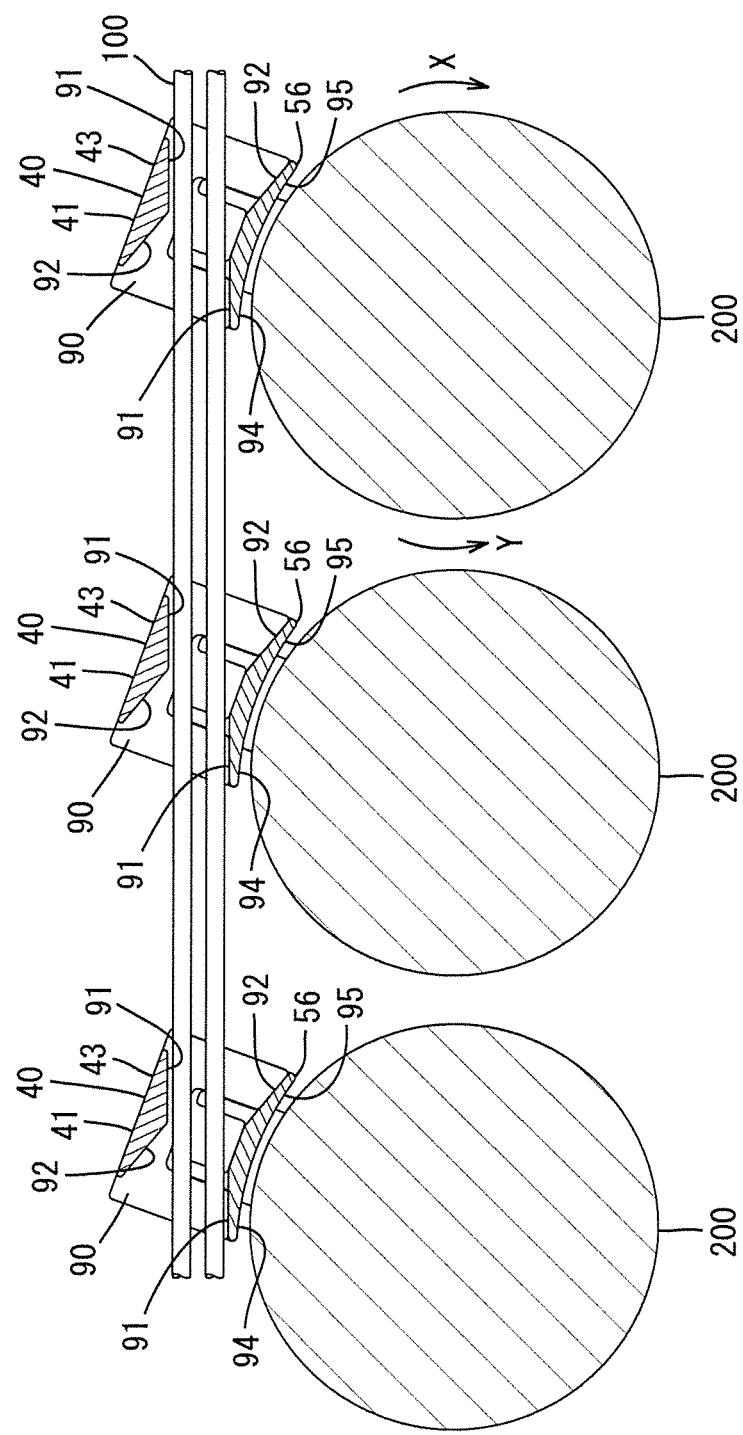
FIG. 39 is a cross-sectional view, seen in rear view, of the connectors when the solenoids are angularly displaced.

As illustrated in FIGS. 37 to 39, relieving portions 90 are provided in the through portion 52 of the housing 41. The relieving portions 90 have a shape retracted from the electrical wires 100 so as to be prevented from interfering with the electrical wires 100 when, as described later, the housing 41 is angularly displaced about the axis parallel with the front-rear direction. The relieving portions 90 are defined by first inclination faces 91 and second inclination faces 92. The first inclination faces 91 and the second inclination faces 92 are provided on the lower face of the base 49 and the upper face of the facing base 58 on the inner face of the through portion 52. Each first inclination face 91 and each second inclination face 92 are gradually inclined in the enlarging direction increasing the internal volume of the through portion 52 from the center toward both ends in the width direction, on both sides across the center in the width direction of the inner face of the through portion 52. In this case, the first inclination face 91 and the second inclination face 92 have substantially the same inclination angle.

As illustrated in FIG. 37, the upper face of the base 49 has a flat face 93 substantially along the width direction so as to be opposite to the first inclination face 91 and the second inclination face 92. Thus, the base 49 has a plate thickness which becomes smaller toward both ends in the width direction. A first outer face 94 and a second outer face 95 (which are correspond to the arc portion 64 in Example 6, but here, are referred to as another name for convenience) are provided at both ends in the width direction of the lower face of the facing base 58 so as to be opposite to the first inclination face 91 and the second inclination face 92. The first outer face 94 and the second outer face 95 are curved downward along the outer circumferential face of a solenoid 200. The inclination direction of the first outer face 94 is directed to the same side as the inclination direction of the first inclination face 91 of the facing base 58. The inclination direction of the second outer face 95 is directed to the same side as the inclination direction of the second inclination face 92 of the facing base 58. Thus, even when the inclination angle of the first inclination face 91 and the second inclination face 92 of the facing base 58 is acute, a predetermined plate thickness can be provided at both ends in the width direction of the facing base 58.

As illustrated in FIG. 41, restriction ribs 96 have a plate piece shape, and are projected from the first inclination face 91 and the second inclination face 92 of the facing base 58. The upper ends of both the restriction ribs 96 are located at the same height in the width direction, and are substantially flush and continuous with the center in the width direction of the upper face of the facing base 58. In short, both the restriction ribs 96 are disposed in the range of the inclination angle of the first inclination face 91 and the second inclination face 92.

Figure 33:
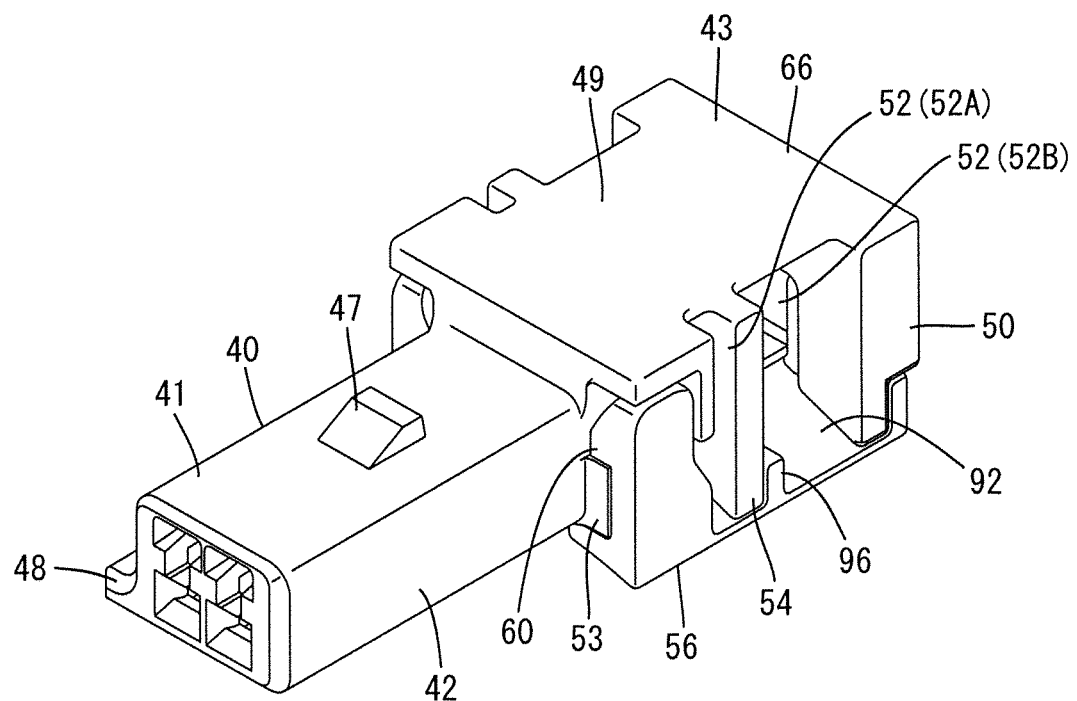
FIG. 33 is a perspective view of a connector of a wire harness in Example 7.

As illustrated in FIGS. 33 and 36, in a state where the cover 56 is held by the housing portion 66, both the restriction ribs 96 can be abutted on the rear faces at the lower ends of both the partitioning portions 54. Thus, the rearward flexing of both the partitioning portions 54 is restricted by both the restriction ribs 96. As a result, the first through portion 52A is precisely held with predetermined spacing, so that the arranged state of the electrical wires 100 inserted through the first through portion 52A is stably maintained.

The routing configuration of each electrical wire 100 inserted through the through portion 52 of the guide 43 will be described.

Before the cover 56 is mounted on the housing portion 66, the electrical wire 100 is inserted through the through portion 52 of the guide 43. At this time, the electrical wire 100 to be branched to a branching portion 20 out of the electrical wires 100 is separated. The separated electrical wire 100 is passed through the first through portion 52A, and is inserted into a cavity 44 of the housing body 42 via the terminal metal fitting 30 from the rear side. The electrical wire remaining in a main line 10 is passed through the second through portion 52B, and is drawn out in two directions intersecting the front-rear direction through the openings at both ends of the second through portion 52B.

The cover 56 is mounted on the housing portion 66 from the lower side. Then, as illustrated in FIG. 36, the through portion 52 is sectioned between the cover 56 and the housing portion 66 so as to be closed in the peripheral direction. Thus, the electrical wire 100 can be prevented from falling off from the through portion 52.

In the above case, a plurality of electrical wires 100, which are inserted through the through portions 52 of the housings 41, have the function of an aligning member which can hold straightness in the routing direction (the aligning direction of the connectors 40). The housings 41 of the connectors 40 in the branching portions 20 face respective corresponding counterpart connectors 70 so as to be fitted into the respective corresponding counterpart connectors 70. Both the connectors 40, 70 can thus be fitted smoothly and immediately. In particular, the electrical wires 100 are densely arranged in the first through portion 52A so that the free movement of the electrical wires 100 is restricted, and the first through portions 52A are close to the housing bodies 42. Thus, the shaft function of the electrical wires 100, which are passed through the first through portion 52A, is effectively exhibited. The connectors 40 can be reliably prevented from swinging.

As already described in Example 6, in a state where each connector 40 is fitted into the corresponding counterpart connector 70, the solenoid 200 is allowed to be angularly displaced about the axis parallel with the front-rear direction (the fitting direction of both the connectors 40, 70) in a predetermined angle range about the axial center of the solenoid 200.

Figure 40:
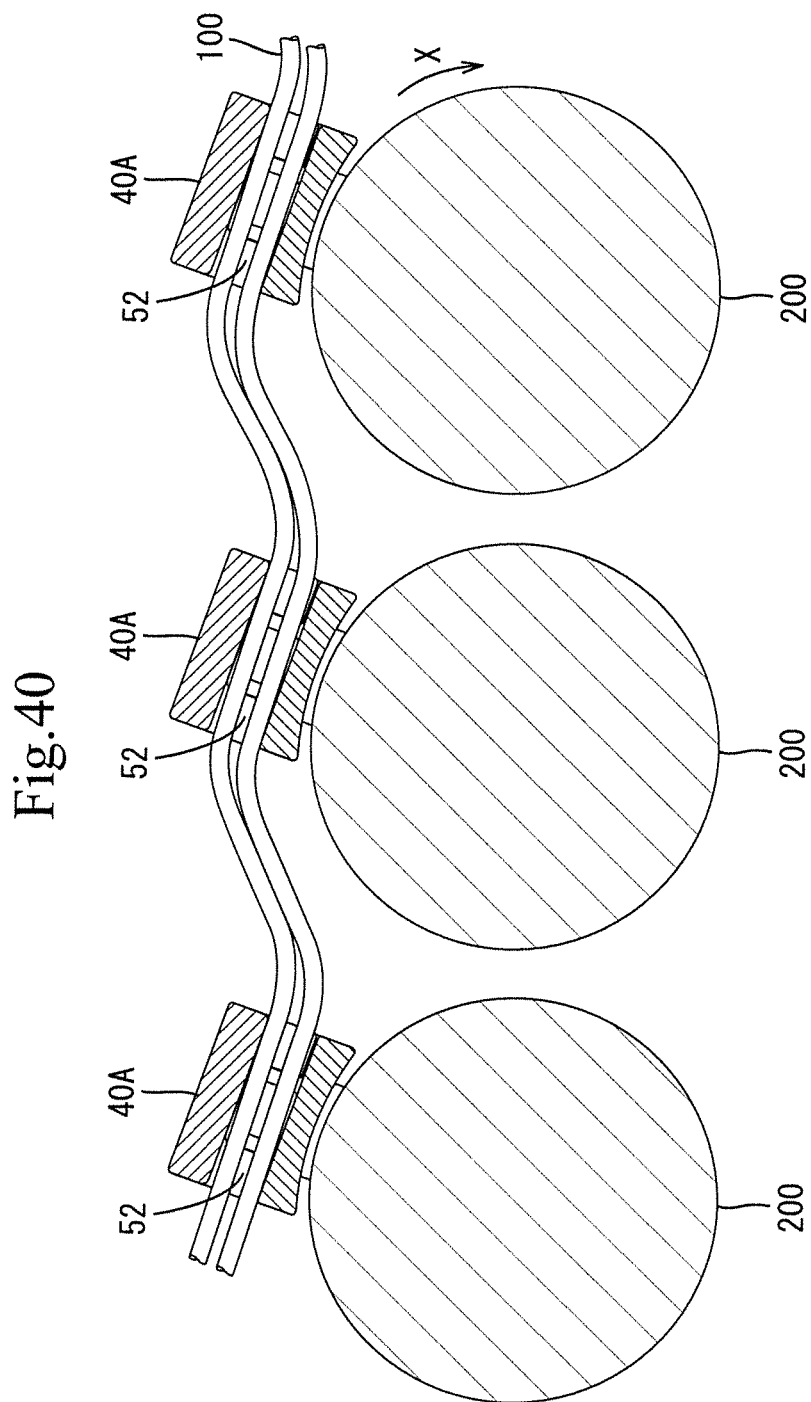
FIG. 40 is a diagram corresponding to FIG. 39 in a comparative example.

As illustrated in FIG. 40, if the inner faces of the through portions 52 are flat in the width direction which is the routing direction of the electrical wires 100, when the solenoids 200 are angularly displaced in a first periaxial direction X, which is the illustrated clockwise direction, the electrical wires 100 are forcefully bent and deformed along the flat inner faces of the through portions 52, so that the routing configuration is wavy in its entirety. Consequently, the electrical wires 100 cannot sufficiently align the connectors 40A in the aligning direction, and the number of the electrical wires 100 passed through the through portions 52 is restricted to be small.

Accordingly, in Example 7, since the relieving portions 90 are provided in the through portions 52, when, as illustrated in FIGS. 38 and 39, the solenoids 200 are angularly displaced in the first periaxial direction X, the electrical wires 100 can be routed along the first inclination faces 91 of the through portions 52 substantially without being bent, and can maintain their straightness. When the solenoids 200 are angularly displaced in a second periaxial direction Y which is the counterclockwise direction, the electrical wires 100 are routed along the second inclination faces 92 of the through portions 52 substantially without being bent, and can maintain their straightness. Thus, when the solenoids 200 are angularly displaced in either of the first periaxial direction X and the second periaxial direction Y, the electrical wires 100 can have the aligning function of an aligning member and the number of the electrical wires 100 passed through the through portions 52 can be increased. In Example 7, when the solenoids 200 are angularly displaced to the maximum in the first periaxial direction X and the second periaxial direction Y, the first inclination face 91 and the second inclination face 92 can be abutted on the electrical wires 100 in substantially parallel.

As described above, these examples can exert the following effects.

(1) In Examples 1 to 6, the electrical wire 100 extended out in two directions can be routed through the openings at both ends of the through portion 52 of the guide 43. Thus, a plurality of electrical wires 100 extended out in two directions provide a shaft, so that the connectors 40 can be prevented from swinging. In addition, the front faces of the housing bodies 42 can be substantially and fittably positioned relative to the respective corresponding counterpart connectors 70 so as to face the respective corresponding counterpart connectors 70. As a result, the connectors 40 can be smoothly fitted into the respective corresponding counterpart connectors 70. In particular, since each connector 40 can be appropriately fitted into the corresponding counterpart connector 70, the connector 40 can be prevented from being erroneously fitted into the counterpart connector 70 not corresponding thereto.

(2) In Examples 1 to 6, the housing body 42 is connected integrally to the guide 43. Thus, the number of components can be reduced to improve productivity.

(3) In Examples 1 and 6, the hooking portions 51 are provided in the guide 43, and hook the electrical wire 100 and hold the electrical wire 100 in the through portion 52. Thus, the electrical wire 100 can be prevented from falling off from the guide 43. In Examples 2 to 5, the cover 56, which is connected to the base 49 via the hinges 55, exhibits the function of the hooking portions 51. Thus, the electrical wire 100 can be prevented from falling off from the guide 43.

(4) In Examples 1 to 6, the guide 43 has the through portion 52 having a space capable of routing the electrical wire 100 extended out from the rear face of the housing body 42 of its own, and the through portion 52 having a space capable of routing another electrical wire 100 extended out from another housing body 42. Thus, the electrical wire 100 and another electrical wire 100 can be allocated to and routed through the spaces.

(5) In Examples 2 and 3, a plurality of through portions 52 are separated in the guide 43 of the connector 40. In detail, the first through portion 52A and the second through portion 52B are separated in the guide 43. Thus, the routing paths for a plurality of electrical wires 100 can be set into the through portions 52A and 52B without increasing the number of components and without requiring a complicated operation. In particular, by allocating the electrical wires 100 to the through portions 52A and 52B, the routing patterns for the electrical wires 100 can be varied, and the electrical wires 100 can be efficiently routed together.

(6) In Examples 2 and 3, the first through portion 52A has a space capable of routing the electrical wire 100 extended out from the rear face of the housing body 42, the second through portion 52B has a space capable of routing another electrical wire 100 extended out from the rear face of another housing body 42, and the first through portion 52A and the second through portion 52B are separated by the partitioning portions 54. Thus, the electrical wire 100 extended out from the rear face of the housing body 42 and another electrical wire 100 extended out from the rear face of another housing body 42 are non-mixingly and discriminately routed through the through portions 52, and the routing operation of the electrical wires 100 can be performed regularly and efficiently.

(7) In Example 2, a plurality of electrical wires 100 as an aligning member are passed through the first through portion 52A having the smallest opening area, of a plurality of through portions 52. Thus, even when the number of the electrical wires 100 is small, the shaft function of the electrical wires 100 as an aligning member can be exhibited efficiently.

(8) In Examples 1 to 6, the electrical wire 100 in the main line 10 and the electrical wire 100 branched from the main line 10 are inserted through the through portion 52 of the guide 43. Thus, the electrical wire 100 in the main line 10 and the electrical wire 100 in the branching portion 20 are efficiently routed together through the through portion 52.

(9) In Examples 1 to 6, a plurality of connectors 40 are provided so as to be spaced from each other in the extending-out direction of the main line 10, and are aligned together via the aligning member penetrated through the connectors 40 along the direction intersecting the front-rear direction (the extending-out direction of the main line 10) so as to face the respective corresponding counterpart connectors 70. Thus, both the connectors 40, 70 can be fitted smoothly and immediately. In this case, in Examples 1 to 3, 5, and 6, the electrical wires 100 in the main line 10, which are penetrated through the through portions 52 of the guides 43 of the connectors 40, have the aligning function of an aligning member. In Example 4, the jig 80, which is penetrated through the through portions 52 of the tables 62 of the connectors 40, has the aligning function of an aligning member. In Examples 1 to 3, 5, and 6, when the aligning member is the electrical wire 100, a dedicated aligning member can be omitted. Thus, the wire harness can be simplified in configuration, and the cost can be reduced.

(10) In Examples 1 to 6, the through portion 52 of the guide 43 passes through the housing 41 so as to be coaxial with the direction intersecting the front-rear direction. Thus, the aligning member simply needs to be straight, and can be simplified in configuration, and the cost can be reduced.

(11) In the first through portion 52A of the guide 43 in Example 2 and the through portion 52 of the guide 43 in Example 5, a plurality of electrical wires 100 are densely arranged in the through portion 52 so that the free movement of the electrical wires 100 is restricted. Thus, the electrical wires 100 provide a shaft, so that the connectors 40 can be prevented from swinging, and be aligned to be fitted into the respective corresponding counterpart housings 71. As a result, each connector 40 can be reliably prevented from being erroneously fitted, and can be fitted into the corresponding counterpart housing 71 more smoothly.

(12) In the first through portion 52A of the guide 43 in Example 2 and the through portion 52 of the guide 43 in Example 5, a plurality of electrical wires 100 are aligned in one direction in a plane along the direction intersecting the front-rear direction. In detail, the electrical wires 100 are densely arranged in the height direction in a vertical row. Thus, the shaft function (rigidity) of the electrical wires 100 is further enhanced, and the connectors 40 can be prevented from swinging more reliably.

(13) In Example 6, when the counterpart housing 71 is angularly displaced about the axis parallel with the front-rear direction, the arc portion 64 of the housing body 42 is guided by the counterpart arc portion 74 of the hood 72, and is entered into the hood 72. Thus, both the housings 41 and 71 can be fitted smoothly and immediately. In this case, the arc portion 64 and the counterpart arc portion 74 are curved in an arc shape along the angular displacement direction on the lower side of the front face of the housing body 42 and the lower side of the opening edge of the hood 72 respectively. Thus, the forming range of the chamfered portion 46 for guiding can be smaller or eliminated. As a result, the connector 40 can be prevented from being large.

(14) In Example 6, the arc portion 64 and the counterpart arc portion 74 are formed by expanding the lower side of the hood 72 and the lower side of the housing body 42 respectively. This can cope with the angular displacement of the counterpart housing 71 in a large angle displacement amount, thereby enhancing guiding reliability.

(15) In Example 6, by the shaft function of a plurality of electrical wires 100 inserted through the through portions 52 of the guides 43, the housings 41 of the connectors 40 are substantially positioned in the direction intersecting the front-rear direction, so that the housings 41 can be fitted into the respective corresponding counterpart housings 71. In addition, the arc portion 64 and the counterpart arc portion 74 absorb the dislocation of the fitting position of the housing 41 into the counterpart housing 71. Thus, both the housings 41 and 71 can be fitted more smoothly and immediately.

(16) In Example 7, even when the housing 41 is angularly displaced, the relieving portions 90 having a shape retracted from the electrical wires 100 can prevent the housing 41 from greatly interfering with the electrical wires 100. Thus, a plurality of housings 41 are stably maintained to be aligned in the aligning direction.

Other Examples

Other examples will be briefly described below.

(1) In Examples 2 and 3, three or more through portions may be provided in the guide.

(2) In Examples 2 and 3, the electrical wire in the main line may be routed through the first through portion of the guide, and the electrical wire extended out from the housing body may be routed through the second through portion of the guide.

(3) Like Examples 2 and 3, in Examples 1 and 4 to 6, a plurality of through portions may be separated in the guide.

(4) In Example 6, the housing, not the counterpart housing, may be angularly displaced about the axis. Alternatively, both of the counterpart housing and the housing may be angularly displaced about the axis.

(5) In Examples 2, 3, and 7, the partitioning portion may be continuous with the cover.

(6) In Examples 1 and 6, the hooking portion may be continuous with the housing body.

(7) In Example 7, in place of the electrical wire, for example, the jig used in Example 4 may be used as an aligning member.

REFERENCE SIGNS LIST

10 . . . Main line
20 . . . Branching portion
30 . . . Terminal metal fitting
40 . . . Connector
41 . . . Housing
42 . . . Housing body
43 . . . Guide
51 . . . Hooking portion
52, 52E . . . Through portion
52A . . . First through portion
52B . . . Second through portion
54 . . . Partitioning portion
64 . . . Arc portion
70 . . . Counterpart connector 71 . . . Counterpart housing
72 . . . Hood
74 . . . Counterpart arc portion
80 . . . Jig (aligning member)
90 . . . Relieving portion
91 . . . First inclination face
92 . . . Second inclination face
100 . . . Electrical wire (aligning member)
300 . . . Operating opening

The invention claimed is:

1. A wire harness comprising:
a plurality of connectors, each of the connectors including a housing with a front face and a rear face spaced apart along a front-rear direction, each of the housings being connectable to a counterpart housing when the front face of each of the housings faces the respective counterpart housing, the connectors being arranged in a line along an aligning direction that intersects the front rear direction, a through portion is provided in each of the housings, each of the through portions penetrating the respective housing in the aligning direction and the respective through portions being aligned coaxially with one another;
a main line that includes plural electrical wires arranged in the aligning direction,
branching portions, each of which comprises at least one of the electrical wires of the main line that is branched off from the main line to extend substantially in the front-rear direction, the branching portions being connected respectively to the connectors,
an aligning member passed through the respective through portions and arranging each of the connectors at a position capable of facing its counterpart connector, the aligning member includes at least one of the electrical wires of the main line, wherein
the connectors are supported by the aligning member.

2. The wire harness according to claim 1, wherein
the through portion is provided at a rear part of the housing and is partitioned into plural through portions, and
the electrical wire, as the aligning member, is passed at least through the through portion with a smallest opening area among the plural through portions.

3. The connector according to claim 1 wherein
an operating opening for passing the electrical wire in the through portion is provided in the housing, and
the operating opening is closed by a cover after the electrical wire is passed in the through portion.

* * * * *